(12) United States Patent
Akahane et al.

(10) Patent No.: US 6,476,579 B1
(45) Date of Patent: Nov. 5, 2002

(54) PULSE MOTOR DRIVING DEVICE, PULSE MOTOR DRIVING METHOD, TIMEPIECE DEVICE, AND TIMEPIECE DEVICE CONTROL METHOD

(75) Inventors: Hidehiro Akahane, Tatsuno-machi (JP); Shinji Nakamiya, Matsumoto (JP); Yoshitaka Iijima, Shiojiri (JP); Kenji Iida, Shiojiri (JP); Tsuneaki Furukawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/554,351
(22) PCT Filed: Sep. 10, 1999
(86) PCT No.: PCT/JP99/04947
§ 371 (c)(1),
(2), (4) Date: Jun. 20, 2000
(87) PCT Pub. No.: WO00/16472
PCT Pub. Date: Mar. 23, 2000

(30) Foreign Application Priority Data

Sep. 10, 1998 (JP) ............................................ 10-257235
May 12, 1999 (JP) ............................................ 11-131834

(51) Int. Cl.[7] .................................................. H02P 8/00
(52) U.S. Cl. ...................... 318/696; 318/599; 318/603
(58) Field of Search ................................. 318/671, 685, 318/696, 254, 599, 603

(56) References Cited

U.S. PATENT DOCUMENTS 6,108,279 A * 8/2000 Hara ........................... 318/696
6,194,862 B1 * 2/2001 Hara ........................... 318/696
6,327,225 B1 * 12/2001 Okeya et al. ................ 318/696

FOREIGN PATENT DOCUMENTS

| EP | 0 704 774 | 4/1996 |
| JP | 54-161012 | 12/1979 |
| JP | 4-285499 | 10/1992 |
| JP | 9-266697 | 10/1997 |
| JP | 10-225185 | 8/1998 |
| JP | 10-225191 | 8/1998 |
| WO | WO 98/41906 | 9/1998 |

* cited by examiner

Primary Examiner—Marlon T. Fletcher
(74) Attorney, Agent, or Firm—Mark P. Watson

(57) ABSTRACT

A pulse motor driving device having a rotation detecting unit adapted to detect whether or not a pulse motor rotates. In this device, a control unit performs an operation of increasing the effective value of the driving power of the pulse motor and periodically performs an operation of lowering the effective value of the driving power thereof when it is detected by the rotation detecting unit that the pulse motor does not rotate. Further, the control unit interrupts the operation of lowering the effective value of the driving power of the pulse motor when a magnetic field is detected by a magnetic detecting unit.

71 Claims, 23 Drawing Sheets

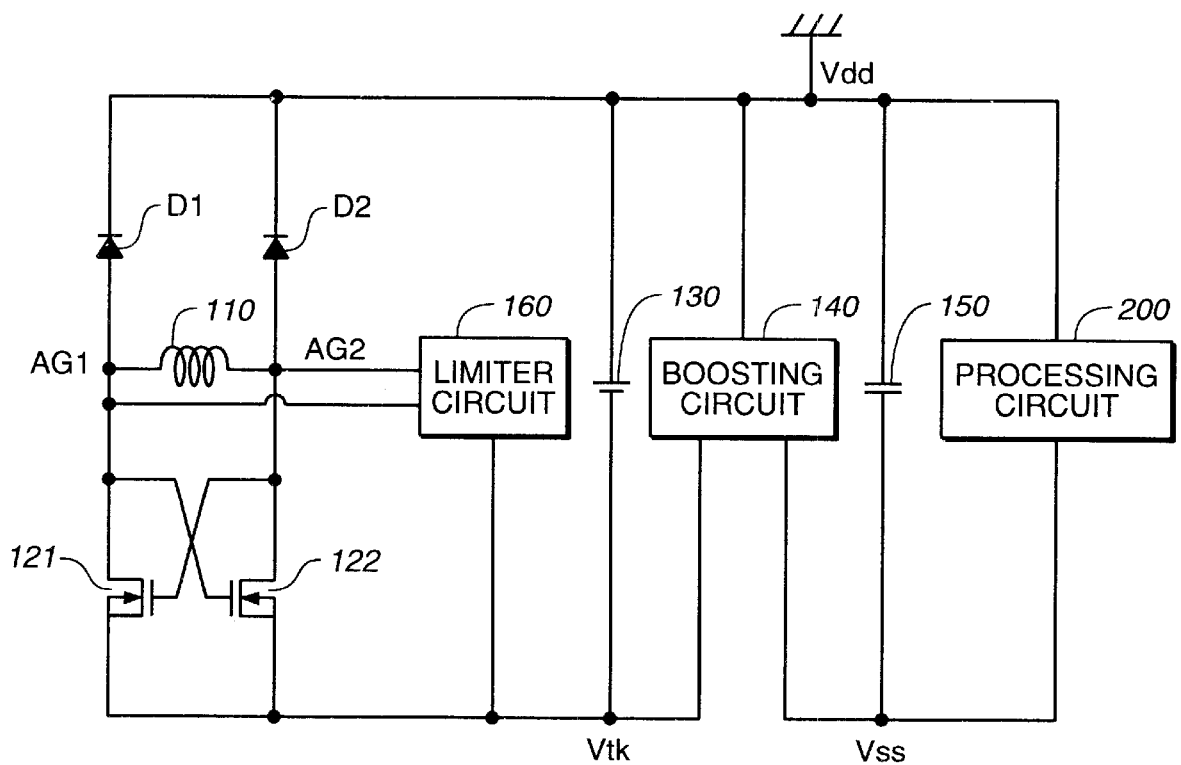
FIG._1
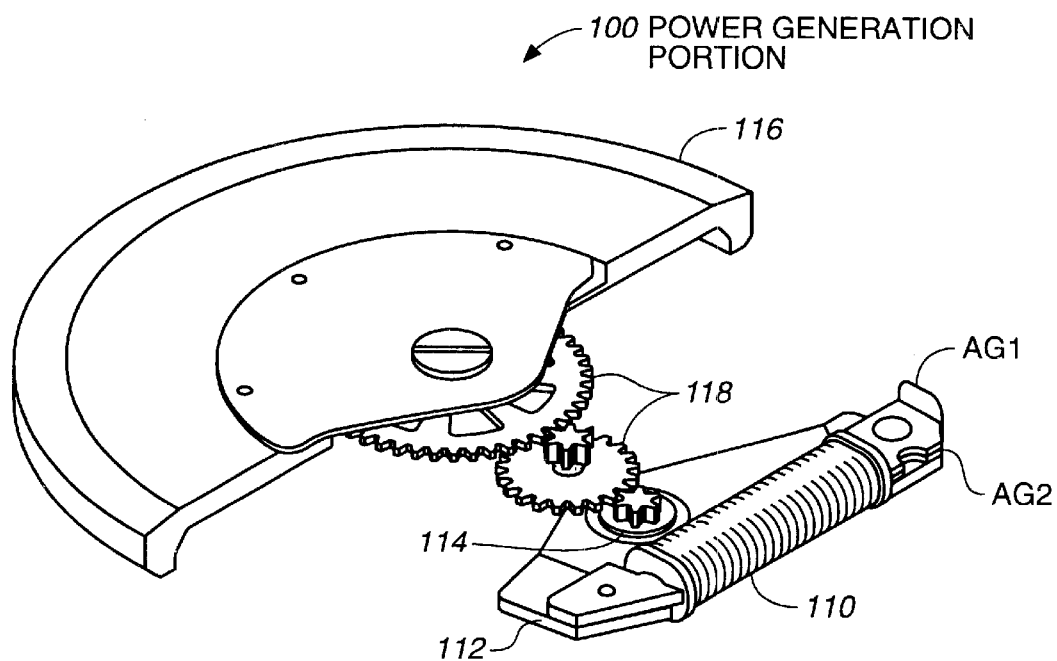
FIG._2

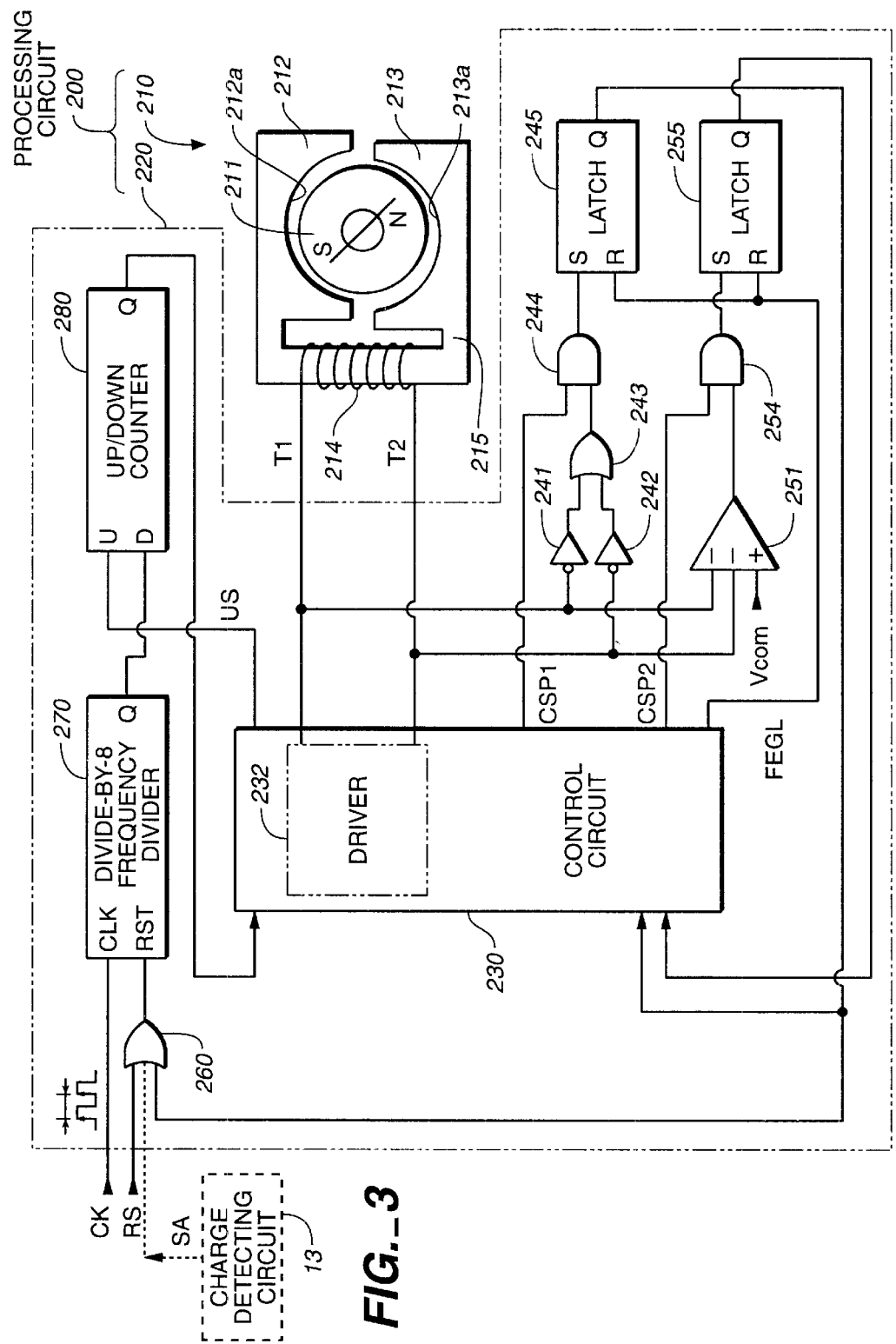
FIG._3

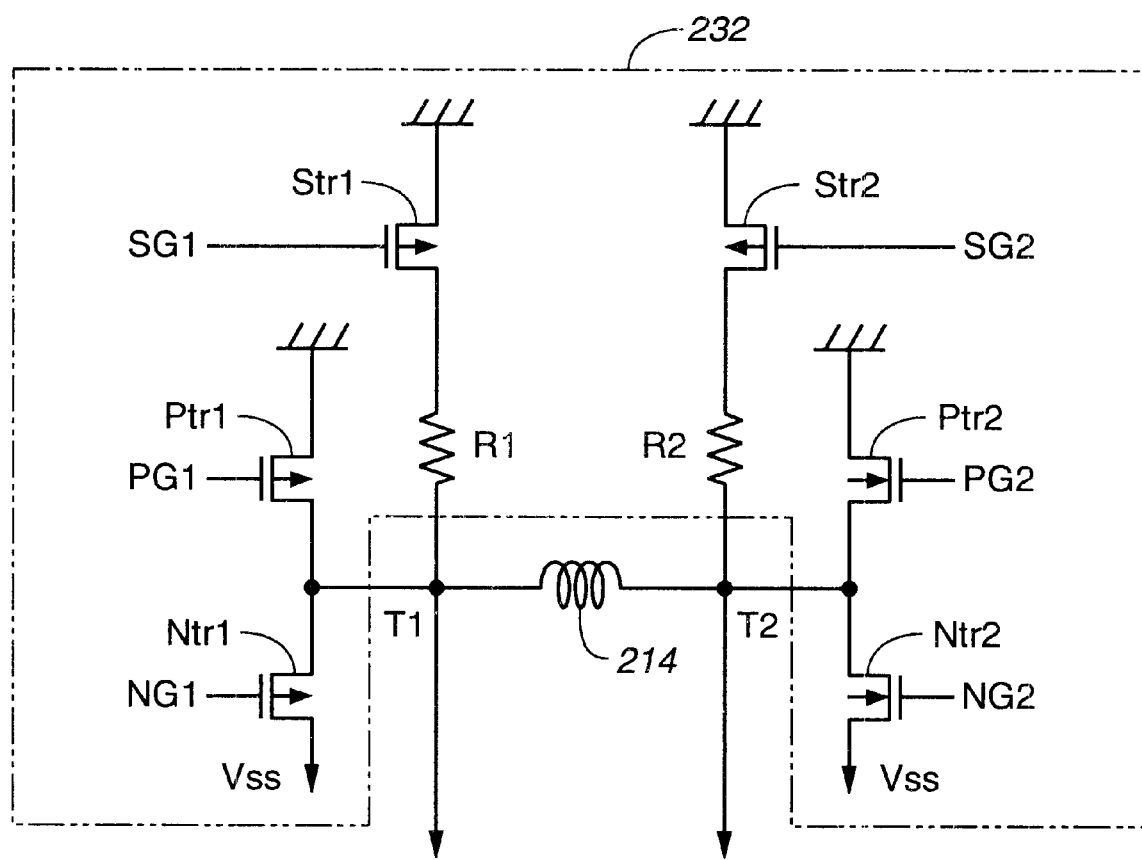
FIG._4

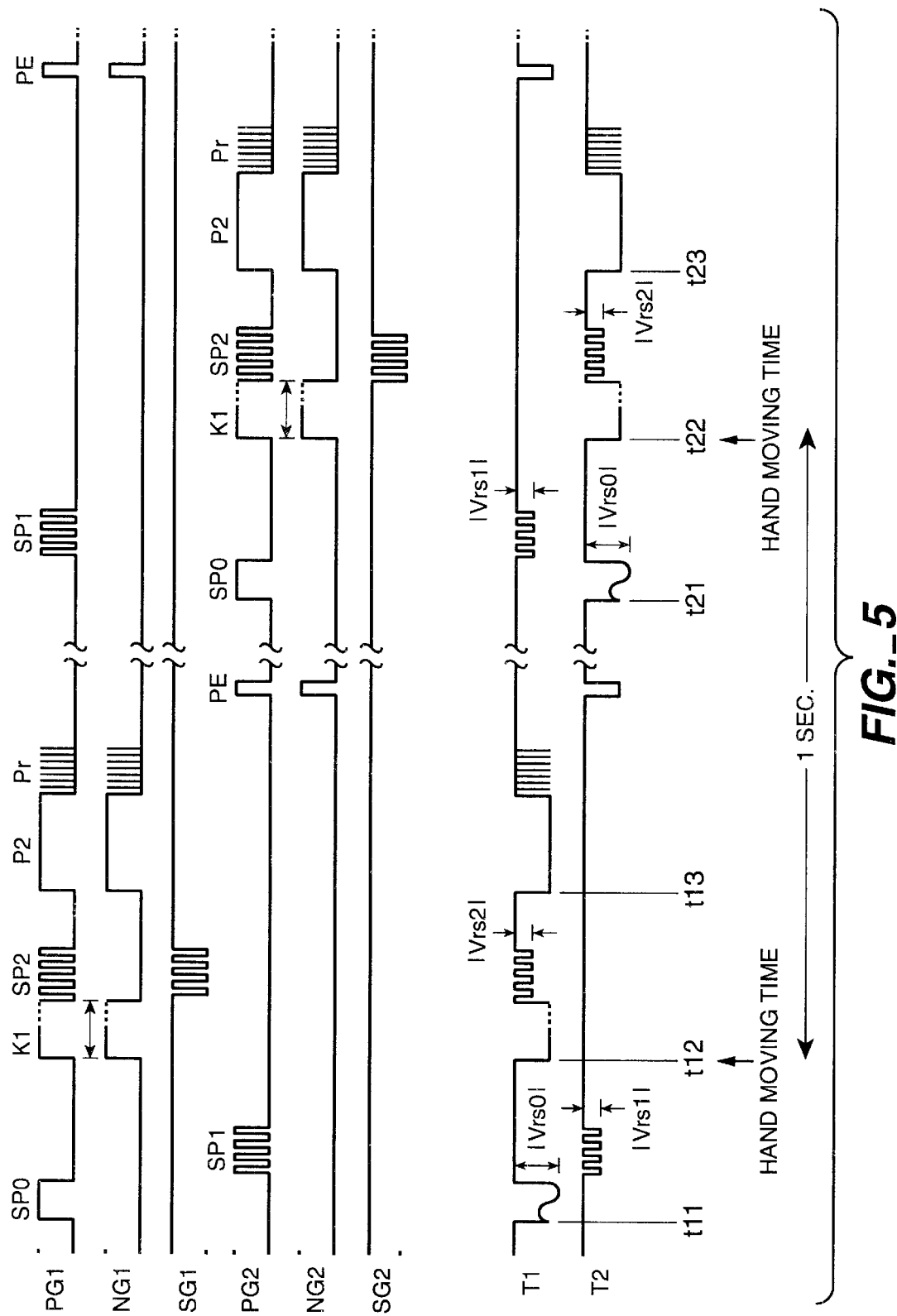
FIG._5

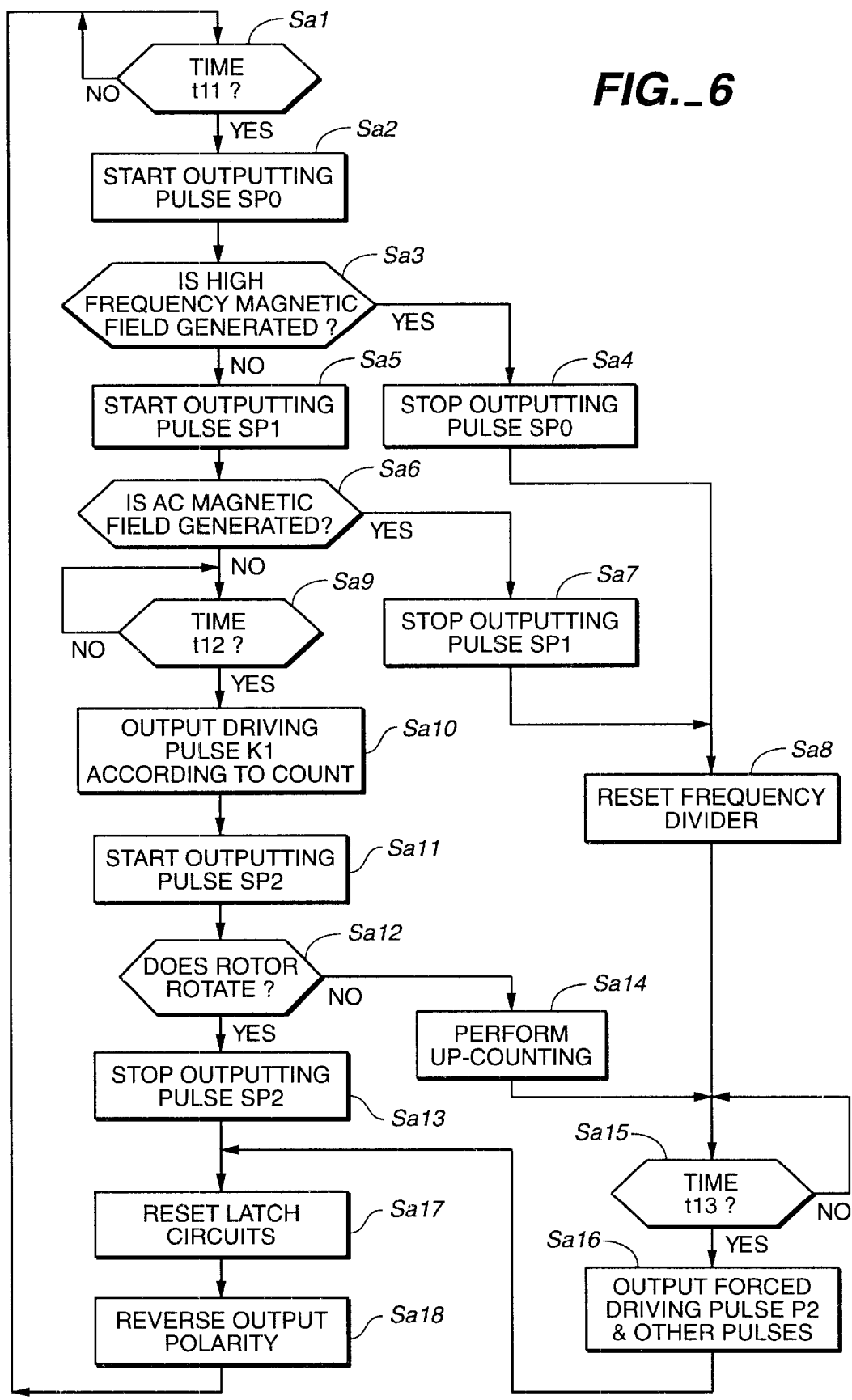
FIG._6

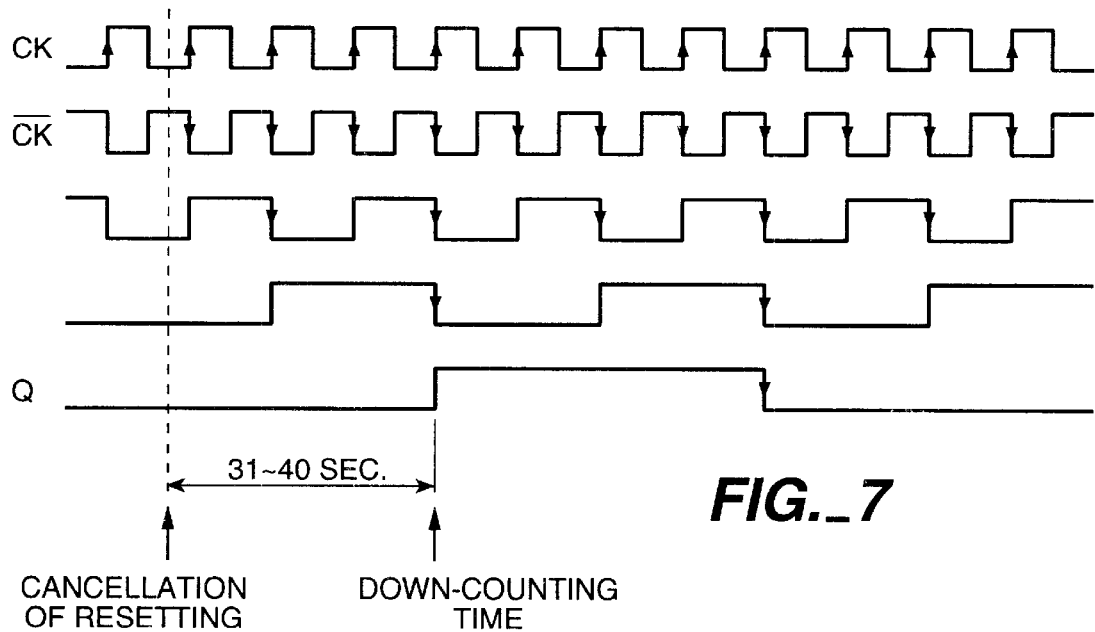
FIG._7
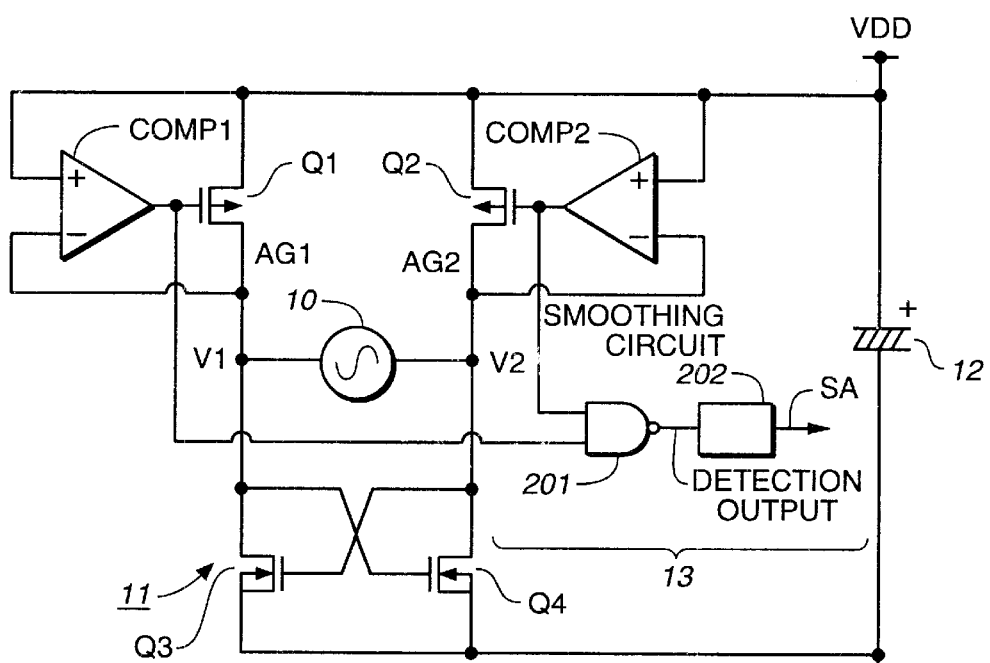
FIG._10

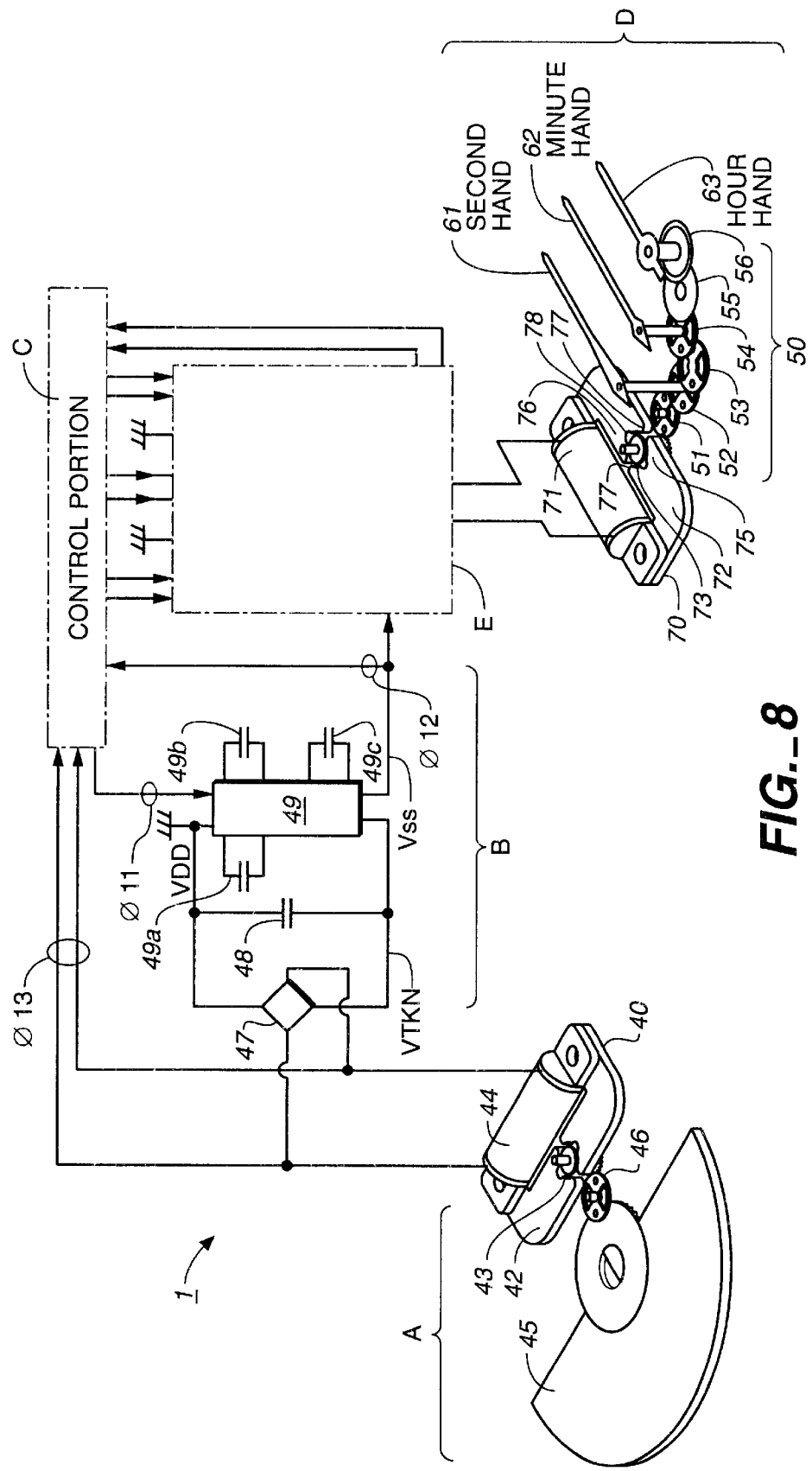
FIG._8

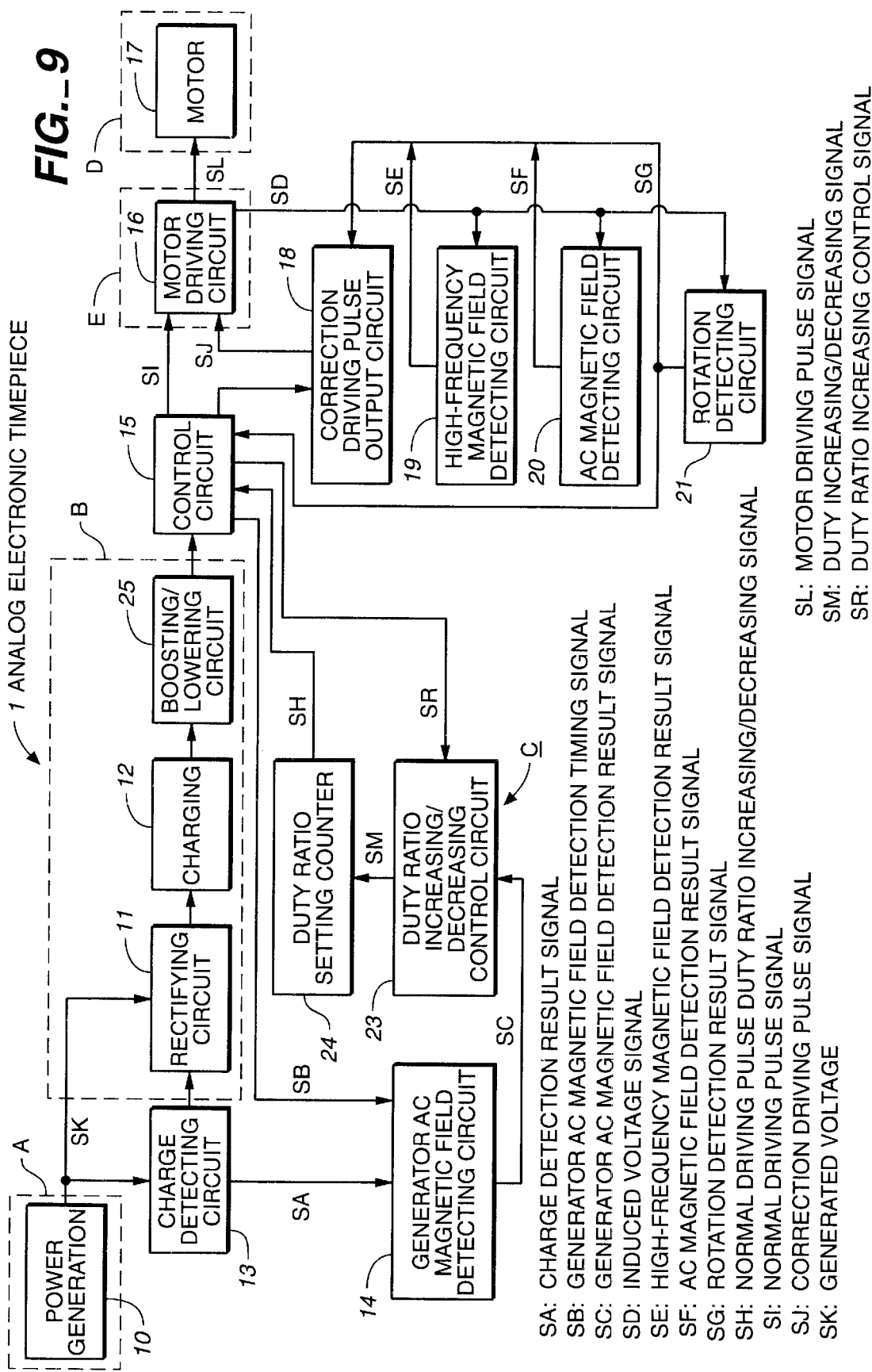

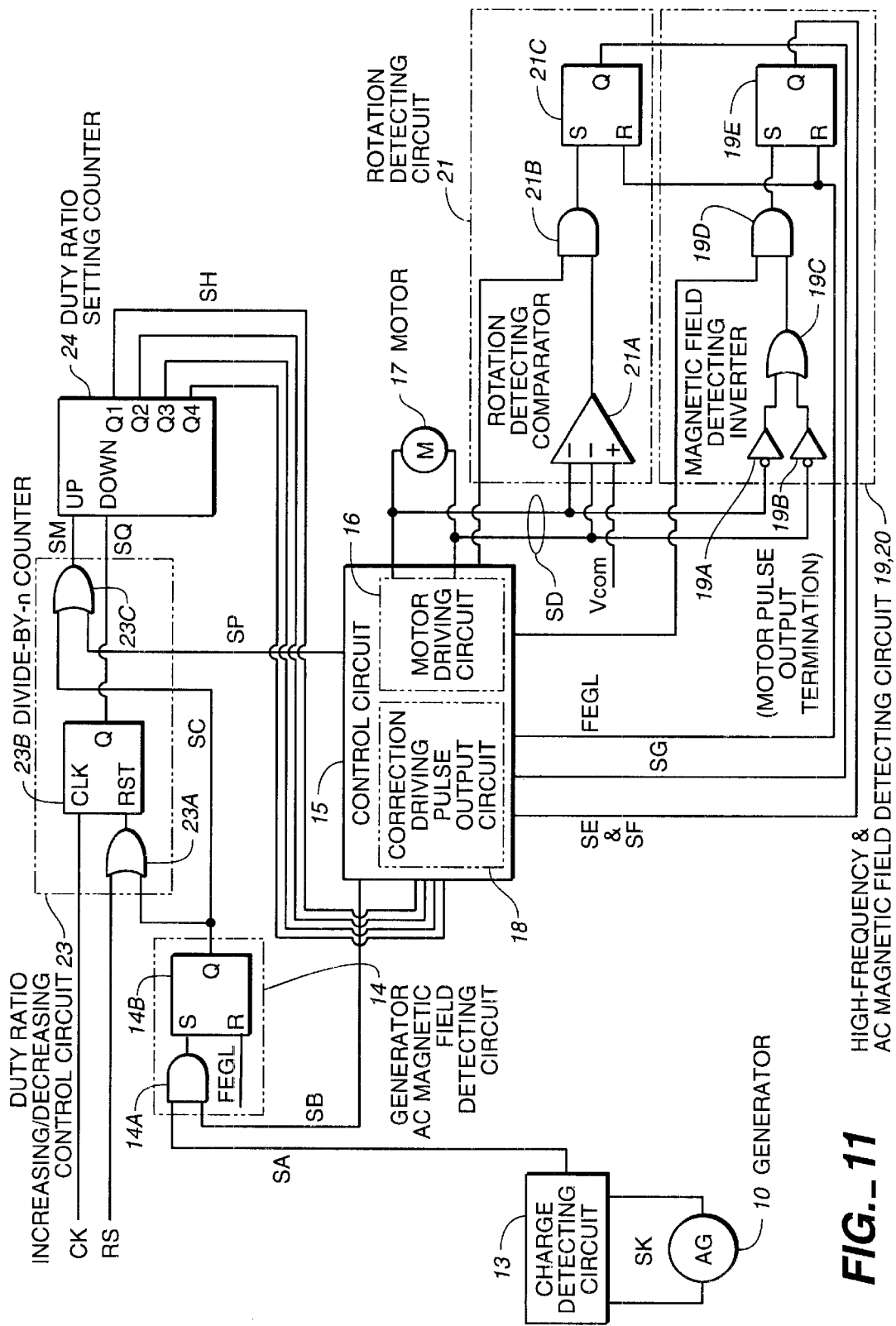
FIG._11

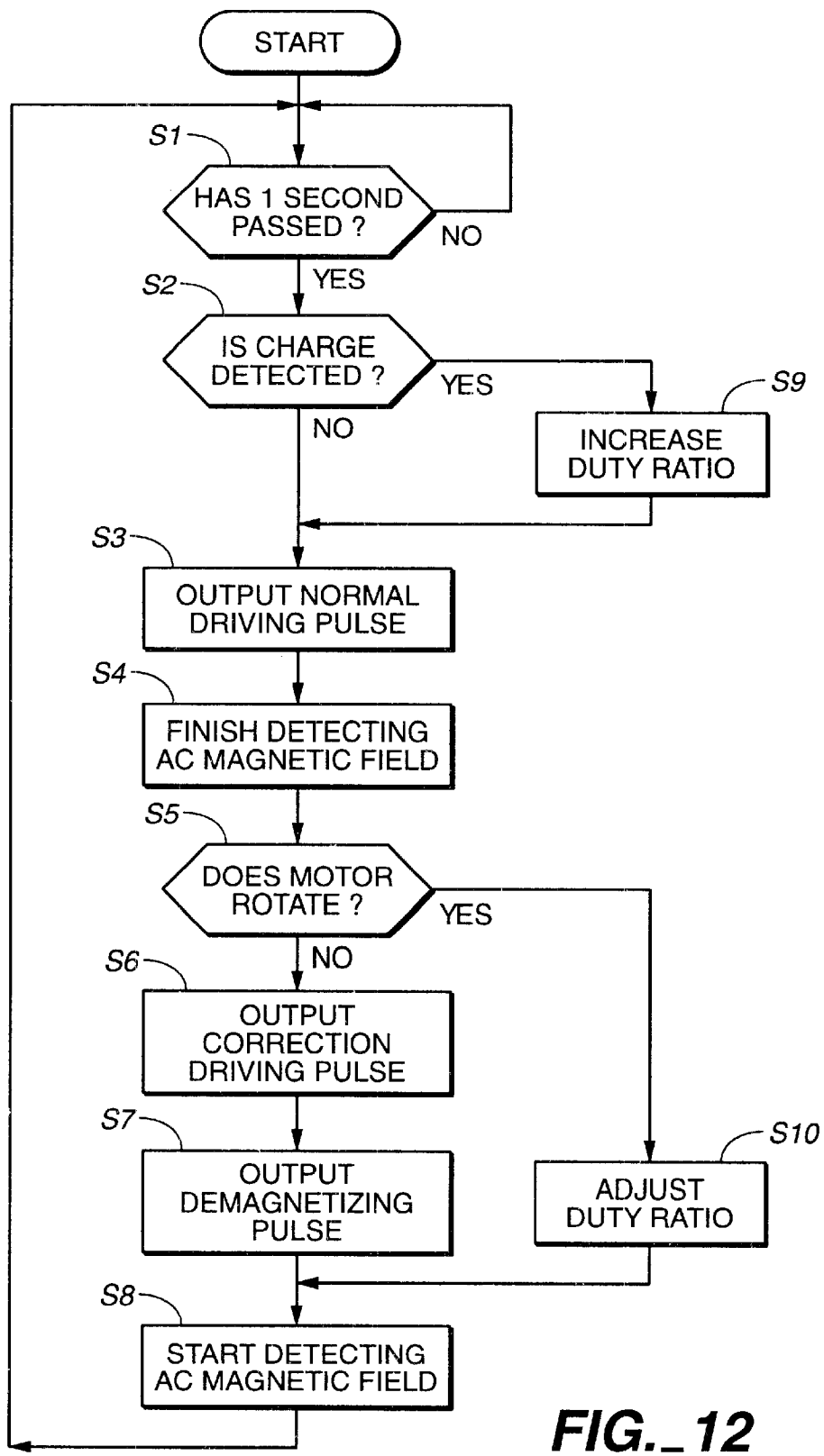
FIG._12

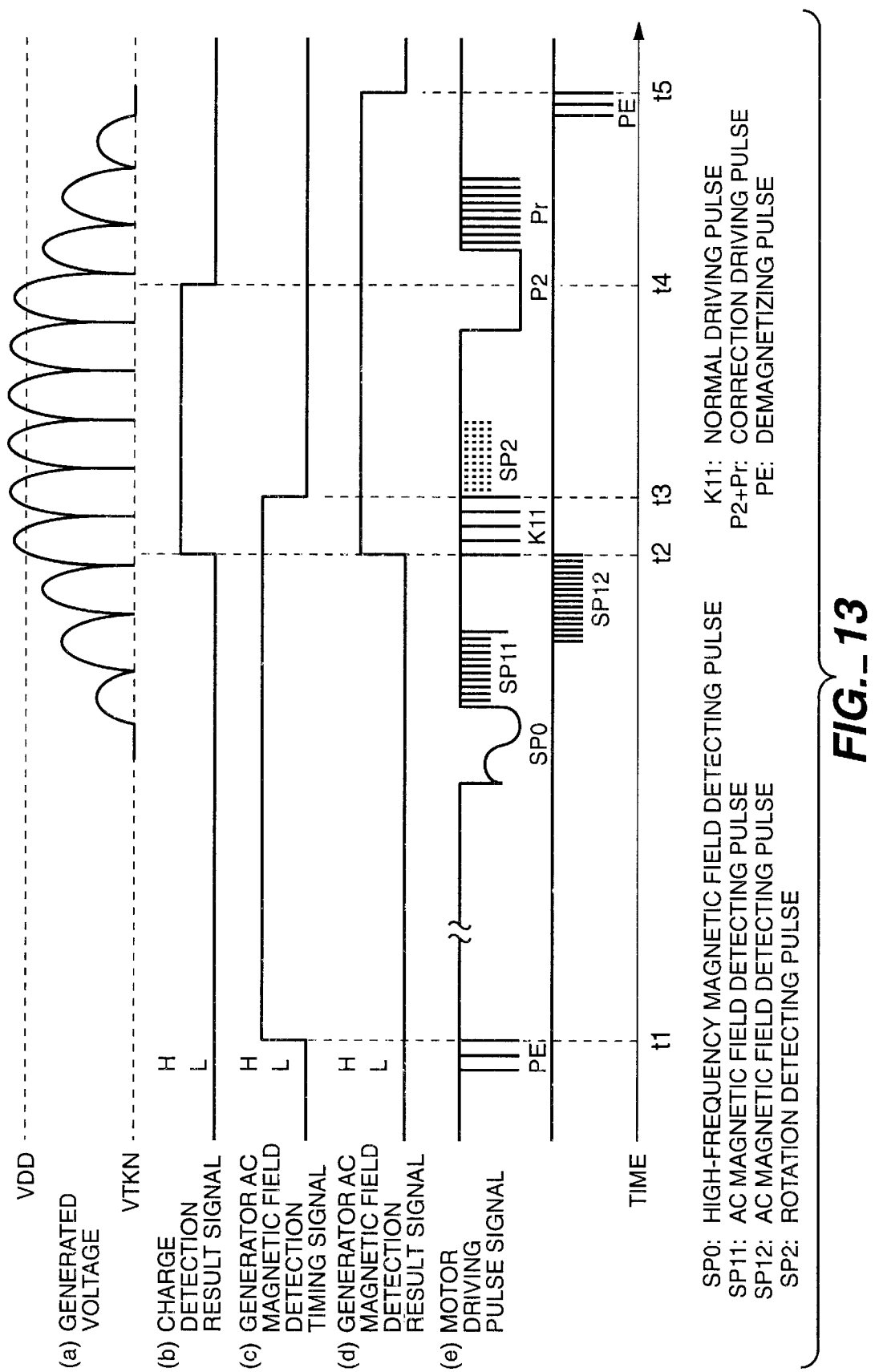
FIG._13

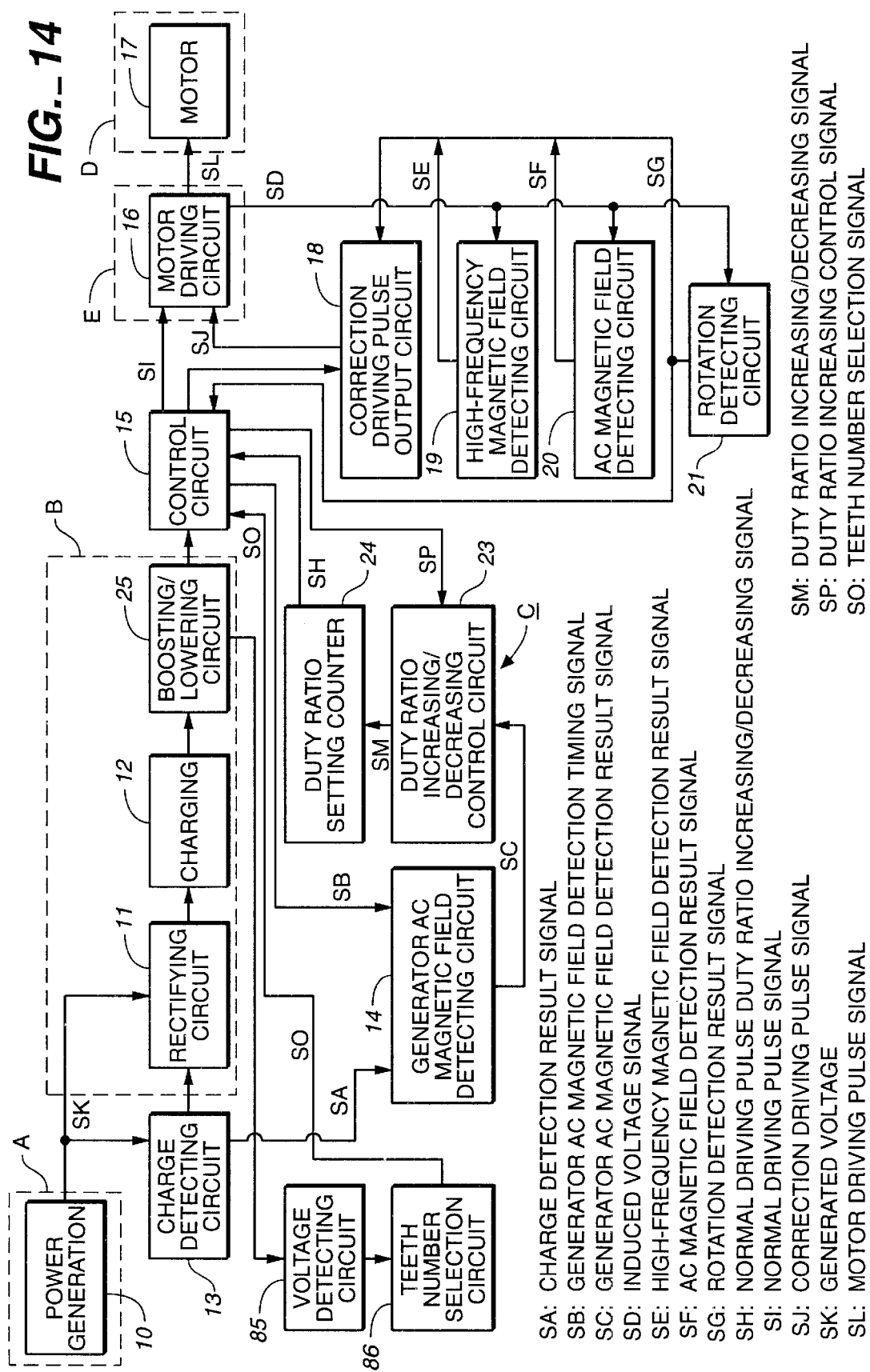

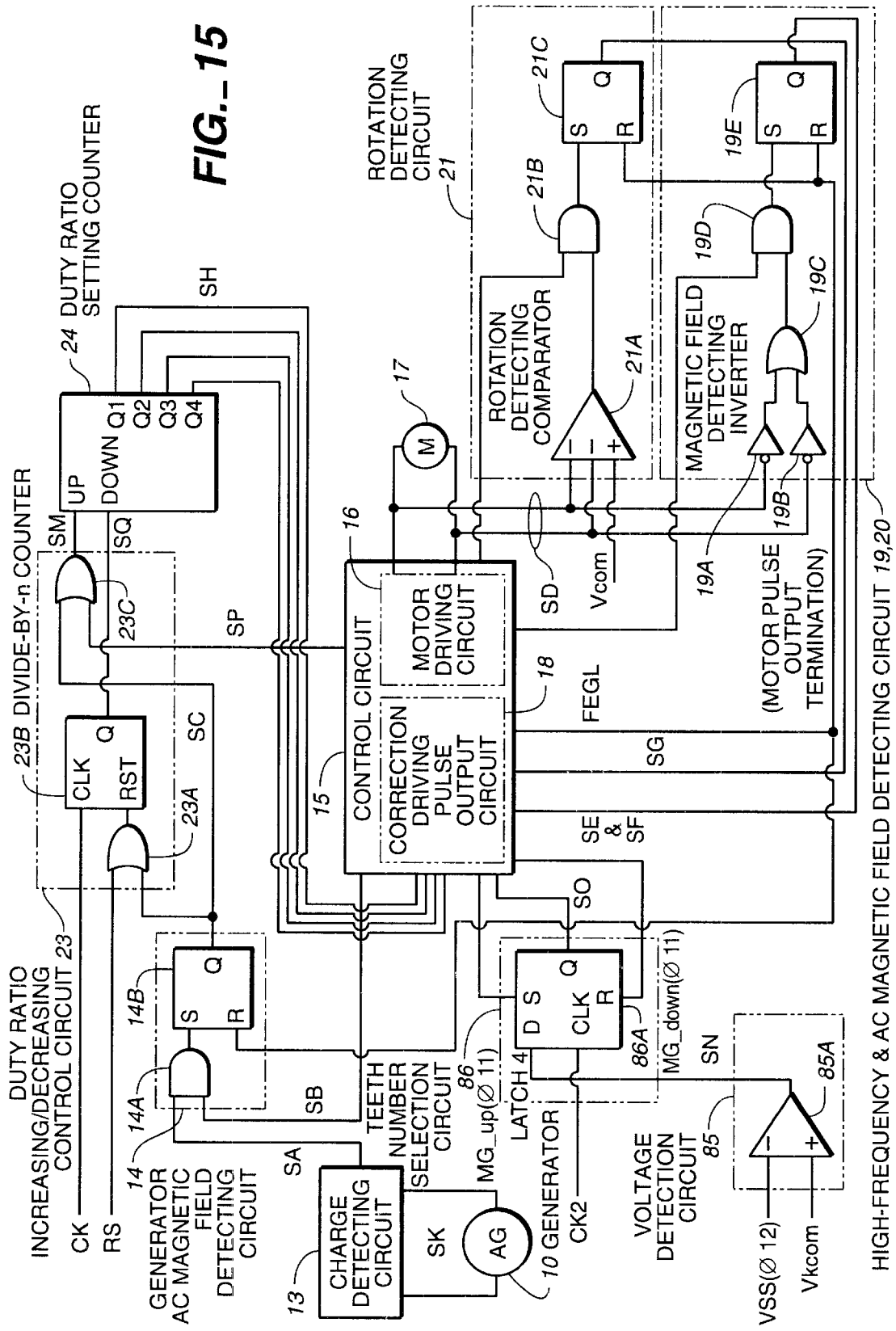
FIG._15

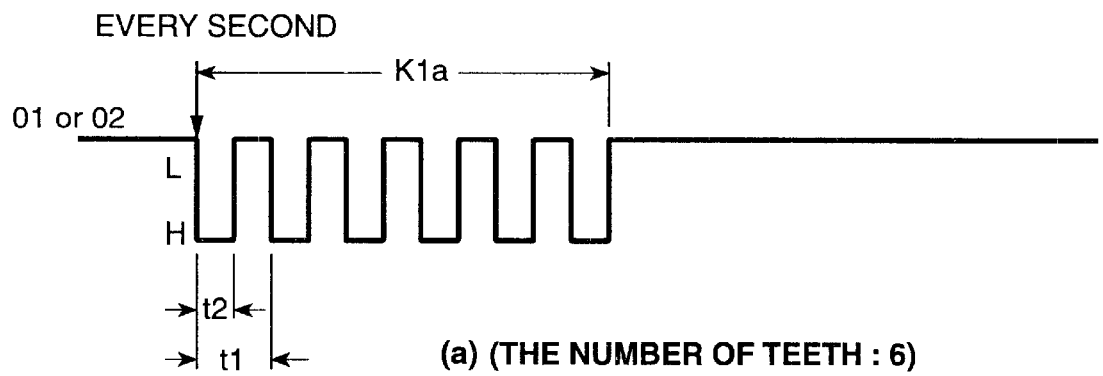
(a) (THE NUMBER OF TEETH : 6)
t1 = 0.488msec
t2/t1 = DUTY RATIO
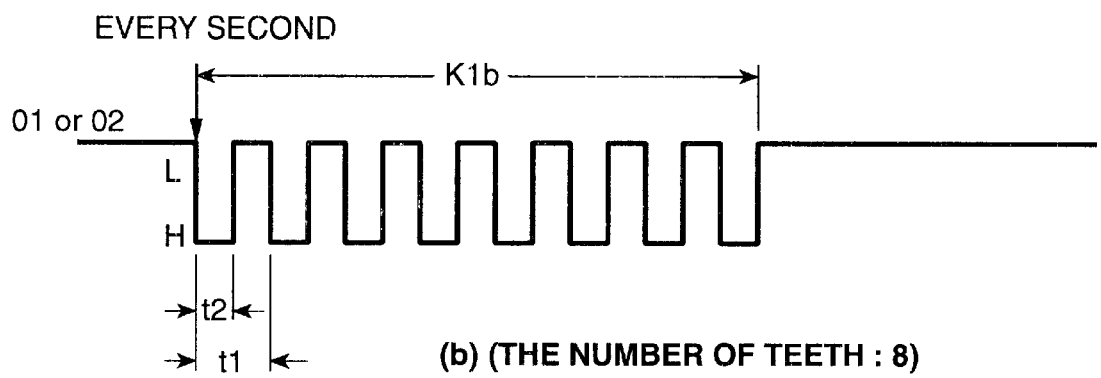
(b) (THE NUMBER OF TEETH : 8)
FIG._16

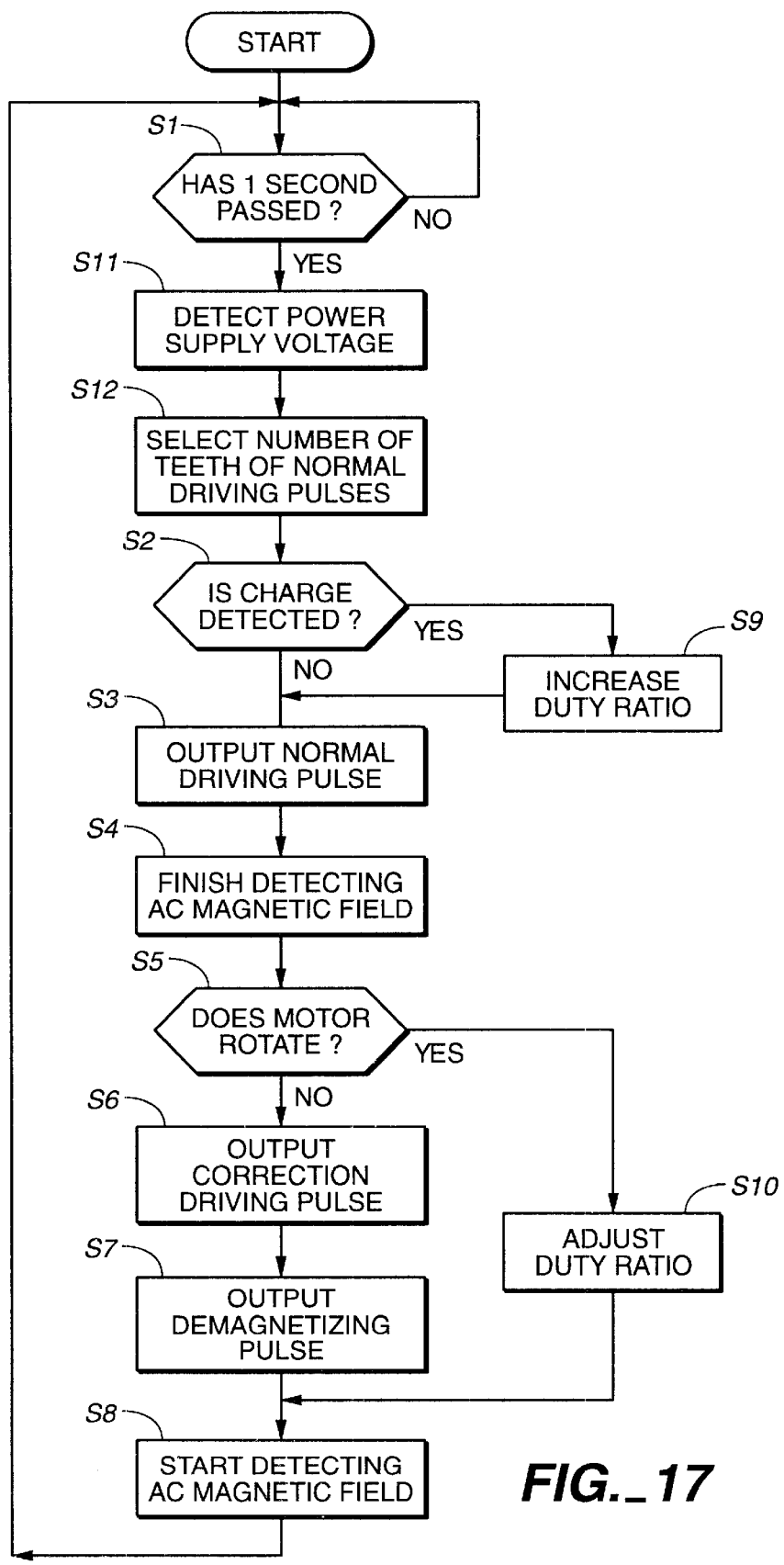
FIG._17

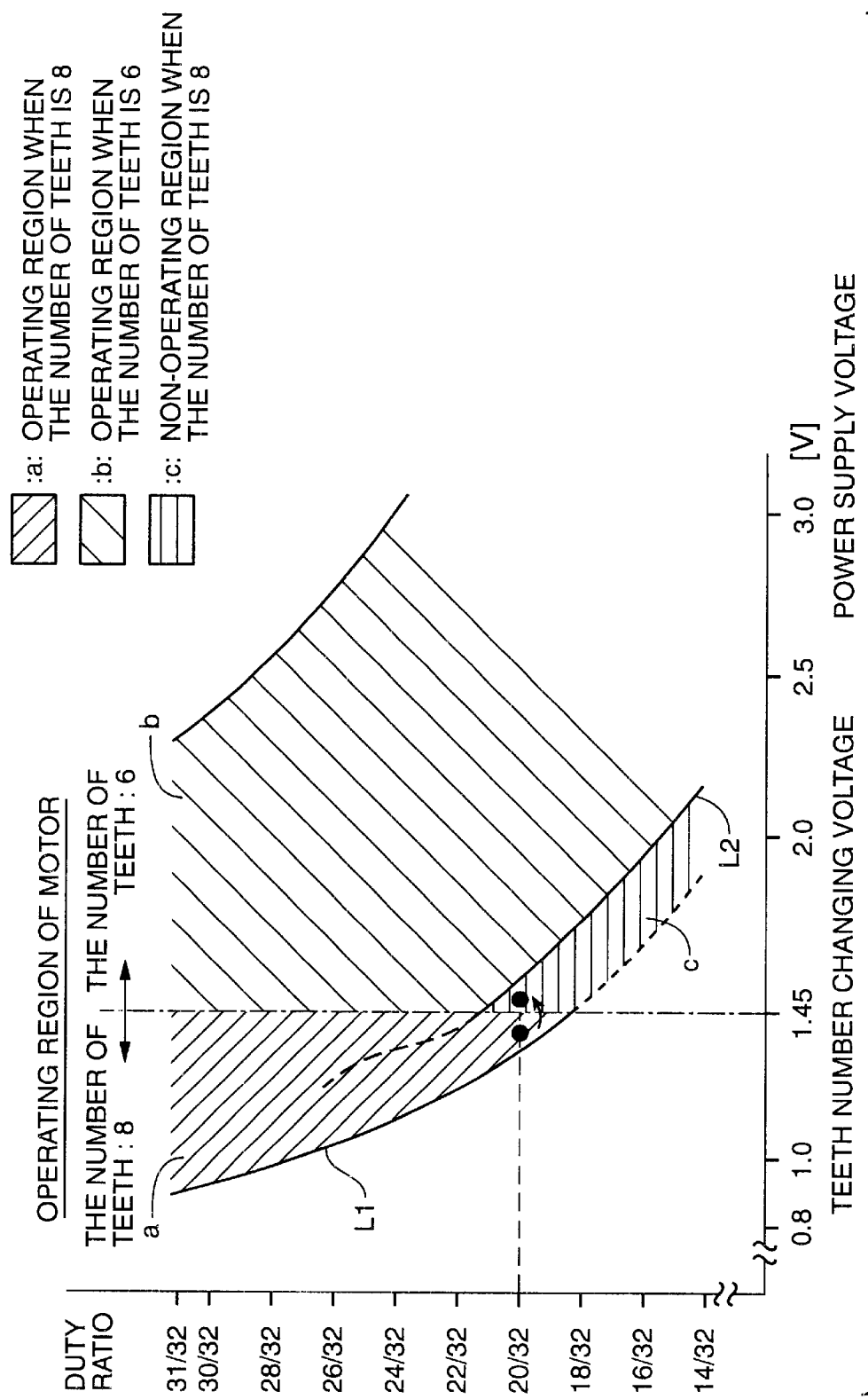
FIG._18

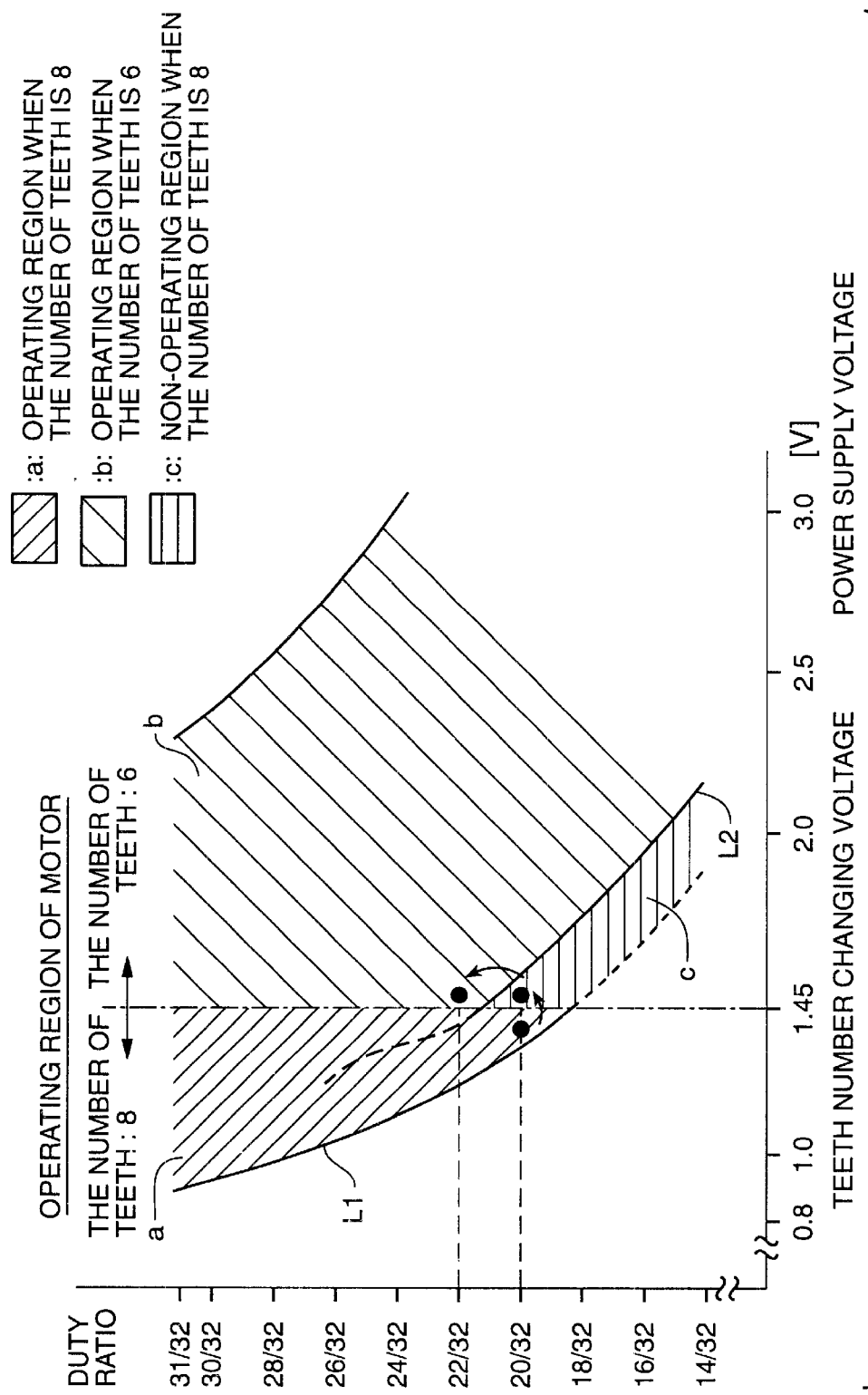

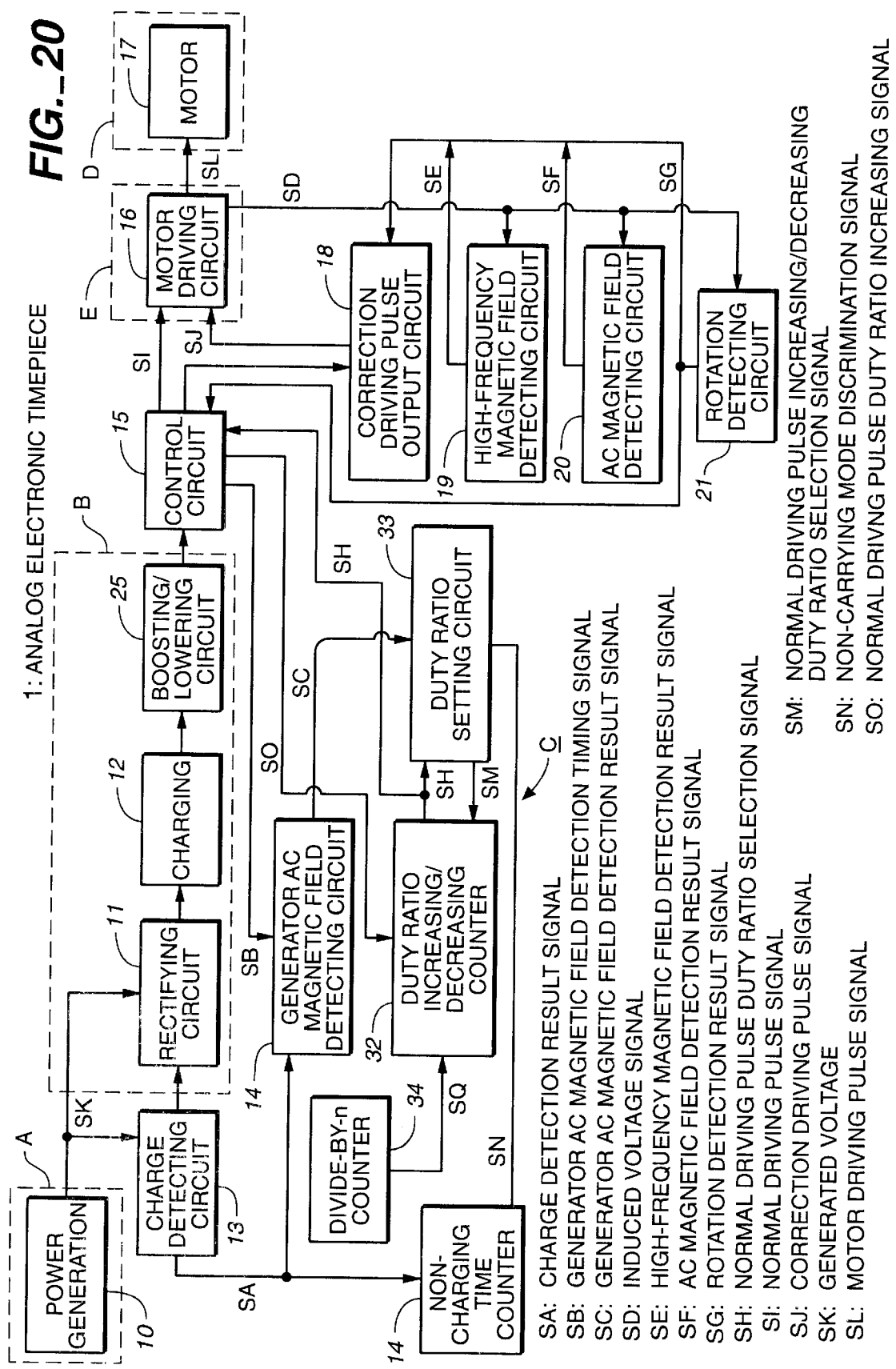

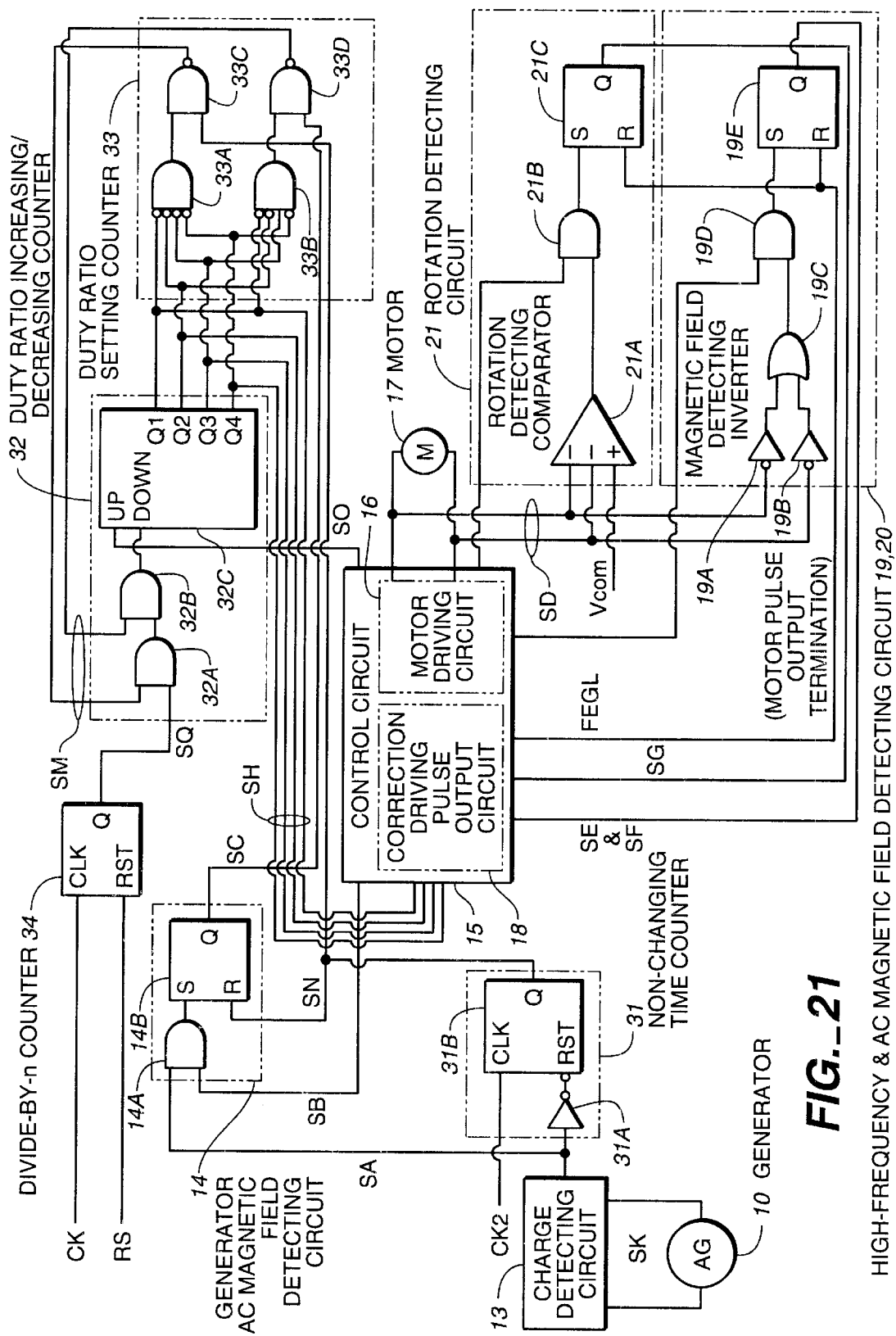
FIG._21

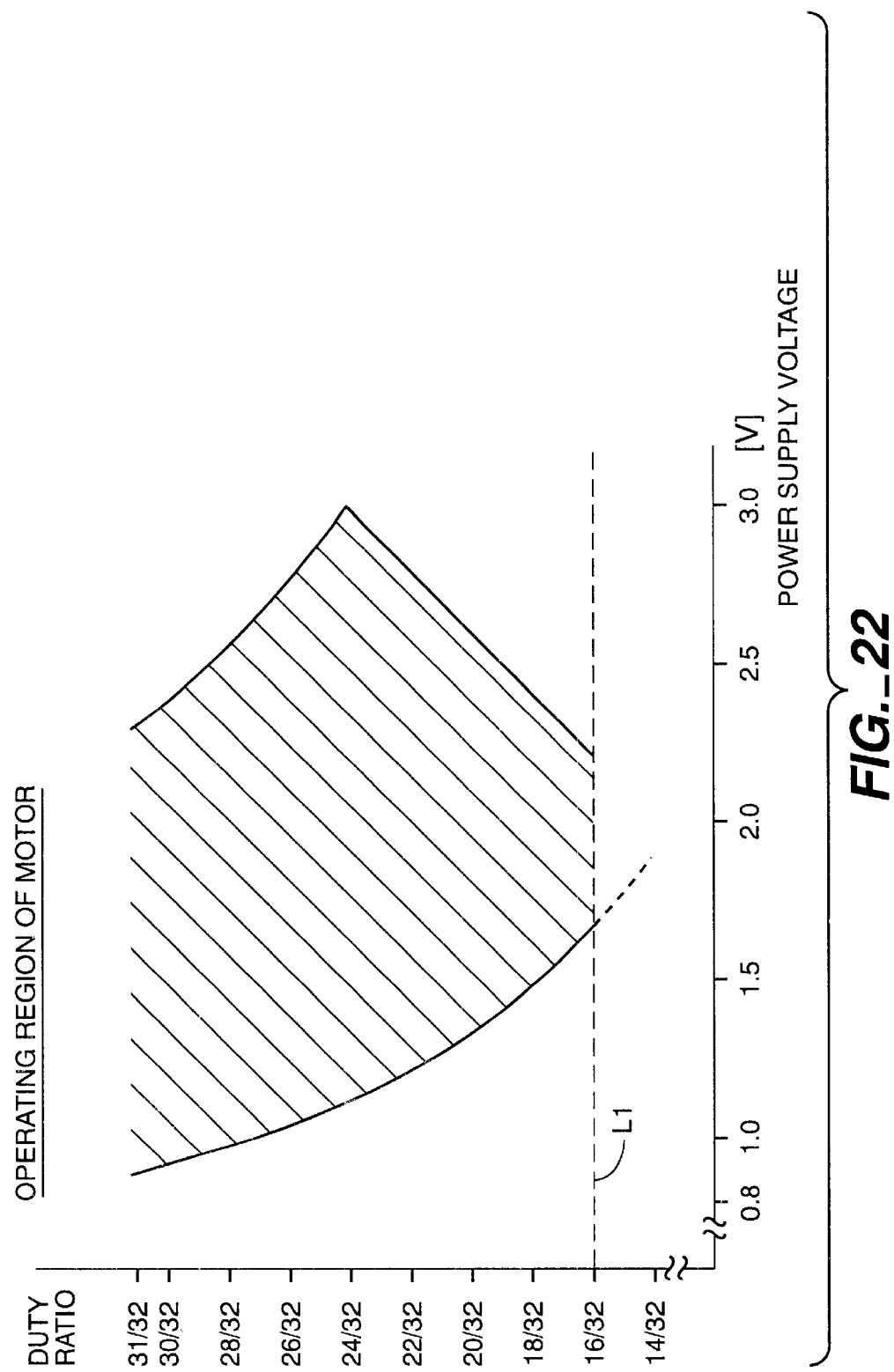
FIG._22

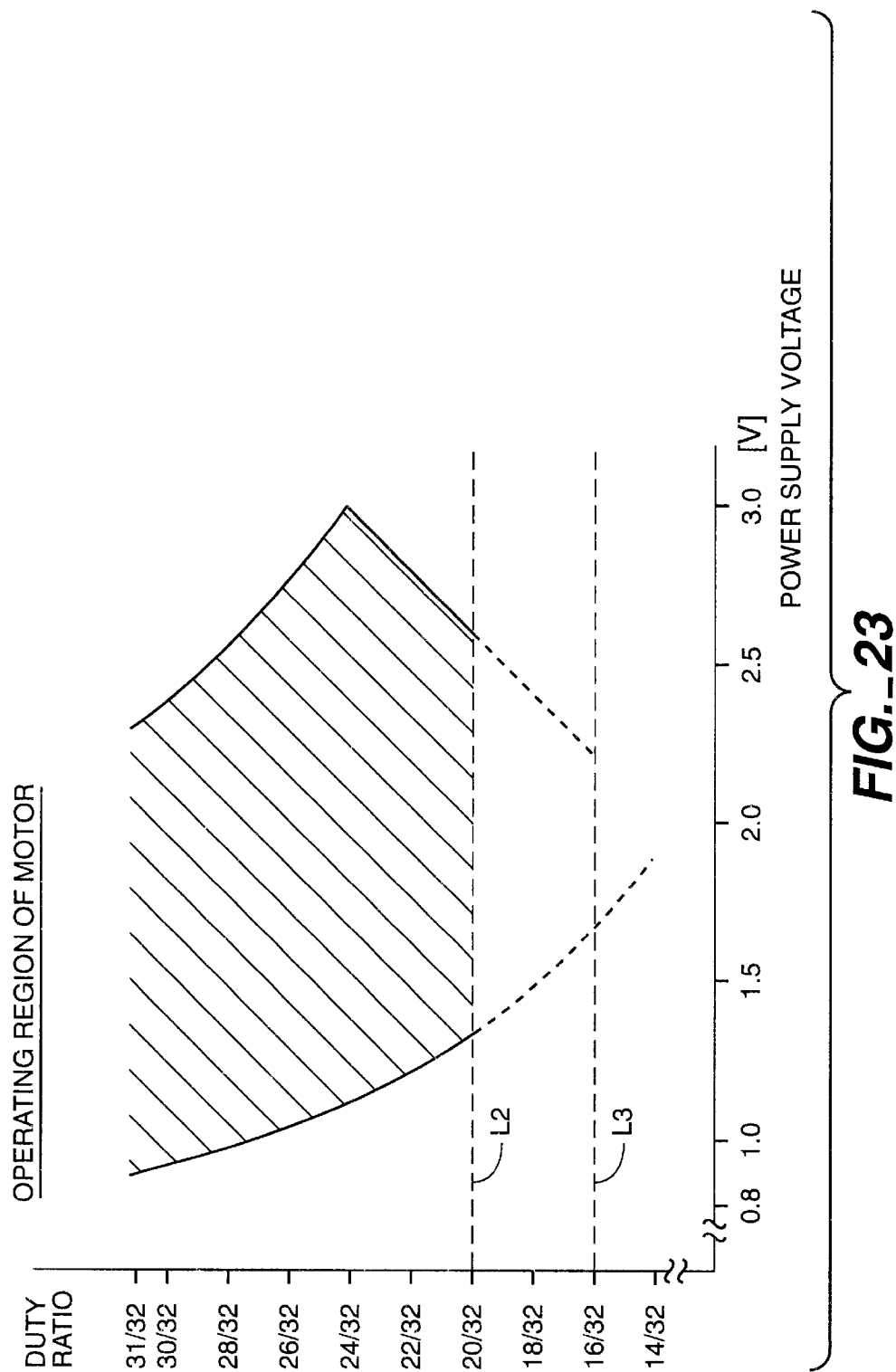
FIG._23

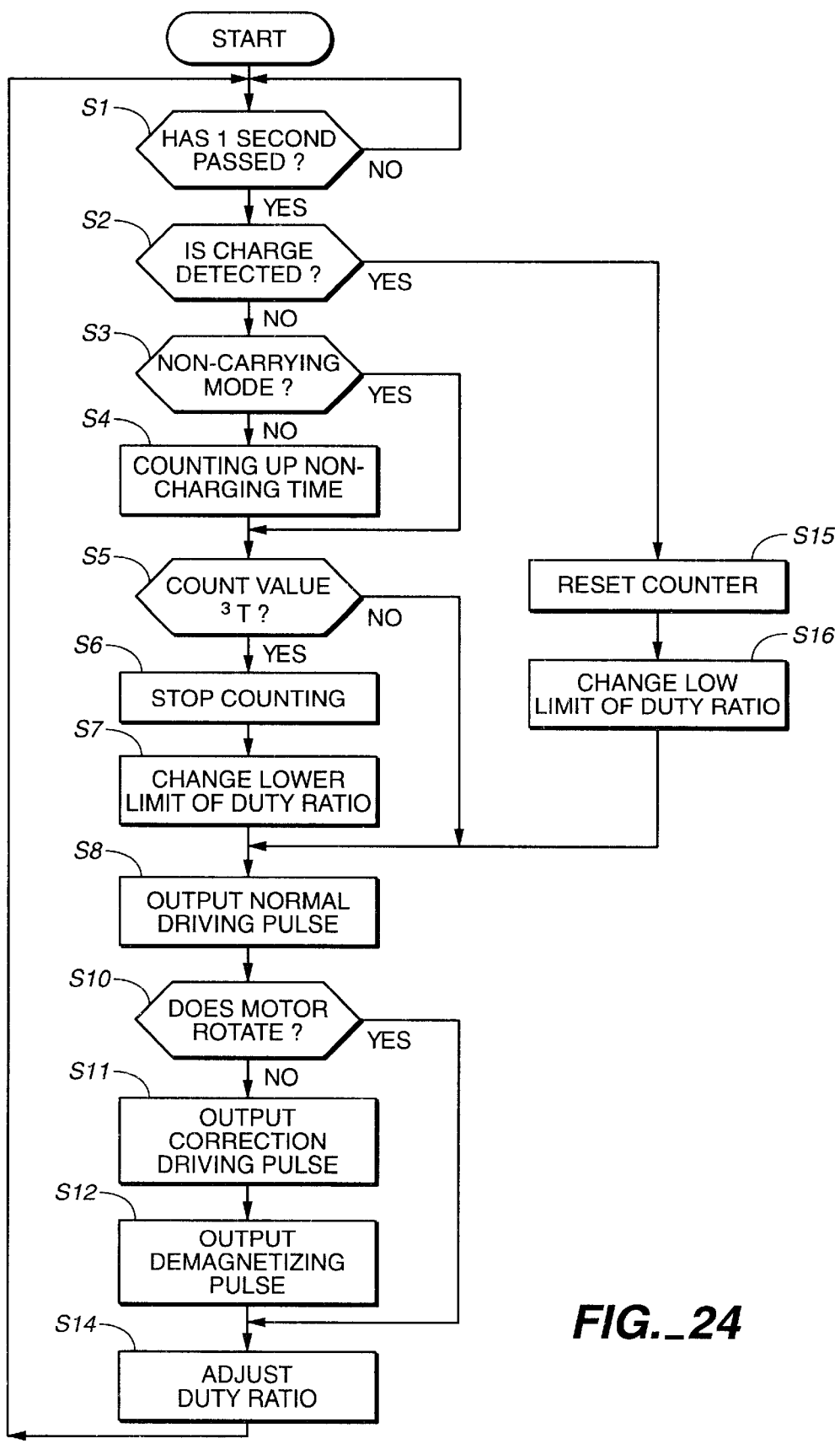
FIG._24

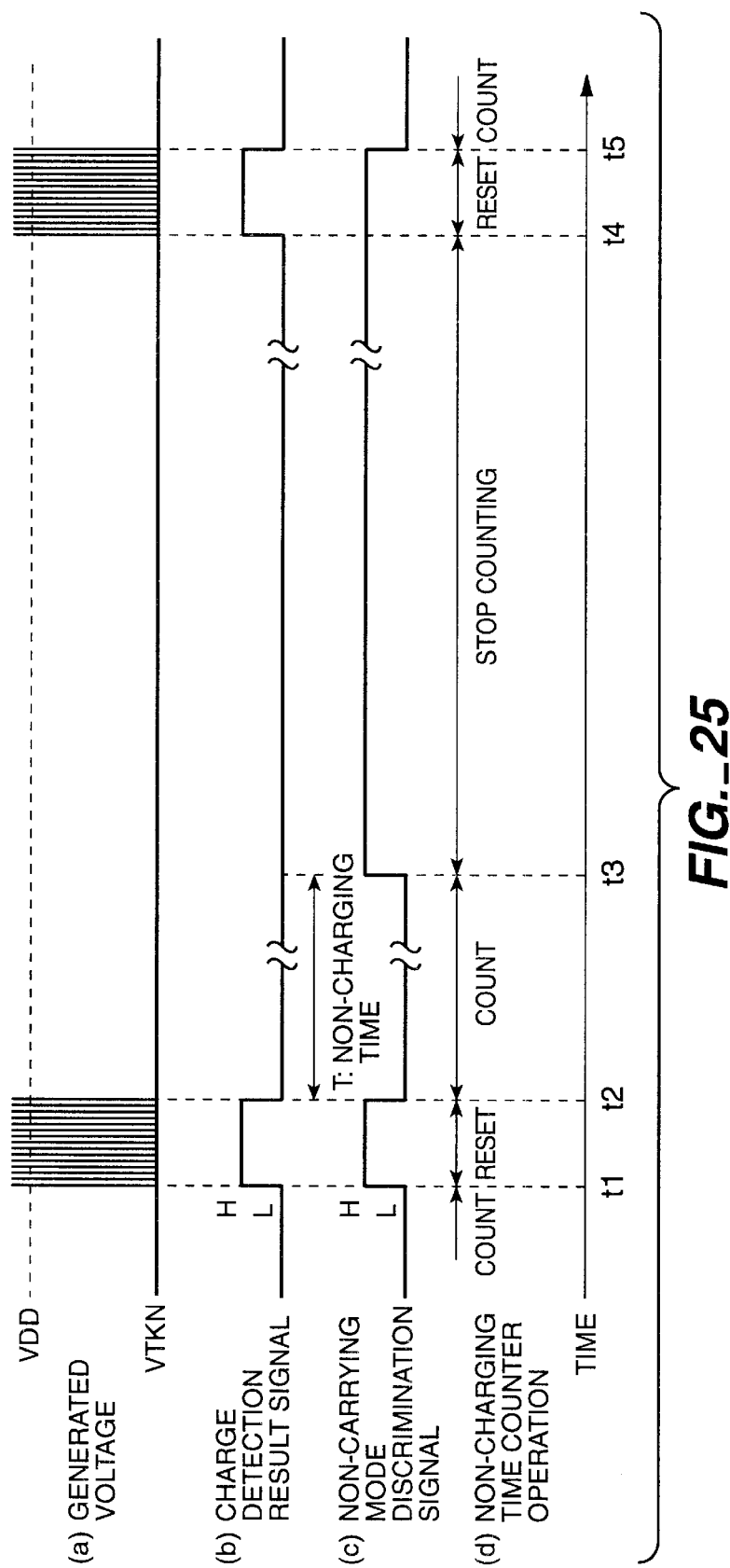
FIG._25

PULSE MOTOR DRIVING DEVICE, PULSE MOTOR DRIVING METHOD, TIMEPIECE DEVICE, AND TIMEPIECE DEVICE CONTROL METHOD

BACKGROUND OF THE INVENTION

1. Technical Field

The present invention relates to a pulse motor driving device, a pulse motor driving method, a timepiece device, and a timepiece device control method, and a-more particularly, to a device for driving a pulse motor used in, for example, an analog timepiece having a magnetic generator, and to a method for driving such a pulse motor, and to a timepiece device, such as an analog timepiece, and to a method for controlling such a timepiece device.

2. Background Art

Recent years have seen remarkable technological innovations in timepiece devices (that is, electronic timepieces), such as a wristwatch. The power consumption of the presently used timepiece devices has come to be suppressed to about 0.5 $\mu W$. Incidentally, the breakdown of power consumption of such a timepiece device is considered as follows. The power consumption of an electric circuit system of the timepiece device is 20 percent of that of the entire device. The power consumption of a pulse motor for moving hands of the device accounts for the remaining 80 percent of that of the entire device. Reduction of the power consumption of this pulse motor is, therefore, considered as the key to a further reduction of the power consumption of the device.

Thus, the conventional timepiece device (or electric timepiece) has a part configured in such a manner as to operate as follows. That is, after supplying a driving current to the pulse motor, the part detects whether or not the pulse motor is actually rotated by the driving current. If not, the timepiece device forces the pulse motor to rotate, and increases a driving current to be supplied thereto the next time. However, after the lapse of a predetermined time, the timepiece device decreases a driving current. Consequently, the effective value of the magnitude of the driving current to be supplied to the pulse motor is a value, at which the frequency of increasing the power consumption of the pulse motor and that of decreasing the power consumption thereof are in balance, that is, a value close to the lowest value of the driving current, at which the pulse motor can rotate, from a macroscopic viewpoint. This enables suppression of excessive power consumption of the pulse motor. Thus, the power consumption of the pulse motor is reduced.

However, recently, it has been pointed out that a magnetic field generated outside the timepiece adversely affects the rotation of the pulse motor. That is, as above described, the effective value of the magnitude of the driving current to be supplied to the pulse motor is obtained as a value, at which the frequency of increasing the power consumption of the pulse motor and that of decreasing the power consumption thereof are in balance, close to the lowest value thereof. When an external magnetic field is applied to the pulse motor, to which the driving current, whose magnitude is the effective value, is supplied, the magnitude of a magnetic field generated by the driving current is reduced, with the result that the pulse motor does not rotate.

Further, recently, electronic timepieces each having a built-in generator for generating electric power are coming on the market. In brief, such a generator converts a reciprocating motion, such as a swinging motion of a hand, to a rotary motion, and then transmits this rotary motion to a magnetized rotor to thereby cause an electromotive force in a coil. Thus, a magnetic field generated in a timepiece body adversely affects the rotation of the pulse motor.

Moreover, the serious influence of the magnetic field is not limited to the fact that the pulse motor does not rotate. As described above, the electronic timepiece has a part adapted to detect whether or not the pulse motor actually rotates, after supplying a driving current to the pulse motor. Although such a detecting part may be constituted by a mechanical device, an electrical device, which detects the rotation of the pulse motor according to whether or not an electric current is induced in the coil thereof as damped oscillations are caused after the rotation thereof, is suitable for such a detecting part, in view of the spatial constraints on the timepiece body.

However, even when the rotation of the pulse motor is electrically detected, if a magnetic field is generated, an induced current caused by the magnetic field is superposed on the coil in addition to the induced current caused due to the damped oscillations. Thus, although the pulse motor does not rotate actually, the detecting part may erroneously detect that the pulse motor rotates.

As described above, to reduce the power consumption of the electronic timepiece, the effective value of the magnitude of the driving current is lowered after the lapse of the predetermined time. When the effective value of the magnitude of the driving current is lowered, naturally, the pulse motor is liable to enter a non-rotation state. Incidentally, the probability of an occurrence of the erroneous detection is represented by a ratio of the frequency of an occurrence of the case, in which the pulse motor is detected as not rotating actually, to the frequency of an occurrence of the case, in which the pulse motor is detected as rotating. Therefore, when the pulse motor is apt to enter the non-rotation state, the numerator of this ratio increases, so that the probability of an occurrence of the erroneous detection rises. Further, when an erroneous detection actually occurs, the forced rotation of the pulse motor is not caused. This has an important influence on the time indication accuracy of the timepiece. That is, the conventional electronic timepiece enabled to reduce the power consumption has a drawback in that such accuracy is extremely deteriorated.

To eliminate this drawback, a first example of the conventional timepiece device, namely, an analog electronic timepiece, which has a generator and is described in the PCT international publication No. WO98/41906 Official Gazette, is adapted to output a correction driving pulse signal, whose effective power level is high, for the purpose of moving hands with reliability, during an operating time for moving hands, in the case that the power generation of the generator is detected. Furthermore, in the case that the correction driving pulse is outputted, a demagnetizing pulse signal is outputted so as to reduce a magnetic field generated in response to the correction driving pulse whose effective power level is high.

Moreover, a second example of the conventional timepiece device, namely, another analog electronic timepiece having a generator, which has a generator and is described in the European Patent Application Publication No. EP-0704774-A1 Official Gazette, is adapted to output a normal driving pulse signal, whose effective power level is lower, by periodically lowering the duty ratio of the normal driving pulse signal so as to reduce the power consumption thereof.

Furthermore, to reduce the power consumption and the electric power of the pulse motor, a normal driving pulse signal, whose number of constituent pulses (hereunder referred to as the "number of teeth") included during a time period for outputting the normal driving pulse signal are reduced and whose effective power level is low, is outputted when it is decided that the voltage of a capacitor is higher than a predetermined voltage. Conversely, when it is decided that the voltage of the capacitor is lower than the predetermined voltage, a normal driving pulse signal, whose "number of teeth" is increased and whose effective power level is high, is outputted. Further, when the "number of teeth" of the normal driving pulse signal should be changed, the "number of teeth" is changed without altering the duty ratio used at the last hand movement.

In the case of the first example of the conventional timepiece device, the effective power level of the correction driving pulse signal is high, so that the power consumption of the pulse motor is large. Especially, the conventional analog electronic timepiece having the generator has a drawback in that a time period, in which hands are continuously moved, is shorten when the number of times of outputting the correction driving pulse signal is large.

Furthermore, the influence of the residual magnetic field sometimes cannot be canceled owing to the high effective power level of the correction driving pulse signal, even when the demagnetizing pulse signal is outputted. Further, in such a case, the loss of a normal driving pulse signal at the next hand movement is decreased owing to the influence of the residual magnetic field, so that the substantial effective power level is lowered. Thus, the probability of an occurrence of the non-rotation state of the hand driving motor is increased. The conventional timepiece device has another drawback in that the probability of an occurrence of what is called a hand movement failure increases, namely, there is an increase in the probability of an occurrence of an erroneous affirmative decision on the rotation of the hand driving motor during the detection of the rotation of this hand driving motor, in spite of the actual non-rotation state of this motor, when noises are generated in the generator, in such a case.

Additionally, in the case of the second example of the conventional timepiece device, the duty ratio is lowered at this alteration thereof even in the case that the duty ratio is set at the lowest limit duty ratio value which is the lower limit value that enables the driving of the hand driving motor at the last alteration of the duty ratio of the normal driving signal. Thus, the conventional timepiece device has another drawback in that the hand driving motor cannot rotate at the next alteration of the duty ratio.

In such a case, a correction driving pulse signal, whose effective power level is high, is outputted so as to ensure reliable hand movement. Thus, the conventional timepiece device has another drawback in that the power consumption of the pulse motor increases and that the probability of an occurrence of the aforementioned hand movement failure.

Furthermore, the aforementioned second example of the conventional timepiece device has the following effects of changing the "number of teeth" of the normal driving pulse signal without changing the duty ratio at the last alteration thereof That is, first, the following first and second curves are assumed in view of the relation between the power supply voltage and the duty ratio in an operating region of the hand driving motor, which is indicated correspondingly to each value of the "number of teeth" of the normal driving pulse signal. Namely, the first curve represents the lower limit value of the power supply voltage at which the hand driving motor operates at each value of the duty ratio when the "number of teeth" of the normal driving pulse signal is a first "number of teeth", while the second curve represents the lower limit value of the power supply voltage at which the hand driving motor operates at each value of the duty ratio when the "number of teeth" of the normal driving pulse signal is a second "number of teeth" (which is less than the first "number of teeth"). In such a case, although it is considered according to the first curve that a duty ratio belongs to an operating region, this duty ratio may belong to a non-operating region when considered according to the second curve.

Therefore, a case, in which the hand driving motor neither operates nor rotates when the "number of teeth" of the normal driving pulse signal is changed, may occur. The conventional timepiece device has another drawback in that the probability of an occurrence of what is called the hand movement failure increases. Namely, there is an increase in the probability of an occurrence of an erroneous affirmative decision on the rotation of the hand driving motor during the detection of the rotation of this hand driving motor, in spite of the actual non-rotation state of this motor, when noises are generated in the generator, in such a case, increases in such a case.

Accordingly, an object of the present invention is to provide a device and method for driving a pulse motor, which can reduce the power consumption of the pulse motor and can enhance the timing accuracy, and a timepiece device employing such a device, and a method for controlling such a timepiece device.

SUMMARY OF THE INVENTION

According to a first aspect of the present invention, there is provided a pulse motor driving device, which comprises a magnetic field detecting unit for detecting a magnetic field in the vicinity of the pulse motor, a control unit for controlling an effective value of the driving power of the pulse motor, and a rotation detecting unit for detecting whether or not the pulse motor rotates. The control unit is adapted to perform an operation of increasing the effective value of the driving power of the pulse motor when it is detected by the rotation detecting unit that the pulse motor does not rotate, and periodically performs an operation of lowering the effective value of the driving power thereof. Further, the control unit is adapted to interrupt the operation of lowering the effective value of the driving power of the pulse motor when a magnetic field is detected by the magnetic detecting unit.

Moreover, the control unit of the device according to the first aspect of the present invention may increase and decrease an effective value of a driving current when the effective value of the driving power is increased and decreased.

Further, the control unit of the device according to the first aspect of the present invention may increase and decrease an effective value of a driving voltage when the effective value of the driving power is increased and decreased.

Furthermore, the control unit of the device according to the first aspect of the present invention may increase and decrease a duty ratio of a driving pulse for driving of the pulse motor when the effective value of the driving power is increased and decreased.

Further, the control unit of the device according to the first aspect of the present invention may increase and decrease the number of driving pulses, which are used for driving the pulse motor, per unit time when the effective value of the driving power is increased and decreased.

Moreover, the control unit of the device according to the first aspect of the present invention may forcedly cause the pulse motor to rotate, when a magnetic field is detected by the magnetic field detecting unit.

Furthermore, the control unit of the device according to the first aspect of the present invention may stop the supply of a drive current, whose effective value is controlled, to the pulse motor, when a magnetic field is detected by the magnetic field detecting unit.

Further, the control unit of the device according to the first aspect of the present invention may forcedly cause the pulse motor to rotate, when it is detected by the rotation detecting unit that the pulse motor does not rotate.

Moreover, the device according to the first aspect of the present invention may have a counting unit for performing a counting operation in a constant cycle. The counting unit may reset a count to an initial value or interrupt a counting operation when a magnetic field is detected by the magnetic detecting unit. The control unit may perform an operation of lowering an effective value of the driving power when the count reaches a predetermined value.

Furthermore, the rotation detecting unit of the device according to the first aspect of the present invention may detect according to electric current induced in a coil of the pulse motor whether not the pulse motor rotates.

Further, the magnetic field detecting unit of the device according to the first aspect of the present invention may detect a magnetic field according to electric current induced in a coil of the pulse motor.

Moreover, the magnetic field detecting unit of the device according to the first aspect of the present invention may detect a magnetic field, which is present in the vicinity of the pulse motor, before a driving current is supplied to the pulse motor. Upon completion of supplying the driving current to the pulse motor, the rotation detecting unit thereof may detect whether or not the pulse motor rotates.

Furthermore, the device according to the first aspect of the present invention may have a power generating unit for generating power and supplying driving power to the pulse motor. The magnetic field detecting unit may detect a magnetic field in the vicinity of the pulse motor by directly or indirectly detecting the state of an electric current, which is caused by generating electric power.

Further, the device according to the first aspect of the present invention may have a power generating unit for generating power and supplying driving power to the pulse motor, and a power storing unit for storing electric power generated by the power generating unit. The magnetic field detecting unit may detect a magnetic field in the vicinity of the pulse motor by directly or indirectly detecting the state of a power storage current, which is caused by storing electric charges in the power storing unit.

Moreover, the magnetic field detecting unit of the device according to the first aspect of the present invention may have a magnetic sensor for detecting a magnetic field in the vicinity of the pulse motor.

According to a second aspect of the present invention, there is provided a pulse motor driving device, which comprises a magnetic field detecting circuit for detecting a magnetic field in the vicinity of a pulse motor, a control circuit for controlling an effective value of the driving power of the pulse motor, and a rotation detecting circuit for detecting whether or not the pulse motor rotates. The control unit is adapted to perform an operation of increasing the effective value of the driving power of the pulse motor and periodically performs an operation of lowering the effective value of the driving power thereof when it is detected by the rotation detecting circuit that the pulse motor does not rotate. Further, the control unit is adapted to interrupt the operation of lowering the effective value of the driving power of the pulse motor when a magnetic field is detected by the magnetic detecting circuit.

Moreover, the rotation detecting circuit of the device according to the second aspect of the present invention may detect according to electric current induced by the rotation of the pulse motor whether not the pulse motor rotates.

Furthermore, the control circuit of the device according to the second aspect of the present invention may increase and decrease an effective value of a driving current when the effective value of the driving power is increased and decreased.

According to a third aspect of the present invention, there is provided a pulse motor driving method, which comprises the steps of detecting a magnetic field in the vicinity of a pulse motor, and controlling an effective value of the driving power of the pulse motor, and detecting whether or not the pulse motor rotates. This method further comprises the steps of performing an operation of increasing the effective value of the driving power of the pulse motor, and periodically performing an operation of lowering the effective value of the driving power thereof when it is detected by the rotation detecting circuit that the pulse motor does not rotate. Further, this method further comprises the steps of interrupting the operation of lowering the effective value of the driving power of the pulse motor when a magnetic field is detected by the magnetic detecting circuit.

Moreover, in the case of the method according to the third aspect of the present invention, an effective value of a driving current may be increased and decreased when the effective value of the driving power is increased and decreased.

Further, in the case of the method according to the third aspect of the present invention, an effective value of a driving voltage may be increased and decreased when the effective value of the driving power is increased and decreased.

Furthermore, in the case of the method according to the third aspect of the present invention, a duty ratio of a driving pulse for driving of the pulse motor may be increased and decreased when the effective value of the driving power is increased and decreased.

Further, in the case of the method according to the third aspect of the present invention may increase and decrease the number of driving pulses, which are used for driving the pulse motor, per unit time when the effective value of the driving power is increased and decreased.

Moreover, in the case of the method according to the third aspect of the present invention, the pulse motor may be forced to rotate, when a magnetic field is detected.

Furthermore, in the case of the method according to the third aspect of the present invention, the supply of a drive current, whose effective value is controlled, to the pulse motor may be stopped, when a magnetic field is detected.

Further, in the case of the method according to the third aspect of the present invention, the pulse motor may be forced to rotate, when it is detected that the pulse motor does not rotate.

Moreover, in the case of the method according to the third aspect of the present invention, a counting operation may be performed in a constant cycle. A count may be reset to an initial value or a counting operation may be interrupted, when a magnetic field is detected. An operation of lowering an effective value of the driving power may be performed when the count reaches a predetermined value.

Furthermore, in the case of the method according to the third aspect of the present invention, it may be detected according to electric current induced in a coil of the pulse motor whether not the pulse motor rotates.

Further, in the case of the method according to the third aspect of the present invention, a magnetic field may be detected according to electric current induced in a coil of the pulse motor.

Moreover, in the case of the method according to the third aspect of the present invention, a magnetic field, which is present in the vicinity of the pulse motor, may be detected before a driving current is supplied to the pulse motor. It may be detected upon completion of supplying the driving current to the pulse motor whether or not the pulse motor rotates.

Furthermore, the method according to the third aspect of the present invention may further comprises the step of generating power so as to supply driving power to the pulse motor. A magnetic field may be detected in the vicinity of the pulse motor by detecting an amount of electric current caused by generating electric power.

Further, the method according to the third aspect of the present invention may further comprise the steps of generating electric power to supply driving power to the pulse motor, and storing the generated electric power, and detecting a magnetic field in the vicinity of the pulse motor by detecting an amount of power storage current, which is caused by generating electric power.

According to a fourth aspect of the present invention, there is provided a timepiece device, which comprises a pulse motor for performing an operation of moving hands, a magnetic field detecting unit for detecting a magnetic field in the vicinity of a pulse motor, a control unit for controlling an effective value of the driving power of the pulse motor, and a rotation detecting unit for detecting whether or not the pulse motor rotates. The control unit is adapted to perform an operation of increasing the effective value of the driving power of the pulse motor and periodically performs an operation of lowering the effective value of the driving power thereof when it is detected by the rotation detecting unit that the pulse motor does not rotate. Further, the control unit is adapted to interrupt the operation of lowering the effective value of the driving power of the pulse motor when a magnetic field is detected by the magnetic detecting unit, and adapted to force the pulse motor to rotate.

Moreover, the control unit of the device according to the fourth embodiment of the present invention may increase and decrease an effective value of a driving current when the effective value of the driving power is increased and decreased.

Further, the rotation detecting unit of the device according to the fourth aspect of the present invention may detect according to electric current induced by the rotation of the pulse motor whether not the pulse motor rotates.

Furthermore, the device according to the fourth aspect of the present invention may further comprise a power generating unit for generating electric power, and use an electromotive force caused by this unit as a driving force for the pulse motor.

Further, the power generating unit of the device according to the fourth aspect of the present invention may have a rotary weight for performing a turn movement, and a power generating element for generating an AC electromotive force by utilizing the turn movement of the rotary weight.

According to a fifth aspect of the present invention, there is provided a timepiece device having a motor, which is driven according to electric power supplied from an electromagnetic generator. This timepiece device comprises an AC magnetic field detecting unit for detecting an AC magnetic field generated around the electromagnetic generator, and a duty ratio control unit for controlling a duty ratio to be used to drive the motor according to a result of a detection by the AC magnetic field detecting unit. The duty ratio control unit has a duty ratio setting unit adapted to maintain the duty ratio of a normal driving pulse signal at a currently set value or set the duty ratio at a value, which is higher than the currently set value, when an AC magnetic field is detected by the AC magnetic field detecting unit.

Further, the device according to the fifth aspect of the present invention may further comprises a power storing unit for storing electric power supplied from the electromagnetic generator, and a charge detecting unit for detecting charging of the power storing unit. The AC magnetic field detecting unit detects an AC magnetic filed generated around the electromagnetic generator when the charge detecting unit detects a charge in a predetermined time period for detection.

Moreover, the device according to the fifth aspect of the present invention may further comprises a rotation detecting unit for detecting whether or not the motor rotates, and a correction driving pulse output unit for outputting a correction driving pulse signal, whose effective power level is higher than that of the normal driving pulse signal, when it is detected that the motor does not rotate.

Furthermore, the device according to the fifth aspect of the present invention may further comprise a demagnetizing pulse output unit for outputting a demagnetizing pulse signal to be used to demagnetize a residual magnetic field caused by the correction driving pulse signal that is outputted by the correction driving pulse signal output unit.

Further, in the case of the device according to the fifth aspect of the present invention, a start time of the predetermined time period for detection is a demagnetizing-pulse outputting moment, at which a demagnetizing pulse signal is outputted in the last hand movement operation time period, or included in a time period from a moment, which is just after the demagnetizing-pulse outputting moment, to a moment just before a normal driving pulse signal is outputted in a current hand movement operation time period. Moreover, a termination time of the predetermined time period for detection is included in a time period from the moment, which is just before a normal driving pulse signal is outputted in the current hand movement operation time period, to a moment just after the normal driving pulse signal is outputted.

Furthermore, the duty ratio setting unit of the device according to the fifth aspect of the present invention may maintain the duty ratio of a pulse, which is not outputted yet, at a currently set value or set the duty ratio of the pulse, which is not outputted yet, at a value that is higher than the currently set value.

Further, the device according to the fifth aspect of the present invention may further comprises a voltage detecting unit for detecting the voltage of the power storing unit, and a teeth number selection unit for selecting and changing the number of pulses of a normal driving pulse signal to be outputted in a time period therefor by comparing the voltage detected by the voltage detecting unit with a predetermined reference voltage.

Moreover, the teeth number selection unit of the device according to the fifth aspect of the present invention may select one of two numbers of pulses, which are switched from each other according to whether or not the detected voltage is higher than the reference voltage. That is, the teeth number selection unit selects a larger one of the two number of pulses when the detected voltage is lower than the reference voltage. Furthermore, the teeth number selection unit selects a smaller one of the two number of pulses when the detected voltage is higher than the reference voltage.

Furthermore, in the case of the device according to the fifth aspect of the present invention, a normal driving pulse signal corresponding to a larger one of the two numbers of pulses, which are to be switched from each other according to whether or not the detected voltage is higher than the reference voltage, is set in such a manner as to have a higher effective power level than that of a normal driving pulse signal corresponding to a smaller one of the two numbers of pulses.

According to a sixth aspect of the present invention, there is provided a timepiece device control method for controlling a timepiece device having a motor driven according to electric power, which is supplied from an electromagnetic generator. This method comprises the AC magnetic field detecting step of detecting an AC magnetic filed generated around the electromagnetic generator, and the duty ratio control step of controlling the step of controlling a duty ratio of a normal driving pulse signal, which is used for driving the motor, according to a result of detecting a magnetic field at the AC magnetic field detecting step. The duty ratio control step has a duty ratio setting step of maintaining the duty ratio of the normal driving pulse signal at a current set value or setting the duty ratio thereof at a value higher than the currently set value when an AC magnetic field is detected at the AC magnetic field detecting step.

Further, the timepiece device control method for controlling the timepiece device, which has a power storing unit for storing electric power supplied from the electromagnetic generator, according to the sixth aspect of the present invention further comprises a charge detecting step of detecting charging of the storing device. The AC magnetic field detecting step comprises a step of detecting an AC magnetic field generated around the electromagnetic generator when charging is detected in the predetermined time period for detection at the charge detecting step.

Moreover, the timepiece device control method according to the sixth aspect of the present invention may further have a rotation detecting step of detecting whether or not the motor rotates, and a correction driving pulse output step of outputting a correction driving pulse signal, whose effective power level is higher than that of the normal driving pulse signal, when it is detected that the motor does not rotate.

Furthermore, the method according to the sixth aspect of the present invention may further comprise a demagnetizing pulse output step of outputting a demagnetizing pulse signal to be used to demagnetize a residual magnetic field caused by the correction driving pulse signal that is outputted at the correction driving pulse signal output step.

Further, in the case of the method according to the sixth aspect of the present invention, a start time of the predetermined time period for detection is a demagnetizing-pulse outputting moment, at which a demagnetizing pulse signal is outputted in the last hand movement operation time period, or included in a time period from a moment, which is just after the demagnetizing-pulse outputting moment, to a moment just before a normal driving pulse signal is outputted in a current hand movement operation time period. Moreover, a termination time of the predetermined time period for detection is included in a time period from the moment, which is just before a normal driving pulse signal is outputted in the current hand movement operation time period, to a moment just after the normal driving pulse signal is outputted.

Furthermore, the duty ratio setting step of the method according to the sixth aspect of the present invention may have a step of maintaining the duty ratio of a pulse, which is not outputted yet, at a currently set value or setting the duty ratio of the pulse, which is not outputted yet, at a value that is higher than the currently set value.

Further, the method according to the sixth aspect of the present invention may further comprises a voltage detecting step of detecting the voltage of the power storing unit, and a teeth number selection step of selecting and changing the number of pulses of a normal driving pulse signal to be outputted in a time period therefor by comparing the voltage detected at the voltage detecting step with a predetermined reference voltage.

Moreover, the teeth number selection step of the method according to the sixth aspect of the present invention may have a step of selecting one of two numbers of pulses, which are switched from each other according to whether or not the detected voltage is higher than the reference voltage. That is, the teeth number selection step may have a step of selecting a larger one of the two number of pulses when the detected voltage is lower than the reference voltage. Furthermore, the teeth number selection step may have a step of selecting a smaller one of the two number of pulses when the detected voltage is higher than the reference voltage.

Furthermore, in the case of the method according to the sixth aspect of the present invention, a normal driving pulse signal corresponding to a larger one of the two numbers of pulses, which are to be switched from each other according to whether or not the detected voltage is higher than the reference voltage, is set in such a manner as to have a higher effective power level than that of a normal driving pulse signal corresponding to a smaller one of the two numbers of pulses.

According to a seventh aspect of the present invention, there is provided a timepiece device having a motor, which is driven according to electric power supplied from an electromagnetic generator. This timepiece device comprises a power storing unit for storing electric power supplied from the electromagnetic generator, a charge detecting unit for detecting charging of the power storing unit, and a duty ratio setting unit for setting a duty ratio of a normal driving pulse to be outputted to the motor at a value that is not less than a value of a predetermined set lower limit duty ratio, which is higher than a lowest duty ratio, which has a lowest value for driving the motor, when charging is detected by the charge detecting unit.

Further, the device according to the seventh aspect of the present invention may further comprises a motor rotation detecting unit for detecting whether or not the motor rotates. Moreover, this device performs an operation of lowering the effective power of a normal driving pulse signal when a rotation of the motor is detected by the motor rotation detecting unit, while this device performs an operation of increasing the effective power of a normal driving signal when it is detected by the motor rotation detecting unit that the motor does not rotate.

Furthermore, the rotation detecting unit of the device according to the seventh aspect of the present invention detects according to electric current induced by the rotation of the pulse motor whether or not the pulse motor rates.

According to an eighth aspect of the present invention, there is provided a timepiece device having a motor, which is driven according to electric power supplied from an electromagnetic generator. This timepiece device comprises a power storing unit for storing electric power supplied from the electromagnetic generator, and a duty ratio setting unit for setting a duty ratio of a normal driving pulse to be outputted to the motor at a value that is not less than a value of a predetermined set lower limit duty ratio, which is higher than a lowest duty ratio, which has a lowest value for driving the motor, when charging is detected by the charge detecting unit.

Further, the device according to the eighth aspect of the present invention further comprises a non-charging time counter unit for counting a non-charging time according to a result of a detection by a charge detecting unit and for stopping counting the non-charging time when the counted non-charging time is not less than a predetermined time.

Moreover, in the device according to the eighth aspect of the present invention, the non-charging time counter unit may output a carrying mode setting signal, which indicates that the timepiece device is in a carrying mode, when the counted non-charging time is less than the predetermined time. Further, the duty ratio setting unit may set the duty ratio at a value, which is not less than the set lower limit duty ratio, when the carrying mode setting signal is inputted thereto.

Furthermore, in the device according to the eighth aspect of the present invention, the non-charging time counter unit may output a non-carrying mode setting signal, which indicates that the timepiece device is in a carrying mode, when the counted non-charging time is not less than the predetermined time. Further, the duty ratio setting unit may set the duty ratio at a value, which is not less than the set lower limit duty ratio, when the non-carrying mode setting signal is inputted thereto.

Moreover, the duty ratio setting unit of the device according to the eighth aspect of the present invention may change the set lower limit duty ratio to a second set lower limit duty ratio, which is lower than the former set lower limit duty ratio and is not less than the lowest duty ratio, when the non-charging time counted by the non-charging time counter unit is not less than the predetermined time.

Further, the device according to the eighth aspect of the present invention may further comprises a rotation detecting unit for detecting whether or not the motor rotates, and a correction driving pulse output unit for outputting a correction driving pulse signal, whose effective power level is higher than that of the normal driving pulse signal, when it is detected that the motor does not rotate.

According to a ninth aspect of the present invention, there is provided a timepiece device control method for controlling a timepiece device, which is adapted to drive the motor according to electric power supplied from an electromagnetic generator and has a power storing unit for storing electric power supplied therefrom, comprises a charge detecting step of detecting charging of the power storing unit, and a duty ratio setting step of setting a duty ratio of a normal driving pulse signal to be outputted to the motor and setting the duty ratio at a predetermined value being higher than the lowest duty ratio, which has a lowest value for driving the motor, when charging is detected at the charge detecting step.

Further, the method according to the ninth aspect of the present invention further comprises a non-charging time counter step of counting a non-charging time according to a result of a detection by the charge detecting step and stopping counting the non-charging time when the counted non-charging time is not less than a predetermined time.

Moreover, in the method according to the ninth aspect of the present invention, the non-charging time counter step may have a step of outputting a carrying mode setting signal, which indicates that the timepiece device is in a carrying mode, when the counted non-charging time is less than the predetermined time. Further, the duty ratio setting step may have a step of setting the duty ratio at a value, which is not less than the set lower limit duty ratio, when the carrying mode setting signal is inputted thereto.

Furthermore, in the method according to the ninth aspect of the present invention, the non-charging time counter step may have a step of outputting a carrying mode setting signal, which indicates that the timepiece device is in a noncarrying mode, when the counted non-charging time is less than the predetermined time. Further, the duty ratio setting step may have a step of setting the duty ratio at a value, which is not less than the set lower limit duty ratio, when the noncarrying mode setting signal is inputted thereto.

Furthermore, the duty ratio setting step of the method according to the ninth aspect of the present invention may have a step of changing the set lower limit duty ratio to a second set lower limit duty ratio, which is lower than the former set lower limit duty ratio and is not less than the lowest duty ratio, when the non-charging time counted by the non-charging time counter unit is not less than the predetermined time.

Moreover, the method according to the ninth aspect of the present invention may further comprises a rotation detecting step of detecting whether or not the motor rotates, and a correction driving pulse output step of outputting a correction driving pulse signal, whose effective power level is higher than that of the normal driving pulse signal, when it is detected that the motor does not rotate.

BRIEF DESCRIPTION OF DRAWINGS

FIG. 1 is a block diagram illustrating the electrical configuration of a timepiece device (namely, an electronic timepiece), to which a pulse motor driving circuit of the present invention is applied, according to a first embodiment of the present invention.

FIG. 2 is a perspective diagram illustrating a power generator of the timepiece device, which is the first embodiment of the present invention.

FIG. 3 is a diagram illustrating the configuration of a processing circuit of the timepiece device, which is the first embodiment of the present invention.

FIG. 4 is a diagram illustrating the configuration of a driver of the processing circuit of the first embodiment of the present invention.

FIG. 5 is a timing chart illustrating an operation of a control circuit of the a processing circuit of the first embodiment of the present invention.

FIG. 6 is a flowchart illustrating the operation of the control circuit of the processing circuit of the first embodiment of the present invention.

FIG. 7 is a timing chart illustrating an operation of a frequency divider, which is performed upon completion of canceling the reset thereof, in the processing circuit of the first embodiment.

FIG. 8 is a diagram illustrating the entire configuration of an analog electronic timepiece, which is a second embodiment of the present invention.

FIG. 9 is a schematic block diagram illustrating the configuration of the analog electronic timepiece, which is the second embodiment of the present invention.

FIG. 10 is a diagram illustrating the configuration of a charge detecting circuit and circuits provided therearound in the second embodiment.

FIG. 11 is a block diagram illustrating the detailed configuration of a control system of the analog electronic timepiece, which is the second embodiment of the present invention.

FIG. 12 is a process flowchart illustrating an operation of the second embodiment of the present invention.

FIG. 13 is a timing chart illustrating the operation of the second embodiment of the present invention.

FIG. 14 is a schematic block diagram illustrating the configuration of an analog electronic timepiece, which is a third embodiment of the present invention.

FIG. 15 is a block diagram illustrating the detailed configuration of a control system of the analog electronic timepiece, which is the third embodiment of the present invention.

FIG. 16 is a diagram illustrating the "number of teeth" of a normal driving pulse signal.

FIG. 17 is a process flowchart illustrating an operation of the third embodiment of the present invention.

FIG. 18 is a (first) diagram illustrating hand driving motor operating regions of the third embodiment of the present invention by showing the relation a power supply voltage and a duty ratio.

FIG. 19 is a (second) diagram illustrating the hand driving motor operating regions of the third embodiment of the present invention by showing the relation the power supply voltage and the duty ratio.

FIG. 20 is a schematic block diagram illustrating the configuration of an analog electronic timepiece, which is a fourth embodiment of the present invention.

FIG. 21 is a block diagram illustrating the detailed configuration of a control system of the analog electronic timepiece, which is the fourth embodiment of the present invention.

FIG. 22 is a (first) diagram illustrating hand driving motor operating regions of the fourth embodiment of the present invention by showing the relation a power supply voltage and a duty ratio.

FIG. 23 is a (second) diagram illustrating the hand driving motor operating regions of the fourth embodiment of the present invention by showing the relation the power supply voltage and the duty ratio.

FIG. 24 is a process flowchart illustrating an operation of the fourth embodiment of the present invention.

FIG. 25 is a timing chart illustrating the operation of the fourth embodiment of the present invention.

DETAILED DESCRIPTION OF THE INVENTION

Next, a detailed description of the present invention will be described hereinbelow by referring to the accompanying drawings.

(1) First Embodiment

First, a first embodiment of the present invention will be described as follows.

(1.1) Entire Configuration of Electronic Timepiece (or Timepiece Device)

FIG. 1 is a block diagram illustrating the electrical configuration of an electronic timepiece, to which a driving circuit of the present invention is applied, according to the first embodiment of the present invention.

The configuration of this electronic timepiece is outlined as follows. First, a secondary power supply 130 is charged by rectifying an AC electromotive force generated between both terminals AG1 and AG2 of a coil 110.

Subsequently, the voltage of the secondary power supply 130 is boosted by a boosting circuit 140, if necessary. Then, this voltage is charged into an auxiliary capacitor 150.

Further, the voltage supplied from the auxiliary capacitor 150 is used as a power supply voltage Vss of a power supply for each part of the processing circuit 200.

Incidentally, the processing circuit 200 consists of a pulse motor, which is used for moving hands so as to perform a time display function, and a driving circuit therefor, as will be described later.

(1.2) Constitution of Each Part of Electronic Timepiece

Next, each of parts of the electronic timepiece is described hereinbelow.

First, a power generator including the coil 110 is described hereunder.

As shown in FIG. 2, the power generator 100 has a stator 112, around which the coil 110 is wound, and a two-pole magnetized disk-like rotor 114.

When a user wearing an electronic timepiece first holds the timepiece by his hand and then swings the timepiece, a rotary weight 116 performs a turning movement. This movement causes a wheel train assembly 118 to rotate the rotor 114.

Thus, according to the power generator 100, AC electromotive forces are generated by the turning movement of the rotary weight 116 between the terminals AG1 and AG2 of the coil 110.

Referring back to FIG. 1, the terminal AG1 of the coil 110 is grounded, namely, connected to a reference level Vdd through a diode D1 and also connected to both of the drain of an n-channel field effect transistor 121 and the gate of a transistor 122 of the same type.

On the other hand, the other terminal AG2 of the coil 110 is grounded through a diode D2 and connected to both of the drain of the transistor 122 and the gate of the transistor 121.

Further, the higher-voltage side of each of the secondary power supply 130 and the boosting circuit 140 is grounded, while the lower-voltage side thereof, which has a voltage level Vtk, is connected to the source of each of transistors 121 and 122.

Although the first embodiment employs a negative power supply, needless to say, a positive power supply may be employed.

Incidentally, in the case that the electric potential at the terminal AG1 of the coil 110 is sufficiently higher than the potential at the terminal AG2 thereof as a result of power generation by the generator 100, the transistor 121 is turned off, while the transistor 122 is turned on. Thus, electric current flows through a closed loop from the terminal AG1, through the diode D1, the secondary power supply 130, the transistor 122, and the terminal AG2, back into the terminal AG1. Consequently, the secondary power supply 130 is charged.

Conversely, in the case that the electric potential at the terminal AG2 of the coil 110 is sufficiently higher than the potential at the terminal AG1 thereof, the transistor 121 is turned on, while the transistor 122 is turned off. Thus, electric current flows through a closed loop from the terminal AG2, through the diode D2, the secondary power supply 130, the transistor 121, and the terminal AG1, back into the terminal AG2. Thus, similarly, the secondary power supply 130 is charged.

Thus, the AC power signals generated at both terminals AG1 and AG2 of the coil 110 are full-wave rectified, so that the secondary power supply 130 is efficiently charged.

Incidentally, a limiter circuit 160 prevents the secondary power supply 130 from being overcharged and overdischarged. Particularly, when the voltage of the secondary power supply 130 boosted by charging thereof is not less than a rated value, this circuit is brought into an energized state and bypasses a charging current.

(1.3) Configuration of Processing Circuit

Next, the configuration of the processing circuit 200 is described as follows with reference to FIG. 3.

As shown in FIG. 3, the processing circuit 200 consists of a pulse motor 210 and a driving circuit 220 therefor. The pulse motor 210 is constituted so that main magnetic poles 212 and 213 are disposed in such a way as to sandwich the rotor 211 and to face each other. These main magnetic poles 212 and 213 are connected to a yoke 215, around which a coil 214 is wound, and constitute a pair of stators.

Incidentally, circular-arc portions 212a and 213a of the main magnetic poles 212 and 213 are eccentric to the center of rotation of the rotor 211. Thus, the magnetic pole position of the rotor 211 at rest is eccentric to the main magnetic poles 212 and 213.

Furthermore, in the case of this pulse motor 210, electric currents flows alternately from the terminal T1 to the terminal T2 and vice versa every 1 second in response to a driving pulse (to be described later). Thus, N-pole and S-pole are alternately formed at the main magnetic poles 212 and 213. Therefore, the magnetic pole of the rotor 211 repels and attracts the main magnetic poles 212 and 213 each time when N and S poles are alternately formed at each of the main magnetic poles 212 and 213. Consequently, the rotor 211 turns 180 degrees every second. Further, this turn of the rotor 211 is transmitted to each of the second hand, the minute hand, and the hour hand of the electronic timepiece through the wheel train (not shown). Thus, the time of day is displayed.

On the other hand, the driving circuit 220 is constituted by a plurality of constituent elements. Among such constituent elements, the control circuit 230 is operative to control an operation of driving the pulse motor 210. Thus, the control circuit 230 has a driver 232, whose constitution is described hereunder by referring to FIG. 4. One T1 of the terminals of the coil 214 is connected to the reference level voltage Vdd through a resistor Ri and a transistor STr1, and grounded through a transistor Ptr1, and also connected to the power supply voltage Vss through a transistor Ntr1. Similarly, the other terminal T2 of the coil 214 is grounded through a resistor R2 and a transistor Str2, and also grounded through a transistor Ptr2, and connected to the power supply voltage Vss through a transistor Ntr2.

Incidentally, for brevity of description, let SG1, SG2, PG1, PG2, NG1, and NG2 denote the gate signals of the transistors Str1, Str2, Ptr1, Ptr2, Ntr1, and Ntr2, respectively. These gate signals are used as driving pulses for the pulse motor 210, and used for detecting a magnetic field and a rotation of the motor, under the control of the control circuit 230.

Turning back to FIG. 3, a signal is inputted from the terminal T1 of the coil 214 to a terminal of an OR gate 243 through an inverter 241. Further, a signal is inputted from the other terminal T2 of the coil 214 to the other terminal of the OR gate 243 through an inverter 242. A signal CSP1 is supplied from the control circuit 230 to one of the terminals of an AND gate 244. Further, an output signal of the OR gate 243 is supplied to the other terminal of the AND gate 244. Moreover, an output signal of the AND circuit 244 is applied to the set terminal of a latch circuit 245. Furthermore, a hold signal is supplied from the latch circuit 245 to the control circuit 230. On the other hand, the latch circuit 245 is reset by a signal FEGL outputted from the control circuit 230.

Incidentally, when a signal CSP1 is active, the signal level of an output signal of the AND gate 244 is "H" level. This is the case that the level of the voltage at least one of the terminals T1 and T2 of the coil 214 is lower than a threshold voltage of the inverters 214 and 242. In such a case, electric current is induced in the coil 214 by a magnetic field generated in the vicinity of the pulse motor 210, as will be described later.

Thus, an output signal of the AND gate 244 is applied to the set terminal of the latch circuit 245. Further, even if the output signal has "H" level for a short time, the latch circuit 245 holds this signal and posts the generation of the magnetic field to the control circuit 230. With this configuration, when the signal CSP1 is active, the control circuit 230 can recognize whether or not a magnetic field is generated in the vicinity of the pulse motor 210.

On the other hand, a comparator 251 compares the voltage level at the terminal T1 or T2 of the coil 214 with a detection level Vcom, and then outputs a signal representing a result of such comparison. A signal CSP2 outputted from the control circuit 230 is supplied to one of the terminals of an AND gate 254. On the other hand, an output signal of the comparator 251 is supplied to the other terminal of the AND gate 254. Further, an output signal of the AND gate 254 is set at the set terminal of a latch circuit 255. On the other hand, a hold signal is supplied from the latch circuit 255 to the control circuit 230. The hold signal is reset by a signal FEGL outputted from the control circuit 230.

Incidentally, the signal level of the output signal of the AND gate 254 becomes "H" level when the signal CSP2 is active, that is, when the level of the voltage at the terminal T1 or T2 of the coil 214 is lower than the detected level Vcom. Such a case is briefly described hereinbelow. When the rotor 211 is rotated in response to a driving pulse, an induced current flows in a direction opposite to the direction of flow of electric current caused in response to the driving pulse. When the negative level of a voltage converted from the induced current and amplified by voltage amplification (namely, a voltage obtained by what is called chopper amplification) is lower than the detected level Vcom, it is detected that the rotor 211 actually rotates. Thus, an output signal of the AND gate 254 is applied to the set terminal of the latch circuit 255. Even if such a signal has "H" level only for a short time, the latch circuit 255 holds this signal, and posts the rotation of the rotor 211 to the control circuit 230. With this constitution, when the signal CSP2 is active, the control circuit 230 can recognize whether or not the rotor 211 actually rotates.

Incidentally, the signal FEGL is a pulse signal supplied after the pulse motor 230 turns 180 degrees corresponding to one second. Thus, the latch circuits 245 and 255 are reset and prepared for the next detection of a magnetic field or rotation of the rotor.

On the other hand, as illustrated in FIG. 7, a clock signal CK having a period of 10 seconds is inputted to the frequency divider 270, which performs divide-by-8 frequency division on the inverted signal at a trailing edge thereof. Thus, an output signal Q of the frequency divider 270 usually rises every 80 seconds. Incidentally, the frequency divider 270 is reset in response to an output signal of the OR gate 260. Thus, when the signal level of a signal RS is "H" level, or when the signal level of an output signal of the latch circuit 245 is "H" level, the count is reset.

Next, an up/down counter 280 performs a down-counting operation at each leading edge of the output signal Q of the frequency divider 270, while the counter 280 performs an up-counting operation at each leading edge of a signal US outputted from the control circuit 230. Then, the counter 280 supplies a 4-bit signal, which represents a result of the counting operation, to the control circuit 230. The control circuit 230 sets the width of the driving pulse according to the result of the counting operation, and controls the effective value of the magnitude of the current corresponding to the pulse motor.

Incidentally, a signal RS becomes active in a reset time period for correcting a time-of-day. An object of use of such a signal is to prevent the effective value of the magnitude of the current, which is optimally determined, from being lowered a value corresponding to one rank as a result of a down-counting performed by the up/down counter 280 even when the time-of-day is corrected, unless the counting operation of the frequency divider 270 is reset.

(1.4) Operation of Control Circuit

Next, an operation of the control circuit 230 is described hereinbelow with reference to the timing chart of FIG. 5 and the flowchart of FIG. 6. Incidentally, in FIG. 5, all output pulses are shown only for exemplifying an operation of the control circuit. Thus, it is not intended to indicate that the illustrated pulses are always outputted.

Referring now to FIG. 5, the control circuit 230 alternately drives the terminals T1 and T2 of the coil 241 of the pulse motor 210 every second. Thus, for convenience of description, first, the case of driving the terminal T1 is described hereinbelow.

First, at a moment t11 preceding a moment t12, at which the hands are moved, a result of a decision made in step Sa1 becomes "YES".

Thus, the control circuit 230 changes the signal level of the gate signal PG1 to "H" level so as to determine whether or not a high-frequency magnetic field is generated in the vicinity of the pulse motor 210, that is, whether or not a magnetic field due to a commercial power supply is generated. Then, the control circuit 230 starts outputting sampling pulses SP0 (at step Sa2) and increases the signal level of the signal CSP1 (see FIG. 3) to "H" level, so that the signal CSP1 becomes active.

Incidentally, the "high-frequency magnetic field" referred to herein (and similarly referred to in the following description) is a spike-like electromagnetic noise, such as a noise (what is called a switching noise) irregularly occurring when the switches of household electrical appliances are turned on or off or when a temperature controller of an electric blanket is operated.

Thus, the transistor Ptr1 of FIG. 4 is turned off. However, if a high-frequency magnetic field is generated in the vicinity of the pulse motor 210 in this state, electric current is induced in the coil 214 owing to the generated magnetic field. Therefore, the level of the voltage at the terminal T1 is pulled-in toward a negative-level side according to the induced current. Conversely, if no high-frequency magnetic field is generated, the level of the voltage at the terminal T1 is not pulled-in toward the negative-level side.

Incidentally, if the level of the voltage Vrs0 pulled-in toward the negative-level side is less than a threshold voltage of the inverter 241 (see FIG. 3), the signal level of an output signal of the OR gate 243 becomes "H" level. This output signal is held by the latch circuit 245 through the AND gate 244 enabled in response to the signal CSP1.

Then, if the hold signal of the latch circuit 245 has "H" level, the control circuit 230 decides that a high-frequency magnetic field is generated at that moment. Conversely, if the signal level of the hold signal is still "L" level even after the lapse of a time period corresponding to the pulse width of the sampling pulse SP0, the control circuit 230 decides (at step Sa3) that no high-frequency magnetic field occurs.

Incidentally, this decision is made so as to detect a high-frequency magnetic field owing to the commercial power supply. Therefore, preferably, the pulse width of the sampling pulse SP0 is set at a value, which is not less than one cycle of the commercial power supply (whose frequency ranges from 50 to 60 Hz), namely, not less than 20 msec.

In the case where it is decided (at step Sa3) that a high-frequency magnetic field is generated, the object is attained. Thus, to prevent unnecessary power consumption from occurring when the sampling pulse SP0 for detecting a high-frequency magnetic field thence is outputted, the control circuit 230 changes the signal level of the gate signal PG1 to "L" level and stops outputting the sampling pulse SP0 (at step Sa4).

Further, the control circuit 230 changes the level of the signal CSP1 (see FIG. 3) to "L" level.

Furthermore, the counting operation of the frequency divider 270 is reset in response to an output signal of the latch circuit 245 (at step Sa8).

Conversely, when it is decided that no high-frequency magnetic field is generated, the control circuit 230 starts outputting sampling pulses SP1 intermittently and correspondingly to the gate signal PG2 so as to decide whether or not a magnetic field due to an ordinary AC magnetic field, for instance, switching noises of the other devices, and the power generator 100 is generated (at step Sa5).

Incidentally, the "AC magnetic field" referred to herein (and similarly referred to in the following description) is a magnetic field, which is generated by household electrical appliances operating by a commercial power supply and has a frequency of 50 (Hz) to 60 (Hz), or a magnetic field, which has a frequency of 100 (kHz) to several kHz and is caused by the rotation of the motor of a shaver.

Thus, the transistor Ptr1 of FIG. 4 is turned on. However, the transistor Ptr2 is turned on and off intermittently and repeatedly. Incidentally, in the case that the transistor Ptr2 is turned when an AC magnetic field is generated, an induced current due to the magnetic field flows through a closed loop alternately in a direction from the ground, through the transistor Ptr1, the coil 124 and the transistor Ptr2, to the ground, and in the opposite direction. However, at a moment, at which the transistor Ptr2 is turned off, electric current, whose magnitude is not less than that of the induced current, flows therethrough. Consequently, the current induced by the magnetic field is converted into a voltage Vrs, which is amplified by what is called the chopper amplification, at the terminal T2.

Additionally, when the voltage level Vrsl is less than the threshold value of the inverter 242 (see FIG. 3), the signal level of an output signal of the OR gate 243 is changed to "H" level. Further, this signal is held by the latch circuit 245 through the AND gate 244 enabled in response to the signal CPS1.

Thus, when the signal level of the hold signal of the latch circuit 245 is "H" level, the control circuit 230 decides that an AC magnetic field is generated at that moment. Conversely, if the signal level of the hold signal is still "L" level even after the lapse of a time period in which the sampling pulses SP1 are intermittently outputted, the control circuit 230 decides (at step Sa6) that no high-frequency magnetic field occurs.

In the case where it is decided at step Sa6 that an AC magnetic field is generated, the object is attained. Thus, to prevent unnecessary power consumption from occurring when the sampling pulse SP1 for detecting a high-frequency magnetic field thence is outputted, the control circuit 230 stops outputting the sampling pulse SP1 (at step Sa7).

Further, the control circuit 230 changes the level of the signal CSP1 (see FIG. 3) to "L" level. Furthermore, the counting operation of the divide-by-8 frequency divider 270 is reset in response to an output signal of the latch circuit 245 (at step Sa8).

Conversely, when it is decided that no high-frequency magnetic field is generated, the control circuit 230 changes the signal level of the signal CSP1 to "L" level so as to finish the operation of detecting a high-frequency magnetic field and an AC magnetic field this time. Subsequently, the control circuit 230 waits (at step Sa9) until the moment t12, at which the hands of the timepiece are moved.

Then, at the moment t12 for moving the hands, the control circuit 230 outputs a driving pulse Kl, which has a pulse width corresponding to the current result of counting performed by the up/down counter 280, in response to the gate signals PG1 and NG1 (at step Sa10).

Thus, the level of the voltage at the terminal T1 is pulled-in toward the negative power supply Vss. As a result, a current, whose magnitude has an effective value corresponding to the pulse width of the driving pulse K1, flows in the direction from the terminal T2 to the terminal T1. Therefore, in principle, the rotor 211 of the pulse motor 210 should turn 180 degrees. Incidentally, the effective value of the magnitude of the current, which corresponds to the pulse width of the driving pulse K1, depends upon a current result of counting performed by the up/down counter 280 and upon a change in a load exerted on the rotor 211, and is sometimes insufficient. Consequently, sometimes, the rotor 211 does not rotate.

Thus, the control circuit 230 starts outputting intermittent sampling pulses SP2 correspondingly to the gate signal PG1 so as to detect whether or not the rotor 211 actually rotates in response to the driving pulse K1. Moreover, the control circuit 230 starts outputting inversion pulses of sampling pulses SP2 correspondingly to the gate signal SG1 (at step Sa11). Furthermore, the control circuit 230 changes the signal level of the signal CSP2 (see FIG. 3) to "H" level, so that the signal CSP2 becomes active. Consequently, the transistor Ptr2 of FIG. 4 is turned on. Moreover, the transistors Ptr1 and Str2 are repeatedly turned on and off in a mutually exclusive manner.

Incidentally, when the transistor Ptr1 is turned on and the transistor Str2 is turned off in the case that the rotor 211 is turned in response to the driving pulse K1 180 degrees, electric current flows in the coil owing to the rotation and damped oscillation thereof in a direction opposite to the direction of flow of the current caused by the driving pulse K1. That is, the current flows through a closed loop in a direction from the ground, through the transistor Ptr1, the coil 214 and the transistor Ptr2, to the ground. However, if the transistor Ptr1 is turned off and the transistor Ptr2 is turned off at the next moment, electric current, whose magnitude is not less than that of the induced current, flows therethrough. Consequently, a voltage Vrs2, which is obtained by voltage amplification, is developed at the terminal T1.

Conversely, in the case that the rotor 211 does not rotate 180 degrees in response to the driving pulse K1, the aforementioned opposite current is not induced, so that the voltage level Vrs2 is not developed at the terminal T1.

Incidentally, if the voltage level Vrs2 is less than the detected voltage Vcom of the comparator 251 of FIG. 3, the signal level of an output signal of the output OR gate 243 changes to "H" level. This signal is held by the latch circuit 255 through the AND gate 254 enabled by the signal SCP2.

Thus, when the signal level of the hold signal of the latch circuit 255 changes "H" level, the control circuit 230 decides at that moment that the rotor 211 rotates. Conversely, if the signal level of the hold signal is still "L" level even after the lapse of a time period, in which the sampling pulse SP2 are intermittently outputted, the control circuit 230 decides (at step Sa12) that the rotor 211 does not rotate.

In the case where it is decided that the rotor 211 rotates, the object is attained at that moment. Thus, to prevent unnecessary power consumption from occurring thence, the control circuit 230 stops outputting the sampling pulse SP2 (step Sa13) and changes the signal level of the signal CSP2 to "L" level (see FIG. 3).

Conversely, if it is decided that the rotor 211 does not rotate, at the next time for moving hands, there is high possibility that it is detected that the rotor does not rotate, even when the rotor 211 is caused by the driving pulse K1 of the same pulse width. Thus, the control circuit 230 outputs one-shot signals US and causes the up/down counter to perform up-counting (at step Sa14) so as to raise the effective value of the current. Moreover, the control circuit 230 forcedly drives the rotor 211 so as to ensure the detection of the non-rotation state thereof.

Specifically, after waiting (step Sa15) until the moment t13, the control circuit 230 outputs a forced driving pulse P2, which has a sufficiently large pulse width to the extent that the rotor 211 rotates with reliability, correspondingly to the gate signals PG1 and NG1, and also outputs a correction pulse Pr following the pulse P2 (at step Sa16). Incidentally, the correction pulses Pr are applied thereto in order to prevent an occurrence of overrotation of the rotor when only the forced driving pulse P2 are applied thereto.

Thus, substantially, the level of the voltage at the terminal T1 is pulled-in to the negative power supply voltage Vss, while the ground level at the terminal T2 is maintained. Consequently, the current, whose magnitude has an effective value sufficient for causing the rotor 211 to rotate, flows in a direction from the terminal T2 to the terminal T1. Hence, the rotor 211 turns 180 degrees with reliability. Even when the rotor 211 is not rotated in response to the driving pulse K1 by such a forced rotation, such a rotation is ensured by the forced driving pulse P2 and the correction pulse Pr following the pulse P2.

Further, when the rotor 211 is forcedly rotated in this way, the residual magnetic field caused by the forced driving pulse P2 is left. To eliminate the residual magnetic field, the control circuit 230 outputs the gate signals PG2 and NG2.

Meanwhile, in the case that a high-frequency magnetic field or an AC magnetic field is generated in the vicinity of the pulse motor 210, even when the rotor is rotated by using the driving pulse K1, the magnetic field generated at the main magnetic poles 212 and 213 are weaken by the high-frequency magnetic field or the AC magnetic filed. Consequently, there is high possibility that the rotor does not rotate.

Furthermore, when the rotation of the rotor 211 is detected by using the sampling pulse SP2, an induced current due to a high-frequency magnetic field or an AC magnetic field is superposed on the coil 211. Thus, even if the rotor 211 does not rotate, it is erroneously detected that the rotor 211 rotates. When such an erroneous detection occurs, naturally, the current caused by the forced driving pulse P2 is not supplied to the coil 214. Consequently, the time display accuracy is seriously deteriorated.

Especially, in the case of a device, in which the pulse motor 210 is of the type that rotates by utilizing the repulsion and attraction between the magnetic poles and in which parts respectively provided at the sides of the terminals T1 and T2 are alternately driven, similarly as in the case of the electronic timepiece, which is the first embodiment of the present invention, the positions of the magnetic poles of the rotor 211 at the next driving moment are stabilized by the mutual attraction in the direction of a magnetic pole between the main magnetic poles 212 and 213. Thus, the rotor 211 does not rotate at the next moment at which the hands are moved.

Therefore, if an erroneous detection occurs once, in the case that the second hand performs a one-second interval movement, an error of the movement of the second hand occurs for two seconds.

To prevent an occurrence of such an erroneous detection, the control circuit 230 outputs a forced driving pulse P2 and the subsequent correction pulse Pr correspondingly to gate signals PG1 and NG1 at the moment t12 (at steps Sa15 and Sa16) in the case that a high-frequency magnetic field or an alternating-current magnetic frequency is present in the vicinity of the pulse motor 210. Subsequently, demagnetizing pulses PE are outputted correspondingly to the gate signals PG2 and NG2. That is, the rotor 211 is rotated by electric current caused by the forced driving pulse P2 instead of the driving pulse K1.

Incidentally, differently from the case of non-rotation of the rotor, the up/down counter 280 does not perform an up-counting operation for the following reason. That is, it is considered that in the case of the non-rotation, unless the pulse width of the driving pulse K1 is increased, namely, unless the effective power of the driving pulse K1 is increased, the non-rotation state continues thence, and that thus, there is necessity for performing an up-counting operation by the up/down counter 280. In contrast, the magnetic field is considered as being temporarily generated.

Therefore, upon completion of stopping the output of the sampling pulse SP2 after it is decided that the rotor 211 is rotated by the driving pulse K1, or upon completion of forcedly rotating the rotor 211 by using the forced driving pulse P2, the control circuit 230 outputs a pulse signal FEGL and resets the signals held in the latch circuits 245 and 255 for the next movement of the second hand (at step Sa17).

Further, upon completion of driving a portion at the side of the terminal T1 the next time, the output polarity is inverted so as to drive a portion at the side of the terminal T2 (at step Sa18). Thus, at the next time, an operation of driving the portion at the side of the terminal T2 is similarly performed at the moments t21, t22, and t23. As a result, the operation of driving the portion at the side of the terminal T1 and that of driving the portion at the side of the terminal T2 are alternately performed at one second intervals.

Thus, when the control circuit 230 decides that there is no magnetic field in the vicinity of the pulse motor 210, the driving pulse K1 having a pulse width corresponding to a result of the counting operation of the up/down counter 280 is supplied to the coil 214 at a moment t12 (or t22), at which an operation of moving the hands is performed. Then, the control circuit 230 decides whether or not the rotor 211 rotates. Further, when it is decided that the rotor 211 does not rotate, the control circuit 230 outputs the forced driving pulse P2 and the correction pulse Pr to thereby forcedly rotate the rotor 211. On the other hand, when it is decided that a magnetic field is generated, the control circuit 230 resets a counting operation of the frequency divider 270. Moreover, the control circuit 230 outputs the forced driving pulse P2 and the correction pulse Pr. Thus, the rotor 211 is forced to rotate.

Incidentally, the counting operation of the frequency divider 270 is reset and thereafter, (after the signal FEGL is outputted,) the resetting is canceled. As illustrated in FIG. 7, such an output signal rises 31 to 40 seconds later. That is, since a magnetic field is detected, 31 to 40 seconds elapsed until the effective value of the driving current caused in response to the driving pulse K1 is reduced by a value corresponding to one rank, upon condition that a magnetic field is not detected again.

Incidentally, consideration is now given to the power consumption of such an electronic timepiece. When the rotor 211 does not rotate even if the driving pulse K1 is outputted, the up/down counter 280 performs an up-counting operation. This results in increase in the power consumption of the electronic timepiece. In contrast, usually, when an output cycle of the frequency divider 270, which is 80 seconds, elapses, the up/down counter 280 performs a down-counting operation. This results in decrease in the power consumption of the electronic timepiece. Therefore, the effective value of the current, which is determined by the pulse width of the driving pulse K1 corresponding to a result of the counting operation of the up/down counter 280, is close to a value of the current, at which the tendency to increase the power consumption of the electronic timepiece is balanced with the tendency to decrease the power consumption thereof, that is, the lowest value of the magnitude of the current, at which the rotor 211 can rotate. Consequently, an occurrence of the excessive power consumption can be prevented. Moreover, a reduction in the power consumption thereof is attained.

Further, the first embodiment is configured so that the counting operation of the frequency divider 270 is reset (at step Sa8) when it is decided that a high frequency magnetic field or an AC magnetic field is generated. In contrast, if the electronic timepiece is configured so that the up/down counter 280 is caused every 80 seconds to perform a down-counting operation, such an electronic timepiece has the following drawback.

As described above, the balanced effective value of the current, which is determined by the pulse width of the driving pulse K1, is close to the lowest value of the magnitude of the current, at which the rotor 211 can rotate. Thus, when the effective value of the current is decreased at the elapse of a time period of 80 seconds, the rotor 211 is liable to be brought into the non-rotation state.

When a magnetic field is generated in the vicinity of the pulse motor 211 in a situation in which the rotor 211 is apt to be put into the non-rotation state, electric current induced by the magnetic field is naturally superposed on the coil 214, even through the rotor 211 does not rotate.

It is considered that this results in increase in the probability of an occurrence of an erroneous detection of the presence of a magnetic field in the vicinity of the pulse motor 211.

Conversely, if a magnetic field is generated, the counting operation of the frequency divider 270 is reset in the first embodiment. Thus, as long as a magnetic field is generated, the up/down counter 280 does not perform a down-counting operation.

Therefore, the effective value of the current is maintained at a current value. As a result, the timepiece is not put into a region in which the probability of an occurrence of an erroneous detection is high. This prevents an occurrence of an erroneous detection of the rotation of the pulse motor.

Additionally, there are the following examples of the configuration of the timepiece, in which the up/down counter 280 is not permitted to perform a downcounting operation.

(i) A configuration in which the counting operation of the frequency divider 270 is stopped by, for example, inhibiting the input of the clock signal CK when a magnetic field is generated.

(ii) A configuration in which the frequency divider 270 is replaced with a counter, and in which when the count value of this counter reaches a predetermined value, the up/down counter 280 is caused to perform a down-counting operation, and in which the count is reset and an initial value is set therein when a magnetic field is generated.

Furthermore, in the first embodiment, when it is decided that a magnetic field is generated, the forced driving pulse P2 and the correction pulse Pr force the rotor 211 to rotate, as described above. This ensures the reliability of movement of the hands.

Furthermore, the electronic timepiece according to the first embodiment has a built-in power generator 100. Therefore, the magnetic fields, which adversely affect an operation of detecting whether or not the rotor 211 or the pulse motor 210 rotates, include not only an external magnetic field being present outside the timepiece body, but also a magnetic field generated therein.

Incidentally, if the coil 110 of the power generator 100 and the coil 214 of the pulse motor 210 are placed perpendicular to each other, magnetic fluxes generating in the coil 110 do not affect the coil 214. Thus, at least the influence of the magnetic field generated in the timepiece body can be eliminated. However, in the case that both the coils are actually mounted in a severely restricted space of, for instance, a wristwatch, it is very difficult to place both the coils perpendicular to each other. Further, the actually used coils are not ideal. Thus, leakage magnetic flux is also generated.

However, according to the first embodiment of the present invention, an occurrence of an erroneous detection is prevented from being affected by any magnetic field generated outside or inside the electronic timepiece.

(1.5) Examples of Modification of First Embodiment (1.5.1) First Example of Modification Incidentally, although this embodiment is configured so that the effective value of the driving current to be supplied to the pulse motor 210 is controlled according to the pulse width of the driving pulse K1, the timepiece may be configured so that pulses each having a constant pulse width are outputted by changing the number thereof in a constant time instead of using the driving pulse K1, which has a controlled pulse width. With such a configuration, the duty ratio is determined according to a result of a counting operation of the up/down counter 280. Thus, the effective value of the driving current to be supplied to the pulse motor 210 is controlled.

(1.5.2) Second Example of Modification

Further, a magnetic field is detected by utilizing electric current induced by the coil 214 of the pulse motor 210 in the first embodiment. However, needless to say, a magnetic sensor, such as a Hall-effect device, may be used instead of such a coil. Incidentally, this example of the modification is reduced in commonality in configuration therebetween and thus unsuitable for a device having a severely restricted space, such as a wristwatch.

(1.5.3) Third Example of Modification

Moreover, the first embodiment is configured so that the rotation of the rotor 211 is detected by utilizing electric current induced by the coil 214 of the pulse motor 210. However, the timepiece may be configured so that the rotation of the rotor 211 is detected according to electric current induced by the rotation of the rotor 211, namely, by using an encoder connected to the rotor 211. Incidentally, similarly as in the case of the example relating to the detection of a magnetic field, this example of the modification is reduced in commonality in configuration therebetween and thus unsuitable for a device having a severely restricted space, such as a wristwatch.

(1.5.4) Fourth Example of Modification

Additionally, in the first embodiment, a main device to be charged by the electric power generated by the power generator is the secondary power supply 130. However, the main device may be a capacitor of large capacitance, as long as the capacitor can store electric power. Furthermore, in addition to the power generator of FIG. 2, any other type of power generators, such as a solar battery, a thermal power generator, and a piezoelectric power generator, may be applied to the electronic timepiece.

(1.5.5) Fifth Example of Modification

Further, in the first embodiment and the examples of the modification, the pulse motor 210 is of the type that a gap is provided between the main magnetic poles 212 and 213, as is viewed from the direction of the rotor 211. However, the pulse motor and a notch for determining the static position of the rotor 211 may be provided as one body.

(1.5.6) Sixth Example of Modification

As described in the foregoing description of the first embodiment, the gate signals SG1, SG2, PG1, PG2, NG1, NG2 are controlled by the control circuit 230 and used for various kinds of detection including the detection of a magnetic field. However, the timepiece may be configured so that a magnetic field in the vicinity of the pulse motor is detected by sensing the state of electric current (namely, an amount of the electric current or a voltage) caused when electric power is generated by the power generator.

For example, a state amount of the electric current includes an amount of some electric current caused by power generation, such as an amount of electric current in the case that the limiter circuit 160 is operated and the voltage of the secondary power supply 130, which is boosted by being charged, is not less than a rated value, and that a charging current is bypassed. Such a case, therefore, includes the case that a magnetic field is detected in the vicinity of the pulse motor by detecting an amount of power storage current caused when the secondary power supply (namely, the power storing means) is charged.

Further, in the case of using a voltage as the state amount of the electric current caused when electric power is generated, the charge detecting circuit 13 (regarding the detail thereof, refer to the descriptions of a second embodiment (to be described later) and FIG. 10) is provided as indicated by dashed lines in FIG. 10, and a voltage, which is developed when a power generating current flows a charging current, may be detected. Thus, the charge detecting circuit 13 can reset divide-by-eight frequency divider by outputting a charge detection result signal SA, whose signal level at the time of detection of the voltage is "H" level, to a three-input OR circuit 260. Consequently, a magnetic field in the vicinity of the pulse motor is detected by using the voltage.

(2) Second Embodiment

Next, a second embodiment of the present invention will be described hereinafter with reference to the accompanying drawings.

(2.1) Entire Configuration of Second Embodiment

FIG. 8 shows the entire configuration of an analog electronic timepiece 1, which is a second embodiment of the present invention.

The analog electronic timepiece 1 is a wristwatch. A user uses this timepiece by winding a band, which is connected to a timepiece body thereof, around his wrist.

The analog electronic timepiece 1 roughly comprises a power generation portion A for generating AC electric power, a power supply portion B for rectifying AC voltage, for boosting a power storage voltage, and for supplying electric power to each constituent portion, a control portion C for detecting power generating state of the power generation portion A, a hand movement mechanism D for driving hands, and a driving portion E for driving the hand movement mechanism D according to a control signal sent from the control portion C.

In this case, the control portion C is adapted to switch according to the power generating portion of the power generating portion A between a display mode for driving the hand movement mechanism D and displaying time of day, and a power saving mode for saving electric power by stopping the supply of electric power to the hand movement mechanism D. Further, a change from the power saving mode to the display mode is forcedly performed by a user, who holds and swings the analog electronic timepiece 1.

Hereinafter, each constituent portion will be described. Incidentally, the control portion C will be described later by using functional blocks.

First, the power generating portion A roughly consists of a power generator 40, a rotary weight 45 for turning in the device by responding to the motion of an arm of a user, and an accelerating gear 46 for converting (or accelerating) the rotation of the rotary weight to rotations of the number, which are needed for the power generation, and transmitting the rotations to the power generator 40.

The power generator 40 serves as an AC power generator of the electromagnetic induction type for outputting electric power induced in a power generating coil 44 connected to a power generating stator 42 by the rotation of a power generating rotor 43, to which the rotation of the rotary weight 45 is transmitted through the accelerating gear 46, in the power generating stator 42.

Therefore, the power generating portion A is adapted to generate electric power by utilizing energy relating to the life of the user and to drive the analog electronic timepiece 1 by using the electric power. Next, the power supply portion B has a rectifying circuit 47, a large-capacitance capacitor 48, and a boosting/lowering circuit 49.

The boosting/lowering circuit 49 is adapted to be able to perform multi-stage boosting/lowering operations by using a plurality of capacitors 49a, 49b, and 49c. The circuit 49 can adjust a voltage to be supplied to the driving portion E according to a control signal $\phi 11$ sent from the control portion C.

Further, the output voltage of the boosting/lowering circuit 49 is supplied to the control portion C by a monitor signal $\phi 12$. Thus, the output voltage can be monitored. Moreover, by slightly changing the output voltage, the control portion C can judge whether or not the power generating portion A generates electric power.

Incidentally, the power supply portion B employs the voltage Vdd (at a higher electric potential side) as the reference electric potential (GND), and generates the voltage Vss (at a lower electric potential side) as a power supply voltage.

In the foregoing description, it has been described that the power generation is performed by monitoring the output voltage of the boosting/lowering circuit 49 through the monitor signal $\phi 12$. In the circuit configuration having no boosting/lowering circuit, the power generation is performed by directly monitoring the lower-electric-potential-side power supply voltage VTKN the large-capacitance capacitor 48.

Next, the hand movement mechanism D is described hereinbelow. A stepping motor 70 used in the hand movement mechanism D is also referred to as a pulse motor, a stepping motor, a stepper motor, or a digital motor, and is driven by a pulse signal and frequently used as an actuator for a digital control device.

In recent years, compact light stepping motors are frequently employed as actuators for portable small-sized electronic devices and information processing equipment. Typical electronic devices are timepiece devices, such as electronic timepieces, timing switches, and chronographs.

The stepping motor 70 of this embodiment comprises a driving coil 71 for generating a magnetic force by using a driving pulse supplied from the driving portion E, a stator 72 energized in this driving coil 71, and a rotor 73 rotated by a magnetic field energized in the stator 72.

Furthermore, the stepping motor 70 is a motor of the PM type (namely, the permanent magnet rotation type), whose rotor is constituted by a two-pole disk-like permanent magnet. A magnetic saturation portion 77 is provided in the stator 72 so that different magnetic poles are generated in phases (or poles) 75 and 76 around the rotor 73 by magnetic forces produced in the driving coils 71, respectively.

Further, an inner notch 78 is provided at a suitable position on the inner surface of the stator 72 so as to determine the direction of rotation of the rotor 73. Further, the rotor 73 is stopped at a suitable place by generating cogging torque.

The rotation of the rotor 73 of the stepping motor 70 is transmitted to each of the hands through a wheel train, which engages with the rotor 73 through a pinion and consists of a fifth wheel 51, a fourth wheel 52, a third wheel 53, a second wheel 54, a minute wheel 55, and an hour wheel 56. A second hand 61 is connected to the shaft of the fourth wheel 52. A minute hand is connected to the second wheel 54. Moreover, an hour hand 63 is connected to an hour wheel 56. The time of day is displayed by each of the hands linked with the rotation of the rotor 73. Needless to say, a transmission system (not shown) for indicating a date can be connected to the wheel train 50.

Next, the driving portion E supplies various driving pulses to the stepping motor 70 under the control of the control portion C.

More specifically, driving pulses of different polarities are supplied to the driving coil 71 by applying various control pulses of different polarities and pulse widths thereto from the control portion C. Alternatively, detection pulses are supplied for boosting induced voltages for detecting the rotation of the rotor 73 or detecting a magnetic field.

(2.2) Functional Constitution of Control System of Second Embodiment

Next, the functional constitution of the control system of the second embodiment is described hereinbelow with reference to FIG. 9. In FIG. 9, reference characters A to E respectively correspond to the power generating portion A, the power supply portion B, the control portion C, the hand movement mechanism D, and the driving portion E.

The analog timepiece 1 comprises a power generating unit 10 for generating AC electric power, a rectifying circuit 11 for rectifying AC voltages outputted from the power generating unit 10, a power storing unit 12 for storing the rectified voltage signal, a boosting/lowering circuit 25 for voltage signals obtained by boosting and lowering an output voltage signal of the power storing unit 12, and for supplying the obtained voltage signals to the control portion C and the hand movement mechanism D, a charge detecting circuit 13 for detecting a charge to the power storing unit 12 and for outputting a charge detection result signal SA, a generator AC magnetic field detecting circuit 14, and a duty ratio increasing/decreasing control circuit 23 for outputting a duty ratio increasing/decreasing signal SM to be used to increase and decrease the duty ratio of the normal driving pulse signal according to a generator AC magnetic field detection result signal SC representing a result of a detecting operation of the generator AC magnetic field detecting circuit 14.

Further, the analog electronic timepiece 1 comprises a duty ratio setting counter 24 for outputting a normal driving pulse duty ratio increasing/decreasing signal SH so as to set the duty ratio of the normal driving pulse signal SI, a control circuit 15 for controlling the entire analog electronic timepiece 1, a motor 17 for driving the hands, and a motor driving circuit 16 for driving the motor 17 according to the normal driving pulse signal SI.

Furthermore, the analog electronic timepiece 1 has a correction driving pulse outputting circuit 18 for outputting a correction driving pulse SJ, which has effective electric power higher than that of the normal driving pulse signal and is used to rotate the motor with reliability, a high-frequency magnetic field detecting circuit 19 for detecting a magnetic field, which affects the rotation of the motor 17 and the detection of the rotation thereof and for outputting a high-frequency magnetic field detection result signal SE, an AC magnetic field detecting circuit 20 for outputting an AC magnetic field detection result signal SF, and a rotation detecting circuit 21 for detecting according to the level of a voltage induced by the motor whether or not the motor 17 rotates, and for outputting a rotation detection result signal SG.

In this case, similarly as in the case of the first embodiment, the "high frequency magnetic field" is a spike-like electromagnetic noise irregularly occurring when the switches of household electrical appliances are turned on or off or when a temperature controller of an electric blanket is operated. Further, the "AC magnetic field" is a magnetic field, which is generated by household electrical appliances operating by a commercial power supply and has a frequency of 50 (Hz) to 60 (Hz), or a magnetic field, which has a frequency of 100 (kHz) to several KHz and is caused by the rotation of the motor of a shaver.

Furthermore, the duty ratio setting counter 24 sets a count value so as to maintain the duty ratio of the normal driving pulse signal at a currently set value or to set the duty ratio thereof at a value that is higher than the currently set value, in the case that the AC magnetic field, which is generated when the power generating unit 10 generates electric power, is detected by the generator AC magnetic field detecting circuit 14.

The reason for performing such processing is that there is the possibility that the duty ratio is lower than the lowest value of the duty ratio at which the motor can be driven. That is, when the duty ratio is lowered at the time of detection of the power generation, the timepiece enters a non-operating region, in which the motor cannot be driven, instead of the operating region in which the motor can be driven.

(2.3) Configuration of Circuit around Charge Detecting Circuit

FIG. 10 illustrates the circuit configuration of an example of a charge detecting circuit and circuits provided therearound.

FIG. 10 shows the charge detecting circuit 13, and the power generating unit 10 for generating AC electric power, the rectifying circuit 11 for rectifying an output current of the power generating unit 10 and for converting the output current into a DC current, and a charge storing unit 12 for storing power by the DC current outputted from the rectifying circuit 11, as peripheral circuits of the charge detecting circuit 13.

The charge detecting circuit 13 comprises a NAND circuit 201 for computing the NAND of outputs of a first comparator COMPI (to be described later) and a second comparator COMP2 (to be described later), and a smoothing circuit 202 for smoothing an output of the NAND circuit 201 by using an R-C integrating circuit and for outputting the smoothed signal as a charge detection result signal SA.

The rectifying circuit 11 comprises the first comparator COMP1 for comparing the voltage at the output terminal of the power generating unit 10 with the reference voltage Vdd to thereby control the turning-on and turning-off of a first transistor Q1, and for performing active rectification, a second comparator COMP2 for comparing the voltage at the other terminal of the power generating unit 10 with the reference voltage Vdd to thereby turn on and off the first transistor Q1 and a second transistor Q2 alternately and for performing active rectification, a third transistor Q3 adapted to be turned on when the terminal voltage V2 at the terminal AG2 of the power generating unit 10 exceeds a predetermined threshold voltage, and a fourth transistor Q4 adapted to be put into an on-state when the terminal voltage at the terminal AG1 of the power generating unit 10 exceeds a predetermined threshold voltage.

First, a charging operation is described hereinbelow.

When the power generating unit 10 starts generating electric power, a power generating voltage is supplied to both the output terminal AG1 and AG2 thereof. In this case, the phase of the terminal voltage V1 at the output terminal AG1 is opposite to the phase of the terminal voltage V2 at the output terminal AG2.

When the terminal voltage V1 at the output terminal AG1 exceeds the threshold voltage, the fourth transistor Q4 enters an on-state. Subsequently, the terminal voltage V1 rises. When the voltage V1 exceeds the voltage of the power supply Vdd, the level of an output of the first comparator COMP1 is "L" level. Thus, the first transistor Q1 is turned on.

On the other hand, the terminal voltage V2 at the output terminal AG2 is lower than the threshold voltage, so that the third transistor Q3 is in an off-state. The terminal voltage V2 is less than the voltage of the power supply Vdd. The level of an output of the second comparator COMP2 is "H" level. Further, the second transistor Q2 is in an off-state.

Therefore, in a time period in which the first transistor Q1 is turned on, the power generating current flows through a path from the terminal AG1, through the first transistor Q1, the power supply VDD, the power storing unit 12, the power supply VTKN, to the fourth transistor Q4. Consequently, the power storing unit 12 is charged.

Thereafter, when the terminal voltage V1 falls, the terminal voltage V1 at the output terminal AG1 becomes less than the voltage of the power supply VDD. The level of an output of the first comparator COMP1 is "H" level. Thus, the first transistor Q1 is in an off-state. The terminal voltage V1 at the output terminal AG1 becomes less than the threshold voltage for the fourth transistor Q4, so that the transistor Q4 enters an off-state.

On the other hand, when the voltage V2 at the output terminal AG2 exceeds the threshold voltage, the third transistor Q3 enter an on-state. Thereafter, the terminal voltage V2 rises still more. When the voltage V2 exceeds the voltage of the power supply VDD, the level of an output of the second comparator COMP2 is "L" level. Thus, the second transistor Q2 is turned on.

Therefore, in a time period in which the second transistor Q2 is turned on, the power generating current flows through a path from the terminal AG2, through the second transistor Q2, the power supply VDD, the power storing unit 12, the power supply VTKN, to the third transistor Q3. Consequently, the power storing unit 12 is charged.

As described above, when the power generating current flows, an output of one of the first comparator COMP1 and the second comparator COMP2 has an "L2" level.

Thus, in a state, in which the power generating current flows therethrough, the NAND circuit 201 of the charge detecting circuit 13 outputs a signal, whose signal level is "H" level, to the smoothing circuit 202 by computing the NAND of the outputs of the first comparator COMP1 and the second comparator COMP2.

In this case, an output of the NAND circuit 201 includes switching noises. Thus, the smoothing circuit 202 performs the smoothing of an output of the NAND circuit 201 by using an R-C integrating circuit. Consequently, the smoothing circuit 202 outputs the smoothed signal as a generator detection result signal SA.

Meanwhile, in the case of such a charge detecting circuit 13, a detection signal has a detection delay time owing to the configuration thereof. Thus, if such a detection delay is not taken into consideration, the motor does not normally rotate as a detection omission occurs.

Therefore, in this embodiment, the motor is normally rotated by taking the detection delay time into consideration.

(2.4) Configuration of Generator AC Magnetic Field Detecting Circuit

FIG. 11 is a block diagram illustrating the detailed configuration of the control system of the second embodiment.

As illustrated in FIG. 11, the generator AC magnetic field detecting circuit 14 comprises an AND circuit 14A having an input terminal, to which a charge detection result signal SA is inputted, and having the other input terminal, to which a generator AC magnetic field detection timing signal SB is inputted, and being adapted to compute and output the AND of the signals SA and SB. The circuit 14 further comprises a latch circuit 14B having a set terminal S connected to the output terminal of the AND circuit 14 and having a reset terminal R, to which a motor pulse output termination signal FEGL is inputted, and having an output terminal Q, from which a generator AC magnetic detection result signal SC is outputted.

With such configuration, in the case that the charge detecting circuit 13 detects a charge and outputs a detection result signal SA having "H" level, a generator AC magnetic field detection result signal SC is outputted from the output terminal Q of the latch circuit 14B of the generator AC magnetic field detecting circuit 14 at the moment at which the generator AC magnetic field detection timing signal SB having "L" level is inputted from the control circuit 15 thereto.

Thereafter, upon completion of outputting the motor pulse, a motor pulse output termination signal FEGL having "H" level is inputted thereto. Thus, the signal level of the generator AC magnetic field detection result signal SC becomes "L" level.

(2.5) Configurations of High-Frequency Magnetic Field Detecting Circuit and AC Magnetic Field Detecting Circuit The high-frequency magnetic field detecting circuit 19 has a configuration, which is almost the same as that of the AC magnetic field detecting circuit 20. Therefore, the configuration of the high-frequency magnetic field detecting circuit 19 is described hereunder by way of example.

As illustrated in FIG. 11, the high-frequency magnetic field detecting circuit 19 comprises two magnetic-field detecting inverters 19A and 19B for outputting a first magnetic field detecting signal having "H" level when the voltage level of the induced voltage signal SD of the motor 17 exceeds a predetermined reference voltage, an OR circuit 19c having an input terminal connected to the output terminal of the magnetic field detecting inverter 19A, and the other input terminal connected to the magnetic field detecting inverter 19B, and being adapted to output a second magnetic field detecting signal having "H" level when the signal level of an output signal of one of the magnetic field detecting inverters 19A and 19B is "H" level, an AND circuit 19D having an input terminal, to which a detection timing signal outputted from the control circuit 15 is inputted, and having the other input terminal, to which a second magnetic field detecting signal outputted from the OR circuit 19C is inputted, and a latch circuit 19E having a set terminal S, which is connected to the output terminal of the AND circuit 19D, and having a reset terminal R, to which a motor pulse output termination signal FEGL is inputted, and having an output terminal Q, from which a high-frequency magnetic field detection result signal SE is outputted.

With such configurations, in the case that the signal level of an output of one of the magnetic field detecting inverters 19A and 19B becomes "H" level, a high-frequency magnetic field detection result signal SE is outputted from the output terminal Q of the latch circuit 19E at the high-frequency magnetic field detecting moment at which the detection timing signal having "H" level is inputted from the control circuit 15 thereto.

Thereafter, when a motor pulse output termination signal FEGL having "H" level is inputted thereto at the time of termination of output of the motor pulse, the signal level of the high-frequency magnetic field detection result signal SE becomes "L" level.

(2.6) Configuration of Rotation Detecting Circuit

As illustrated in FIG. 11, the rotation detecting circuit 21 comprises a rotation detecting comparator 21A having an inverting input terminal, to which an induced voltage signal SD is inputted from the motor 17, and having a non-inverting input terminal, to which a predetermined rotation discriminating reference voltage signal Vcom is inputted, and being adapted to output an original rotation detecting signal having "H" level when the voltage level of the induced voltage signal SD exceeds the reference voltage Vcom, an AND circuit 21B having an input terminal, to which a detection timing signal is inputted from the control circuit 15, and having the other input terminal, to which an original rotation detecting signal is inputted from the rotation detecting comparator 21A, and a latch circuit 21C having a set terminal S, which is connected to the output terminal of the AND circuit 21B, and having a reset terminal R, to which a motor pulse output termination signal FEGL is inputted, and having an output terminal Q from which a rotation detection result signal SG is outputted.

With these configurations, in the case that the signal level of an original rotation detecting signal outputted from the rotation detecting comparator 21A becomes "H" level, a rotation detection result signal SG is outputted from the output terminal Q of the latch circuit 21C at the rotation detecting moment at which the detection timing signal having "H" level is inputted from the control circuit 15 thereto.

Thereafter, when a motor pulse output termination signal FEGL having "H" level is inputted thereto at the time of termination of output of the motor pulse, the signal level of the rotation detection result signal SG becomes "L" level.

(2.7) Configurations of Duty-Ration Increasing/Decreasing Circuit and Duty-Ratio Setting Counter As illustrated in FIG. 11, the duty-ratio increasing/decreasing control circuit 23 comprises an OR circuit 23A having an input terminal, to which an external reset signal RS is inputted, and having the other input terminal, to which a generator AC magnetic field detection result signal SC is inputted, a divided-by-n counter 23B having a clock terminal CLK, to which the an external clock signal CK is inputted, and having a reset terminal RST, to which the output terminal of the OR circuit 23A is connected, and having an output terminal Q, from which duty-ratio decreasing signals of the duty-ratio increasing/decreasing signals SM are outputted with timing obtained by performing divide-by-n frequency division of the clock signal CK, and an OR circuit 23C having an input terminal, to which a generator AC magnetic field detection result signal SC is inputted, and having the other input terminal, to which a duty-ratio increasing control signal SP is inputted from the control circuit 15, and having an output terminal from which a duty ratio increasing signal of the duty ratio increasing/decreasing signal SM is outputted.

The duty ratio setting counter 24 is constituted by a 4-bit counter having an increasing terminal UP, to which a duty ratio increasing signal is inputted from the OR circuit 23C, and having a decreasing terminal DOWN, to which a duty ratio decreasing signal is inputted from the divide-by-n counter 23B, and having output terminals Q1 to Q4, from which 4-bit normal driving pulse duty ratio increasing/decreasing signal SH is outputted.

(2.8) Operation of Second Embodiment

Next, an operation of the second embodiment is described hereinbelow by referring to FIGS. 12 and 13.

FIG. 12 is a process flowchart illustrating an operation of the second embodiment. FIG. 13 is a timing chart illustrating an operation thereof.

First, the control circuit 15 of the analog electronic timepiece 1 decides (at step S1) whether or not one second, which is a reference time for movement of the hands, elapses since the previous moment at which the movement of the (second) hand is performed.

If it is decided (at step S1) that one second, which is the reference time for the movement of hands, does not elapse (NO), the decision is repeated.

Conversely, it is decided (at step S1) that one second, which is the reference time for the movement of hands, elapses (YES), the charge detecting circuit 13 transmits a charge detection result signal SA to the generator AC magnetic field detecting circuit 14 (at step S2).

If the charge detection result signal SA transmitted from the charge detecting circuit 13 indicates at step S2 that charging is performed in the power storing unit 12 (Step2; YES), the generator AC magnetic field detecting circuit 14 transmits a generator AC magnetic field detection result signal SC, which indicates that an AC magnetic field is detected around the power generating unit 10, to the duty-ratio increasing/decreasing control circuit 23.

Then, when receiving the generator AC magnetic field detection result signal SC indicating that an AC magnetic field is detected around the power generating unit 10, the duty-ratio increasing/decreasing control circuit 23 transmits a dutyratio increasing/decreasing signal SM for changing the duty ratio to a value which is higher than a current value by a value corresponding to, for example, one "level".

When receiving the duty-ratio increasing/decreasing signal SM for changing the duty ratio to a value which is higher than a current value by a value corresponding to one "level", (at step S9,) the duty-ratio setting counter 24 transmits a normal driving pulse duty-ratio increasing/decreasing signal SH for changing the duty ratio of the normal driving pulse signal SI to a value which is higher than a current value by a value corresponding to one "level". Thereafter, the process goes to step S3.

Practically, the charge detection result signal SA of FIG. 13(b) having "H" level (in a time period between the moments t2 and t4) indicates that the power storing unit 12 performs charging.

Further, during the generator AC magnetic field detection timing signal SB has "H" level indicating that the detection should be performed (namely, in the time period between the moments t1 and t3), the generator AC magnetic field detecting circuit 14 continues to detect an AC magnetic field around the power generating unit 10. If an AC magnetic field is detected at the moment t2, the circuit 14 changes the signal level of the generator AC magnetic field detection result signal SC from "L" level to "H" level.

Further, when the signal level of the generator AC magnetic field detection result signal SC is changed to "H" level, the duty-ratio increasing/decreasing control circuit 23 having received the signal transmits a duty-ratio increasing/decreasing signal SM for changing the duty ratio to a value, which is higher than the current value by a value corresponding to one "level"), to the duty ratio setting circuit 24.

Conversely, if the charge detection result signal SA transmitted from the charge detecting circuit 13 indicates at step S2 that no charging is performed (step S2; No), the control circuit 15 outputs a normal driving pulse signal SI to the motor driving circuit 16 (at step S3). On the other hand, the generator AC magnetic field detecting circuit 14 finishes the detection of an AC magnetic field around the power generating unit 10 (at step S4). Practically, the control circuit 15 changes the signal level of the generator AC magnetic field detection timing signal B from "H" level to "L" level at the moment t3.

Next, the rotation detecting circuit 21 performs an operation of detecting the rotation of the motor 17 and decides (at step S5) whether or not the motor 17 normally rotates.

If it is judged at step S5 that the motor 17 normally rotates (Step S5; Yes), the control circuit adjusts the duty ratio of the normal driving pulse signal SI to be outputted the next time for the movement of the hands, as will be described later (at step S10).

Further, the generator AC magnetic field detection circuit 14 starts detecting an AC magnetic field around the power generating unit 10 (at step S8).

Thereafter, the process goes to step S1, whereupon the movement of the hands of the analog electronic timepiece 1 is continued.

Conversely, if it is judged at step S5 that the motor 17 does not normally rotate (step S5; No), the correction driving pulse output circuit 18 outputs a correction driving pulse signal SJ, whose effective power is higher than that of the normal driving pulse signal SI (at step S6).

Subsequently, the control circuit 15 outputs a demagnetizing pulse signal (at step S7) so as to reduce the magnitude of the magnetic field caused by outputting the correction driving pulse signal SJ.

Then, the generator AC magnetic field detecting circuit 14 starts detecting an AC magnetic field around the power generating field (at step S8).

Thereafter, the process goes to step S1, whereupon the movement of the hands of the analog electronic timepiece 1 is continued.

(2.9) Adjustment of Duty Ratio

Incidentally, the adjustment of the duty ratio of the normal driving pulse signal SI to be outputted for the next movement of the hands is described hereinbelow.

At the aforementioned step S10, the generator AC magnetic field detecting circuit 14 detects an AC magnetic field around the power generating unit 10, and transmits a signal, which indicates a result of the detection, to the duty-ratio increasing/decreasing control circuit 23.

Further, according to the result of the detection, the duty-ratio increasing/decreasing control circuit 23 transmits a duty-ratio increasing/decreasing signal SM, which is used to change the currently set duty ratio to a higher duty ratio, to the duty ratio setting counter 24. Alternatively, circuit 23 transmits a duty-ratio increasing/decreasing signal SM, which is used to change the currently set duty ratio to a lower duty ratio, to the duty ratio setting counter 24. Then, when receiving the duty ratio increasing/decreasing signal SM, the duty ratio setting counter 24 adjusts the duty ratio of the normal driving pulse signal SI to be outputted the next time, at which the movement of the hands is performed, by setting the duty ratio at a value, which is higher or lower than the currently set duty ratio by a value corresponding to, for example, one "level".

(2.10) Effects of Second Embodiment

According to the second embodiment, in the case that an AC magnetic field is detected around the power generating unit 10, the duty ratio is set at a value, which is higher than the currently set duty ratio. This prevents the motor from being put into a non-rotation state even if the motor is affected by the AC magnetic field.

(2.11) Examples of Modification of Second Embodiment

Incidentally, although the duty ratio is set at a value, which is higher than the currently set duty ratio by a value corresponding to one "level" in the aforementioned second embodiment when the duty ratio is increased, the increase in the duty ratio is not limited to the value corresponding to the one "level". The duty ratio may be maintained at the currently set value. Alternatively, the duty ratio may be set at a value, which is higher than the currently set value by a value corresponding to several "levels". In short, by setting the duty ratio at a value that is not less than the lowest duty ratio at which the motor can work, at the current power supply voltage, the motor is prevented from being brought into the non-rotation state.

(3) Third Embodiment (3.1) Functional Constitution of Control System of Third Embodiment Next, the functional constitution of the control system of the third embodiment is described hereinbelow with reference to FIG. 14. In FIG. 14, reference characters A to E respectively denote portions corresponding to the power generating portion A, the power supply portion B, the control portion C, the hand movement mechanism D, and the driving portion E.

Further, in FIG. 14, like reference characters designate like constituent elements of the second embodiment of FIG. 2. Thus, the detail description of such constituent elements is omitted herein.

The configuration of the third embodiment differs from the configuration of the first embodiment in that the analog electronic timepiece 1 of the third embodiment has a voltage detecting circuit 85 for detecting an output voltage of the boosting/lowering circuit 25, and also has a teeth number selection circuit 86 for outputting a teeth number selection signal SO, which is used to select and change the number of pulses (hereunder referred to as "teeth number") of a normal driving pulse signal within a time period, during which the normal driving pulse signal is outputted, according to the value of the voltage detected by the voltage detecting circuit 85, in addition to the constituent element of the first embodiment, (3.2) Detailed Configuration of Control System of Third Embodiment FIG. 15 is a block diagram illustrating the detailed configuration of the control system of the third embodiment. In FIG. 15, like reference characters denote like portions of the control system of the second embodiment of FIG. 11. Thus, the detailed description of such portions is omitted therein.

(3.2.1) Configuration of Voltage Detecting Circuit

The voltage detecting circuit 85 comprises a comparator 85A for comparing the voltage Vss, which is an output voltage of the boosting/lowering circuit 25, with the predetermined reference voltage Vkcom and for outputting a voltage detection signal having "H" level in the case that the voltage Vss exceeds the reference voltage Vkom.

(3.2.2) Configuration of Teeth Number Selection Circuit

The teeth number selection circuit 86 comprises a latch circuit 86A having a data terminal D, to which a voltage detection signal SN is inputted, and having a clock terminal CLK, to which an external clock signal CK2 is inputted, and having a set terminal S and a reset terminal R, to which control signals are respectively inputted from the control circuit 15, and having an output terminal Q, from which the teeth number selection signal SO is outputted.

With such configuration, at the moment, at which the clock signal CK2 is inputted thereto, except the moment just after the control signal is inputted from the control circuit 15 to the set terminal S or the reset terminal R, the teeth number selection circuit 86 outputs a teeth number selection signal SO, which corresponds to a side at which the number of teeth is small, when the voltage Vss exceeds the reference voltage Vkom, and also outputs another teeth number selection signal SO, which corresponds to a side at which the number of teeth is large, when the voltage Vss is less than the reference voltage Vkom.

Incidentally, the "number of teeth" of a normal driving pulse signal is described hereunder with reference to FIG. 16.

Referring first to FIG. 16(*a*), there is shown a normal driving pulse signal, whose "number of teeth" is 6. FIG. 16(*b*) shows a normal driving pulse signal, whose "number of teeth" is 8.

Incidentally, the teeth number selection circuit 86 selects 8 as the "number of teeth", so as to achieve a driving operation with reliability in the case that the boosting/lowering ratio of the boosting/lowering circuit 25 is lowered. In contrast, the teeth number selection circuit 86 selects 6 so as to reduce the power consumption of the timepiece, in the case that the boosting/lowering ratio of the boosting/lowering circuit 25 is increased.

Further, reference characters "t1" and "t2" denote the cycle of a pulse of the normal driving pulse signal, and a time period during which the signal level of the normal driving pulse signal is "H" level.

Incidentally, a ratio (t2/t1) of the time period t2, during which a normal driving pulse signal has "H" level, to the cycle t1 of a pulse of the normal driving pulse signal is defined as a "duty ratio". FIGS. 16(*a*) and 16(*b*) illustrate the cases of employing the same value as the duty ratio.

Further, reference characters "K1a" and "K1b" respectively designate an output time, in which a normal driving pulse signal, whose teeth number is 6, is outputted, and an output time, in which a normal driving pulse signal, whose teeth number is 8, is outputted.

For example, in the case that the cycle t1 of the pulse of the normal driving pulse signal is 0.488 (msec), the output time period K1a of the normal driving pulse signal, whose teeth number is 6, is 0.488 (msec)×6=2.928 (msec). On the other hand, the output time period K1b of the normal driving pulse signal, whose teeth number is 8, is 0.488 (msec)×8= 3.904 (msec).

As illustrated in FIG. 16, in the case of employing the same duty ratio, the effective power of the normal driving pulse signal, whose "teeth number" is 6, is smaller than the effective power of the normal driving pulse signal, whose "teeth number" is 8.

Furthermore, the teeth number selection circuit 86 compares the voltage, which is detected by the voltage detecting circuit 85, with a predetermined teeth number changing voltage (=Vkcom) of the normal driving pulse signal, and then selects the "number of teeth" of the normal driving pulse signal according to a result of the comparison, and moreover, performs an operation of changing the "teeth number" to the selected one.

In the case that the "number of teeth" of the normal driving pulse signal is changed by the teeth number selection circuit 86, when the voltage Vss outputted by the boosting/lowering circuit 25 is lower than the teeth number changing voltage, a normal driving pulse signal, which has larger effective power and an increased "number of teeth" at one time of movement of the hands, is outputted. When the voltage Vss outputted by the boosting/lowering circuit 25 is higher than the teeth number changing voltage, a normal driving pulse signal, which has smaller effective power and a decreased "number of teeth" at one time of movement of the hands, is outputted. Consequently, the power consumption of the timepiece is reduced.

Further, in the case that an AC magnetic field caused by the power generation in the power generating unit 10 is detected by the generator AC magnetic field detecting circuit 14, the duty ratio increasing/decreasing control circuit 23 outputs a duty-ratio increasing/decreasing signal SM, which is used to maintain the currently set duty ratio of the normal driving pulse signal or to set the duty ratio thereof at a higher value than the currently set value, to the duty ratio setting counter 24.

Further, when the change in the "number of teeth" of the normal driving pulse signal causes the timepiece to belong to the aforementioned region, in which the aforementioned operation of the motor 17 cannot be performed, the duty ratio increasing/decreasing control circuit 23 outputs a duty ratio increasing/decreasing signal SM used to change the duty ratio to a value, at which the operation of the motor 17 can be performed, to the duty ratio setting counter 24.

(3.3) Operation of Third Embodiment

Next, an operation of the third embodiment is described with reference to a process flowchart illustrating the operation thereof In FIG. 17, like reference characters designate like steps of the operation of the second embodiment of FIG. 12.

The operation of the third embodiment differs from the operation of the second embodiment in that the teeth number selection circuit 86 selects and changes the "number of teeth" of the normal driving pulse signal according to the voltage value detected by the voltage detecting circuit 85 at steps S11 and S12.

Hereinafter, an operation of the third embodiment is described in detail hereinbelow.

First, the control circuit 15 of the analog electronic timepiece 1 judges (at step S1) whether or not one second, which is the reference time period for movement of the hands, elapses since the previous hand movement time.

In the case when it is decided at step S1 that one second, which is the reference time, does not elapse (step S1; No), a decision is performed again.

Conversely, in the case when it is decided at step S1 that one second, which is the reference time, elapses (step S1; Yes), the voltage detecting circuit 85 detects a voltage charged into the power storing unit 12 (at step S11).

Then, the teeth number selection unit 26 compares the voltage, which is detected by the voltage detecting circuit 85, with the predetermined teeth number changing voltage of the normal driving pulse signal and selects and changes the "number of teeth" of the normal driving pulse signal according to the result of the comparison (at step S12).

Practically, when the voltage charged into the power storing unit 12 is lower than the teeth number changing voltage, a normal driving pulse signal SI, which has larger effective power and an increased "number of teeth" at one time of movement of the hands, is outputted. When the voltage charged into the power storing unit 12 is higher than the teeth number changing voltage, a normal driving pulse signal SI, which has smaller effective power and a decreased "number of teeth" at one time of movement of the hands, is outputted.

Subsequently, the charge detecting circuit 13 transmits a charge detection result signal SA to the generator AC magnetic field detecting circuit 14 (at step S2).

In the case that the charge detection result signal SA transmitted from the charge detecting circuit 13 indicates at step S2 that charging is performed in the power storing unit 12 (step S2; Yes), the generator AC magnetic field detecting circuit 14 transmits a rotation result detection signal SC, which indicates that an AC magnetic field is detected around the power generating unit 10, to the duty ratio increasing/decreasing control circuit 23.

Then, when receiving the rotation detection result signal SC indicating that an AC magnetic field is detected around the power generating unit 10, the duty-ratio increasing/decreasing control circuit 23 outputs a duty ratio increasing/decreasing signal SM, which is used to change the duty ratio to, for instance, a value at which the motor 17 can work, to the duty ratio setting counter 24.

Incidentally, when the change in the "number of teeth" of the normal driving pulse signal at step S12 causes the timepiece to belong to the region, in which the aforementioned operation of the motor 17 cannot be performed, the duty ratio increasing/decreasing control circuit 23 outputs a duty ratio increasing/decreasing signal SM used to change the duty ratio to a value, at which the operation of the motor 17 can be performed, to the duty ratio setting counter 24.

Practically, in the case that the "number of teeth" of the normal driving pulse signal is 8 and the movement of the hands is performed at the duty ratio of, for instance, "20/32", as illustrated in FIG. 18, when the power supply voltage is raised by the power generation and slightly exceeds the teeth number changing voltage, which is 1.45 (V), the duty ratio is not changed and still remains at "20/32", and only the "number of teeth" of the normal driving pulse signal is changed from 8 to 6. In this case, when the "number of teeth" of the normal driving pulse signal is 6, the hand driving motor does not belong to the region b, in which the motor operates. Thus, the hand driving motor does not operate. Therefore, the duty ratio increasing/decreasing control circuit 23 outputs a duty ratio increasing/decreasing signal SM for changing the duty ratio to "22/32", at which the motor 17 can operate, as illustrated in FIG. 19.

Then, when receiving the duty ratio increasing/decreasing signal SM, the duty ratio setting counter 24 transmits a normal driving pulse duty ratio increasing/decreasing signal SH, which is used to change the duty ratio of the normal driving pulse signal SI, to the control circuit 15 (at step S9).

Thereafter, the process goes to step S3.

On the other hand, in the case that the charge detection result signal SA transmitted from the charge detecting circuit 13 indicates at step S2 that charging is not performed in the power storing unit 12 (step S2; No), the control circuit 15 outputs the normal driving pulse signal SI to a motor driving circuit 16 (at step S3). On the other hand, the generator AC magnetic field detecting circuit 14 finishes an operation of detecting an AC magnetic field around the power generating unit 10 (at step S4).

Subsequently, the rotation detecting circuit 21 detects the rotation of the motor 17 and judges (at step S5) whether or not the motor 17 normally rotates.

In the case when it is decided at step S5 that the motor 17 normally rotates (step S5; Yes), the control circuit 15 adjusts the duty ratio of the normal driving pulse signal SI to be outputted the next time, at which the movement of the hands is performed, as will be described later (at step S10).

Further, the generator AC magnetic field detecting circuit 14 starts detecting an AC magnetic field around the power generating unit 10 (at step S8).

Thereafter, the process goes to step S1, whereupon the movement of the hands of the analog electronic timepiece 1 is continued.

Conversely, in the case when it is decided at step S5 that the motor does not normally rotate (step S5; No), the correction driving pulse output circuit 18 outputs a correction driving pulse signal SJ, whose effective power is larger than that of the normal driving pulse signal SI, so as to perform the movement of the hands with reliability (at step S6).

Subsequently, the control circuit 15 outputs a demagnetizing signal so as to reduce the magnitude of the magnetic field generated by outputting the correction driving pulse signal SJ (at step S7).

Then, the generator AC magnetic field detecting circuit 14 starts detecting an AC magnetic field around the power generating unit 10 (at step S8).

Thereafter, the process goes to step S1, whereupon the movement of the hands of the analog electronic timepiece 1 is continued.

(3.4) Effects of Third Embodiment

According to the third embodiment, even in the case that a change in the voltage of the power storing unit 12 is caused by the power generation performed in the power generating unit 10, and that the "number of teeth" of the normal driving pulse signal is changed, the duty ratio thereof is set at a value at which the motor 17 can operate. This prevents the motor from being put into the non-rotation state.

(4) Examples of Modification of Second and Third Embodiments (4.1) First Example of Modification Incidentally, in the case of the aforementioned second and third embodiments, the time period, during which an operation of detecting an AC magnetic field by the power generating unit is performed, is set as the time period between the moment, which is just after the output of the demagnetizing signal in the preceding time, at which the movement of the hands is performed, and the moment, which is just after the output of the normal driving pulse signal in the current movement of the hands. However, a start time of the predetermined time period for detection is a demagnetizing-pulse outputting moment, at which a demagnetizing pulse signal is outputted in the last hand movement operation time period, or included in a time period from a moment, which is just after the demagnetizing-pulse outputting moment, to a moment just before a normal driving pulse signal is outputted in a current hand movement operation time period. Moreover, a termination time of the predetermined time period for detection is included in a time period from the moment, which is just before a normal driving pulse signal is outputted in the current hand movement operation time period, to a moment just after the normal driving pulse signal is outputted. The power consumption can be reduced by shortening the time period for detection of an AC magnetic field still more.

(4.2) Second Example of Modification

Furthermore, in the case of the aforementioned second and the third embodiments, when an AC magnetic field is detected in the time period for detection of an AC magnetic field caused by the power generating unit and in the time period, during the normal driving pulse signal is outputted, at the moment, at which the AC magnetic field is detected, the duty ratio setting counter may maintain the duty ratio of a pulse, which is not outputted yet, among a plurality of pulses of the normal driving pulse signal, which is being outputted, at a currently set value or set the duty ratio of the pulse, which is not outputted yet, at a value that is higher than the currently set value.

(4.3) Third Example of Modification

Further, in the case of the aforementioned second and the third embodiments, when it is decided whether or not the duty ratio of the normal driving pulse signal is increased, the state of the power storing current caused by charging the power storing unit 12 is discriminated according to the result of the detection of the power generating voltage of the power generating unit. However, such a state may be discriminated according to a result of directly detecting the power storing current. Alternatively, such a state may be discriminated according to a result of detecting the power generating current of the power generating unit.

Additionally, in the case of the analog electronic timepiece having the limiter circuit, a decision on the increasing of the set duty ratio of the normal driving pulse signal may be made when the power generation is detected according to the limiter current during the limiter circuit operates, in addition to the case of detecting the power generating voltage, the power storing current or the power generating current.

(4.4) Fourth Example of Modification

Moreover, the power generators of the aforementioned second and third embodiments may be, for example, the electromagnetic induction type power generator, the power generator having the piezoelectric element, or the electromagnetic power generator (driven by using the rotary weight or the crown) and the floating electromagnetic wave reception type generator (namely, the electromagnetic induction type generator utilizing broadcasting or communication electromagnetic waves). Moreover, the timepiece device may have two or more kinds of such power generators. Incidentally, in the case of providing two or more kinds of power generators in the timepiece device, a solar battery or a power generator having a thermoelectric element may be provided together with the herein-above cited power generators.

(4.5) Fifth Example of Modification

Furthermore, in the case of the aforementioned second and third embodiments, the analog electronic timepieces have been described by way of example. However, the timepiece device may be a wristwatch or a clock. In short, the present invention can be applied to any timepiece, in which a magnetic field is generated at the time of power generation and in which a motor is provided.

(4.6) Sixth Example of Modification

Furthermore, in the case of the aforementioned second and third embodiments, the analog electronic timepieces have been described by way of example. However, the timepiece device may be an electronic device having a motor, which is driven according to electric power supplied from an electromagnetic generator. This electronic device may comprise an AC magnetic field detecting unit (namely, an AC magnetic field detecting means) for detecting an AC magnetic field generated around the electromagnetic generator, and a duty ratio control unit (namely, a duty ratio control means) for controlling a duty ratio to be used to drive the motor according to a result of a detection by the AC magnetic field detecting unit. The duty ratio control unit may have a duty ratio setting unit adapted to maintain the duty ratio of a normal driving pulse signal at a currently set value or set the duty ratio at a value, which is higher than the currently set value, when an AC magnetic field is detected by the AC magnetic field detecting unit.

Further, this example of modification may be a timepiece device control method for controlling a timepiece device having a motor driven according to electric power, which is supplied from an electromagnetic generator. This method may comprise the AC magnetic field detecting step of detecting an AC magnetic field generated around the electromagnetic generator, and the duty ratio control step of controlling the step of controlling a duty ratio of a normal driving pulse signal, which is used for driving the motor, according to a result of detecting a magnetic field at the AC magnetic field detecting step. The duty ratio control step may have a duty ratio setting step of maintaining the duty ratio of the normal driving pulse signal at a current set value or setting the duty ratio thereof at a value higher than the currently set value when an AC magnetic field is detected at the AC magnetic field detecting step.

Examples of such electronic devices are a portable electronic device having the aforementioned electromagnetic power generator and the motor, for instance, audio players (for CD or MD), portable phones, a personal computers, and other information terminals.

(5) Fourth Embodiment

Next, the fourth embodiment of the present invention is described in detail hereunder with reference to the accompanying drawings.

(5.1) Functional Constitution of Control System

The entire configuration of an analog electronic timepiece 1, which is the fourth embodiment of the present invention, is similar to that of the electronic time piece of the second embodiment. Thus, the description of the entire configuration of the timepiece is omitted herein. Hereinafter, the functional constitution of the control system of the fourth embodiment is described with reference to FIG. 20.

In FIG. 20, reference characters A to E correspond to the power generating portion A, the power supply portion B, the control portion C, the hand movement mechanism D, and the driving portion E of the second embodiment of FIG. 8. Further, in FIG. 20, like reference characters designate like portions of the second embodiment of FIG. 9.

As is seen from FIG. 20, the fourth embodiment differs from the second embodiment of FIG. 9 in that the fourth embodiment has a non-charging time counter 31 for counting a non-charging time according to a result of the detection by the charge detecting circuit 13, a duty ratio increasing/decreasing counter 32 for increasing and decreasing the duty ratio of the normal driving pulse signal according to a result of the detection performed by the generator AC magnetic field detecting circuit 14, a duty ratio setting circuit 33 for setting the duty ratio of the normal driving pulse signal, and a divide-by-n counter 34 for performing a part of an operation of controlling the duty-ratio increasing/decreasing counter 32.

Incidentally, the non-charging time counter 31 is operative to count a time period, during which the timepiece is continuously in a non-charging state, according to a charge detection result signal SA, which is outputted by the charge detecting circuit 13 and indicates the charging state in the power storing unit 12.

Further, the non-charging time counter 31 is adapted to stop counting the non-charging time and outputs a non-carrying mode discriminating signal SN, which is used to change the "carrying mode" to the "non-carrying mode", to a duty ratio setting circuit 33 when the counted non-charging time is not less than the predetermined time.

The reason for performing this operation is as follows. That is, when charging is not detected for a predetermined certain time (for example, 3 hours), it is judged that the analog electronic timepiece 1 is removed from a user's arm and left alone (namely, in a non-carrying state).

Moreover, when receiving the no-carrying mode discriminating signal SN, which is used for switching the mode to the "non-carrying mode", from the non-charging time counter 31, the duty ratio setting circuit 33 changes the set lower limit duty ratio from the set lower limit duty ratio, which is the set low limit duty ratio in the "carrying mode", to the second set lower limit duty ratio, which is the set lower limit duty ratio in the "non-carrying mode".

Incidentally, the second set lower limit duty ratio is lower than the first set lower limit duty ratio and is set at a value that is not less than the lowest duty ratio.

The reason for performing such an operation is as follows. That is, during the timepiece is in the "non-carrying mode", there is no influence of an AC magnetic field caused by generating electric power in the power generating unit 10. Thus, the movement of the hands is achieved at the lowest duty ratio by causing the motor 17 to work. Consequently, the power consumption can be lowered.

(5.2) Detailed Configuration of Control System

FIG. 21 is a block diagram illustrating the control system of the analog electronic timepiece, which is the fourth embodiment of the present invention.

(5.2.1) Configuration of Non-Charging Time Counter

As illustrated in FIG. 21, the non-charging time counter 31 has a reset terminal RST, which is active at "L" level and connected to an output terminal of an inverter 31A for inverting the logical value represented by the charge detection result signal SA that is outputted from the charge detecting circuit 13. Further, an external clock signal CK2 is inputted to the clock terminal CLK of this counter. During the non-charging time, this counter outputs a non-carrying mode discriminating signal SN, whose signal level is "H" level.

(5.2.2) Configuration of Divide-by-n Counter

As shown in FIG. 21, the divide-by-n counter 34 has a clock terminal CLK, to which an external clock signal CK1 is inputted, and has a reset terminal RST, to which an external reset signal RS is inputted, and has an output terminal Q, from which a duty ratio decreasing signal SQ for decreasing the duty ratio of the normal driving pulse is outputted with the timing provided by performing divide-by-n frequency division on the clock signal CK1.

(5.2.3) Configuration of Duty Ratio Increasing/Decreasing Counter

As shown in FIG. 21, the duty ratio increasing/decreasing counter 32 comprises an AND circuit 32A having an input terminal, to which a duty ratio decreasing signal SQ is inputted, and having the other input terminal, to which a normal driving pulse lower limit duty ratio selection signal SM is inputted, an AND circuit 32B having an input terminal, which is connected to the output terminal of the AND circuit 32A, and having the other terminal, to which a normal driving pulse lower limit duty ratio selection signal SM is inputted, and a 4-bit counter 32C having an increasing terminal UP, to which a duty ratio increasing signal SO is inputted from the control circuit 15, and having a decreasing terminal DOWN, to which the output terminal of the AND circuit 32B is connected, and having output terminals Q1 to Q4, from which a 4-bit normal driving pulse duty ratio increasing/decreasing signal SH is outputted.

(5.2.4) Configuration of Duty Ratio Setting Circuit

As shown in FIG. 21, the duty ratio setting circuit 33 comprises a 4-input AND circuit 33A having input terminals which are active at "L" level and are respectively connected to output terminals Q1 to Q4 of the 4-bit counter 32C, a 4-bit AND circuit 33B having input terminals, which are active at "L" level and respectively connected to the output terminals Q1, Q2, Q3, and Q4 of the 4-bit counter 32C, and having an input terminal, which is active at "H" level and connected to the output terminal Q3 thereof, a NAND circuit 33C having an input terminal, which is connected to the output terminal of the AND circuit 33A, and having the other terminal, to which a non-carrying mode discriminating signal SN is inputted, and a NAND circuit 33D having an input terminal, to which a generator AC magnetic field detection result signal SC is inputted, and having the other input terminal to which the output terminal of the AND circuit 33B is connected.

(5.3) Operations of Circuits around Duty Ratio Setting Circuit

Hereinafter, operations of circuits provided around the duty setting circuit are described. In the following description, it is assumed that the settable lowest duty ratio is 16/32, and that the settable lowest duty ratio is 20/32 when the generator AC magnetic field is detected. Moreover, it is assumed that the settable highest duty ratio is 31/32, and that such a value is set in the initial state, and that Q1="H", Q2=f"H", Q3="H", and Q4="H". Incidentally, Q4 corresponds to the most significant bit, and Q1 corresponds to the least significant bit.

(5.3.1) In The Case That Set Duty Ratios Are 31/32 to 21/32

As a result, in the initial state, an output of the AND circuit 33A has "L" level, and an output of the AND circuit 33B has "L" level.

Therefore, the signal level of an output of the NAND circuit 33C is "H" level, regardless of the state of the no-carrying mode discriminating signal SN. The signal level of an output of the NAND circuit 33D is "H" level, regardless of the state of the generator AC magnetic field detection result signal.

When a duty ratio decreasing signal SQ having "H" level is outputted from the output terminal of the divide-by-n counter Q in this state, the signal level of an output of the AND circuit 32A of the duty ratio increasing/decreasing counter 32 is "H" level. The signal level of an output of the AND circuit 32B is "H" level.

As a result, the signal level of an output of the decreasing terminal DOWN of the 4-bit counter 32C is "H" level. Thus, a down-counting operation is performed, so that Q1="L", Q2="H", Q3="H", and Q4="H". Therefore, the set duty ratio is 31/32.

Similarly, every time a duty ratio decreasing signal SQ having "H" level is outputted from the output terminal Q of the divide-by-n counter, the 4-bit counter 32C performs a down-counting operation until the set duty ratio become 20/32, unless the duty ratio increasing signal SO is inputted from the control circuit 15 thereto.

(5.3.2) In The Case That Set Duty Ratio Reaches 20/32

When the set duty ratio reaches 20/32 as a result of the down-counting operation of the 4-bit counter 32C, the signal levels of the output terminals of the 4-bit counter 32C are as follows. Namely, Q1="L", Q2="L", Q3="H", and Q4="H".

As a consequence, the signal level of an output of the AND circuit 32B is "H" level.

At that time, if an AC magnetic field is detected by the generator AC magnetic field detecting circuit 14, the signal level of the generator AC magnetic field detection result signal SC is "H" level. The signal level of an output of the NAND circuit 32D is "L" level.

Thus, the signal level of an output of the AND circuit 32B of the duty ratio increasing/decreasing counter 32 becomes "L" level, so that the down-counting operation of the 4-bit counter 32C is stopped.

That is, the set duty ratio is held at 20/32.

This is because neither the reliable rotation of the motor nor the reliable detection of the rotation thereof can be ensured when the duty ratio is reduced to a value, which is less than 20/32.

In contrast, even when the signal level of the output of the AND circuit 33B is "H" level, the signal level of the output of the NAND circuit is "H" level in a state in which no AC magnetic field is detected by the generator AC magnetic field detecting circuit 14 and in which the signal level of the generator AC magnetic field detection result signal SC is still "L" level. Thus, unless a duty ratio increasing signal SO is inputted thereto, the down-counting operation is continued.

(5.3.3) In The Case That Set Duty Ratio Reaches 16/32

Furthermore, when the set duty ratio reaches 16/32 as a result of the further down-counting operation of the 4-bit counter 32C, the signal levels of the output terminals of the 4-bit counter 32C are as follows. That is, Q1="L", Q2="L", Q3="L", and Q4="L".

As a result, the signal level of an output of the AND circuit 33A becomes "H" level. When the signal level of the non-carrying mode discriminating signal SN, which is outputted from the non-charging counter 31, that is, when the mode is changed to the "non-carrying mode", the signal level of an output of the NAND circuit 33C becomes "L" level.

Therefore, the set duty ratio is held at 16/32, irrespectively of the state of the duty ratio decreasing signal SQ outputted from the output terminal Q of the divide-by-n counter.

(5.3.4) Relation between Operating Region and Set Duty Ratio

Hereunder, the relation between the operating region of the motor 17 and the aforementioned set duty ratio is described with reference to FIGS. 22 and 23.

As illustrated in FIG. 22, the motor 17 does not operate in an actual voltage range in the case that the duty ratio of the normal driving pulse signal is less than 16/32 (namely, the lowest duty ratio).

Further, a dashed line L2 shown in FIG. 23 indicates a first set lower limit duty ratio. Another dashed line L3 shown therein indicates a second set lower limit duty ratio.

In FIG. 23, the first set lower limit duty ratio L2, which is the set lower limit duty ratio in the "carrying mode", is set at 20/32 that is higher than 16/32 that is the lowest duty ratio.

Thus, the motor 17 cannot lower the duty ratio to the lowest duty ratio. Consequently, the probability of an occurrence of the hand movement failure can be reduced. The stable movement of the hands is achieved.

Incidentally, the first set lower limit duty ratio L2 is not limited only to "20/32". A plurality of duty ratios may be set as the duty ratio L2 according to the voltage of the power storing unit 12 or the detected charging voltage level of the unit 12 at the time of changing the mode to the "carrying mode".

For example, when it is judged that the voltage of the power storing unit 12 is higher than the predetermined voltage, the first set lower limit duty ratio L2 is set at 18/32. On the other hand, when it is judged that the voltage of the power storing unit 12 is lower than the predetermined voltage, the first set lower limit duty ratio L2 is set at 20/32.

Moreover, the second set lower limit duty ratio L3, which is the set low limit duty ratio in the "non-carrying mode", is set at 16/32, which is the lowest duty ratio.

Thus, the motor 17 can lower the duty ratio to the lowest duty ratio, so that the power consumption can be reduced.

Incidentally, these values of the duty ratio are shown in this figure as examples.

(5.4) Operation of Fourth Embodiment

Next, an operation of this embodiment is described hereinbelow by referring to FIGS. 24 and 25.

FIG. 24 shows a process flowchart of the operation thereof. FIG. 25 shows a timing chart illustrating the operation thereof.

First, the control circuit 15 of the analog electronic timepiece 1 decides (at step S1) whether or not one second, which is a reference time for movement of the hands, elapses since the previous moment at which the movement of the hands is performed.

If it is decided (at step S1) that one second, which is the reference time for the movement of hands, does not elapse (NO), the decision is repeated.

Conversely, it is decided (at step S1) that one second, which is the reference time for the movement of hands, elapses (step S1; YES), the non-charging time counter 31 performs an operation of counting the non-charging time according to a charge detection result signal SA outputted from the charge detecting circuit 13 (at step S2).

At step S2, in the case that the charge detection result signal SA outputted from the charge detecting circuit 13 indicates that charging is performed in the power storing unit 12 (step S2; Yes), the process goes to step S15.

Practically, in the case that the charge detection result signal SA of FIG. 25(b) has "H" level, this signal indicates that the charging is performed in the power storing unit 12 (between the moments t1 and t2 and between the moments t4 and t5).

Conversely, at step S2, in the case when the charge detection result signal SA outputted from the charge detecting circuit 13 indicates that charging is not performed in the power storing unit 12 (step S2; No), the non-charging time counter 31 performs an operation of counting a non-charging time (at step S3) according to whether or not the analog electronic timepiece 1 is in the "non-carrying mode".

Practically, in the case that the non-carrying mode discriminating signal SN of FIG. 25(c) has "H" level, this signal indicates that the analog electronic timepiece 1 is in the "non-carrying mode" (between the moments t3 and t4). In the case when the non-carrying mode discriminating signal SN has "L" level, this signal indicates that the analog electronic timepiece 1 is in the "carrying mode" (before the moment t3 and after the moment t4).

At step S3, in the case when the analog electronic timepiece 1 is in the "noncarrying mode" (step S3; Yes), the process advances to step S5.

Practically, in the case that the non-charging time counter operation illustrated in FIG. 25(d) is to "stop counting" (between the moments t3 and t4), the non-charging time counter 31 causes the counter to stop counting the non-charging time.

Conversely, at step S3, in the case that the analog electronic timepiece 1 is in the "carrying mode" (step S3; No), the non-charging time counter 31 causes the counter for counting non-charging time, to count the non-charging time (at step S4).

Practically, the operation of the non-charging time counter illustrated in FIG. 25(d) is to "count" (before the moment t1 and between the moments t2 and t3 and after the moment t5), the non-charging time counter 31 causes the counter for counting the non-charging time, to count the non-charging time. Subsequently, the non-charging time counter 31 performs a predetermined operation (at step S5) according to whether or not the count value of the non-charging time is not less than a predetermined value.

Practically, the non-charging time counter 31 performs the predetermined operation according to whether or not the time elapses since the moment t2, at which the signal level of the charge detection result signal SA of FIG. 25(b) changes from "H" level to "L" level, is not less than the predetermined value T (for instance, 3 hours).

At step S5, in the case that the count value of the non-charging time is less than the preset value T (step S5; No), the process advances to step S8.

Conversely, it is decided at step S5 that the count value of the non-charging time is not less than the preset value T (step S5; Yes), the non-charging time counter 31 stops counting the non-charging time (at step S6).

Practically, in the case where the time elapses since the moment t2, at which the signal level of the charge detection result signal SA of FIG. 25(b) changes from "H" level to "L" level, is not less than the predetermined value T (for example, 3 hours) at the moment t3, the non-charging time counter 31 changes the signal level of the non-carrying mode discriminating signal SN of FIG. 25(c) from the "L" level, which corresponds to the "carrying mode", to "H" level, which corresponds to the "non-carrying mode", and also changes the non-charging time counter operation of FIG. 25(d) to an operation of "stopping counting".

The wasted power consumption is reduced by stopping the operation of the non-charging time counter in the "non-carrying mode".

Next, after receiving a signal, which indicates the "non-carrying mode", from the non-charging time counter 31, the duty ratio setting circuit 33 changes the set lower limit duty ratio from the first set lower limit duty ratio to the second set lower limit duty ratio (at step S7).

Practically, in the time period, during which the signal level of the non-carrying mode discriminating signal SN illustrated in FIG. 25(c) is "H" level corresponding to the "non-carrying mode" (between the times t3 and t4), the duty ratio setting circuit 33 changes the set lower limit duty ratio from the first set lower limit duty ratio to the second set lower limit duty ratio.

For example, in the case that the first set lower limit duty ratio is set at 20/32, when the carrying mode" is switched to the "non-carrying mode", the second set lower limit duty ratio is changed to the lowest duty ratio, which is 16/32.

The reason for setting the duty ratio in this manner is as follows. That is, during the "non-carrying mode", the power generating unit 10 does not generate electric power. Thus, the influence of the AC magnetic field generated owing to the power generation is eliminated. Thus, the movement of the hands can be performed by using the motor 17 at the lowest duty ratio. Consequently, the power consumption of the timepiece is reduced.

Subsequently, the control circuit 15 outputs a normal driving pulse signal SI to the motor driving circuit 16 (at step S8).

Further, the rotation detecting circuit 21 detects the rotation of the motor 17 and decides (at step S10) whether or not the motor normally rotates.

If it is decided at step S10 that the motor 17 normally rotates (step S10; Yes), the process advances to step S13.

Conversely, if it is decided at step S10 that the motor 17 does not normally rotate (step S10; No), the correction driving pulse output circuit 18 outputs a correction driving pulse signal SJ, whose effective power is larger than that of the normal driving pulse signal SI, so as to perform movement of the hands with reliability (at step S11).

Subsequently, the control circuit 15 outputs a demagnetizing pulse signal (at step S12) to reduce the magnitude of the magnetic field generated by outputting the correction driving pulses signal SJ.

Then, the control circuit 15 adjusts the duty ratio of the normal driving pulse signal SI to be outputted the next time, at which the movement of the hands is performed (at step S14). Then, the process goes to step S1, whereupon the movement of the hands of the analog electronic timepiece is continued.

Incidentally, the adjustment of the duty ratio is performed as follows.

First, in the case when it is decided at step S10 that the motor 17 does not rotate, the rotation detecting circuit 21 transmits the duty ratio increasing signal SO to the duty ratio increasing/decreasing counter 32.

Then, when receiving the duty ratio increasing signal SO, the duty ratio increasing/decreasing counter 32 adjusts the duty ratio of the normal driving pulse signal to be outputted the next time, at which the movement of the hands is performed, by setting the duty ratio at a value, which is higher than the currently set value of the duty ratio by a value corresponding to one "level".

Then, at step S14, the generator AC magnetic field detecting circuit 14 detects an AC magnetic field around the power generating unit 10. Subsequently, the circuit 14 transmits a detection result signal SC to the duty ratio setting circuit 33.

Then, the duty ratio setting circuit 33 transmits a lower limit duty ratio selection signal SM to the duty ratio increasing/decreasing counter 32 according to the detection result signal SC.

Subsequently, when receiving the lower limit duty ratio selection signal SM, the duty ratio increasing/decreasing counter 32 adjusts the duty ratio of the normal driving pulse signal to be outputted the next time, at which the movement of the hands is performed, by setting the duty ratio at a value, which is higher or lower than the current value thereof by a value corresponding to one "level", in the case that the lower limit corresponding to the lower limit duty selection signal SM is not altered.

Further, if the charge detection result signal SA outputted from the charging detecting circuit 13 indicates at step S2 that the charging is performed in the power storing unit 12 (step S2; Yes), the non-charging time counter 31 resets the count value of the non-charging time at step S15.

Then, the duty ratio increasing/decreasing counter 32 changes the set lower limit duty ratio in response to the lower limit duty ratio selection signal SM from the second set lower limit duty ratio to the first set lower limit duty ratio (at step S16).

Practically, the signal level of the charge detection result signal SA of FIG. 25(b) is changed from "L" level to "H" level at the moment t4. Thus, the signal level of the "non-carrying mode" discriminating signal SN of FIG. 25(c) is changed from "H" level, which corresponds to the "non-carrying mode", to the "L" level corresponding to the "carrying mode".

Moreover, the duty ratio increasing/decreasing counter 32 changes the set lower limit duty ratio from the second set low limit duty ratio to the first set lower limit duty ratio.

For example, the ratio 16/32, which is the second set lower limit duty ratio, is changed to the ratio 20/32, which is the first set lower limit duty ratio.

Next, the process goes to step S8, whereupon the subsequent operation is performed.

(5.5) Effects of Fourth Embodiment

According to this embodiment, the set lower limit duty ratio is set at a value, which is higher than the value of the lowest duty ratio. Thus, even when the residual magnetic field or the magnetic field generated by the power generator affects the motor somewhat, the motor can rotate.

Furthermore, if the analog electronic timepiece is in the non-carrying mode", the power consumption is reduced by setting the duty ratio at a value, which is the second set lower limit duty ratio that is lower than the first set lower limit duty ratio and is not less than the lowest duty ratio.

(5.6) Examples of Modification of Fourth Embodiment (5.6.1) First Example of Modification Incidentally, in the case of the fourth embodiment, in the "non-carrying mode", the set lower limit duty ratio is changed from the first set lower limit duty ratio to the second set lower limit duty ratio. However, only the first set lower limit duty ratio may be set at the set lower limit duty ratio. In short, any set lower limit duty ratio may be employed, as long as the motor is prevented as much as possible from being into the non-rotation state owing to the influence of the residual magnetic field or the like.

The frequency of an occurrence of the non-rotation state of the motor due to the influence of power generation can be reduced regardless of an operating mode by, for example, preliminarily setting the first set lower limit duty ratio at a value so that the timepiece belongs to an operating region in which the motor can be driven without being affected by the power generation.

(5.6.2) Second Example of Modification

Further, in the fourth embodiment, a decision on the switching between the first and second set lower limit duty ratios is made according to a result of the detection of the charging current. However, in the case of the analog electronic timepiece having the limiter circuit, such a decision may be made according to a result of the detection of a limiter current.

(5.6.3) Third Example of Modification

Furthermore, the power generator of the fourth embodiment may be, the electromagnetic induction type power generator, the power generator having the piezoelectric element, or the electromagnetic power generator (driven by using the rotary weight or the crown) and the floating electromagnetic wave reception type generator (namely, the electromagnetic induction type generator utilizing broadcasting or communication electromagnetic waves). Moreover, the timepiece device may have two or more kinds of such power generators. Incidentally, in the case of providing two or more kinds of power generators in the timepiece device, a solar battery or a power generator having a thermoelectric element may be provided together with the herein-above cited power generators.

(5.6.4) Fourth Example of Modification

Furthermore, in the case of the fourth embodiment, the analog electronic timepieces have been described by way of example. However, the timepiece device may be a wristwatch or a clock. In short, the present invention can be applied to any timepiece, in which a magnetic field is generated at the time of power generation and in which a motor is provided.

(5.6.5) Fifth Example of Modification

Further, in the case of the fourth embodiment, the analog electronic timepieces have been described by way of example. However, the timepiece device may be an electronic device having a motor, which is driven according to electric power supplied from an electromagnetic generator. This timepiece device comprises a power storing unit (namely, a power storing means) for storing electric power supplied from the electromagnetic generator, a charge detecting unit (namely, a charge detecting means) for detecting charging of the power storing unit, and a duty ratio setting unit (namely, a duty ratio setting means) for setting a duty ratio of a normal driving pulse to be outputted to the motor at a value that is not less than a value of a predetermined set lower limit duty ratio, which is higher than a lowest duty ratio, which has a lowest value for driving the motor, when charging is detected by the charge detecting unit.

Moreover, this example of modification may be a timepiece device control method for controlling a timepiece device, which is adapted to drive the motor according to electric power supplied from an electromagnetic generator and has a power storing unit for storing electric power supplied therefrom, comprises a charge detecting step of detecting charging of the power storing unit, and a duty ratio setting step of setting a duty ratio of a normal driving pulse signal to be outputted to the motor and setting the duty ratio at a predetermined value being higher than the lowest duty ratio, which has a lowest value for driving the motor, when charging is detected at the charge detecting step.

Examples of such electronic devices are a portable electronic device having the aforementioned electromagnetic power generator and the motor, for instance, audio players (for CD or MD), portable phones, a personal computers, and other information terminals.

Industrial Applicability

As described above, according to the present invention, if a magnetic field is generated, an operation of lowering the effective value of the driving current is interrupted. As a result, the effective value of the current is maintained at a current value. This prevents transition of the timing device to an operating region in which the probability of an occurrence of erroneous detection is high. Thus, an erroneous detection of rotation of a pulse motor is prevented. Consequently, even when a magnetic field is generated, both reduction in the power consumption of the device and enhancement in the operating accuracy of the device can be achieved.

Further, according to the present invention, even if an AC magnetic field is detected around a power generating unit by a generator AC magnetic field detecting circuit in a predetermined time period, and even if the motor is affected somewhat by an AC magnetic field, an occurrence of the non-rotation state of the motor is prevented by setting the duty ratio at a value that is equal to or higher than a currently set value.

Moreover, even when the "number of teeth" of a normal driving pulse signal is changed, an occurrence of the non-rotation state of the motor is prevented by setting the duty ratio at a value at which the motor can operate.

Thus, according to the present invention, the motor can be rotated with higher reliability. Consequently, an output of a correction driving pulse signal having high effective power is decreased. This results in reduction in the power consumption of an analog electronic timepiece. Moreover, this lowers the frequency of an occurrence of what is called a hand movement failure, which is caused by the influence of the residual magnetic field due to an output of the correction driving pulse signal.

Furthermore, according to the present invention, in the case that a charge is detected by a charge detecting circuit, the set lower limit duty ratio is set at a value that is higher than the lowest duty ratio. Thus, the motor can rotate even if affected by an AC magnetic field that is generated by power generation. Consequently, the frequency of an occurrence of the non-rotation state, in which the motor does not operate, is reduced.

Additionally, the frequency of output of a correction driving pulse signal, whose effective power is large, is decreased by reducing the frequency of an occurrence of the non-rotation state, in which the motor does not operate. This enables reduction in the power consumption of an analog electronic timepiece, and decrease in the frequency of occurrence of what is called a hand movement failure caused owing to the influence of the residual magnetic due to an output of the correction driving pulse signal.

Further, the power consumption of the timepiece is reduced by lowering the set lower limit duty ratio to the lowest duty ratio when a non-charging time reaches a predetermined value.

What is claimed is:

1. A pulse motor driving device comprising:

magnetic field detecting means for detecting a magnetic field in a vicinity of a pulse motor;

control means for controlling an effective value of a driving power of said pulse motor; and rotation detecting means for detecting whether or not said pulse motor rotates, wherein said control means is adapted to perform an operation of increasing the effective value of the driving power of said pulse motor when said rotation detecting means detects that said pulse motor does not rotate, and repeatedly performs an operation of lowering the effective value of the driving power of said pulse motor, and wherein said control means is adapted to interrupt the operation of lowering the effective value of the driving power of said pulse motor when a magnetic field is detected by said magnetic field detecting means.

2. The pulse motor driving device according to claim 1, wherein said control means increases and decreases an effective value of a driving current when the effective value of the driving power is increased and decreased.

3. The pulse motor driving device according to claim 1, wherein said control means increases and decreases an effective value of a driving voltage when the effective value of the driving power is increased and decreased.

4. The pulse motor driving device according to claim 1, wherein said control means increases and decreases a duty ratio of a driving pulse for driving of said pulse motor when the effective value of the driving power is increased and decreased.

5. The pulse motor driving device according to claim 1, wherein said control means increases and decreases the number of driving pulses, which are used for driving said pulse motor, per unit time when the effective value of the driving power is increased and decreased.

6. The pulse motor driving device according to claim 1, wherein said control means forcedly causes said pulse motor to rotate when a magnetic field is detected by said magnetic field detecting means.

7. The pulse motor driving device according to claim 1, wherein said control means stops supply of a drive current, whose effective value is controlled, to said pulse motor when a magnetic field is detected by said magnetic field detecting means.

8. The pulse motor driving device according to claim 1, wherein said control means forcedly causes said pulse motor to rotate, when it is detected by said rotation detecting means that said pulse motor does not rotate.

9. The pulse motor driving device according to claim 1, which further comprises counting means for performing a counting operation in a constant cycle, wherein said counting means resets a count to an initial value or interrupts a counting operation when a magnetic field is detected by said magnetic detecting means, and wherein said control means performs an operation of lowering an effective value of the driving power when the count reaches a predetermined value.

10. The pulse motor driving device according to claim 1, wherein said rotation detecting means detects whether or not the pulse motor rotates according to electric current induced in a coil of said pulse motor.

11. The pulse motor driving device according to claim 1, wherein said magnetic field detecting means detects a magnetic field according to electric current induced in a coil of said pulse motor.

12. The pulse motor driving device according to claim 1, wherein said magnetic field detecting means detects a magnetic field, which is present in the vicinity of said pulse motor, before a driving current is supplied to said pulse motor, and wherein, upon completion of supplying the driving current to said pulse motor, the rotation detecting unit thereof detects whether or not said pulse motor rotates.

13. The pulse motor driving device according to claim 1, which further comprises a power generating means for generating power and supplying driving power to the pulse motor, wherein said magnetic field detecting means detects a magnetic field in the vicinity of said pulse motor by directly or indirectly detecting a state of an electric current, which is caused by generating electric power.

14. The pulse motor driving device according to claim 1, further comprising:

power generating means for generating power and supplying driving power to said pulse motor; and power storing means for storing electric power generated by said power generating means; and wherein said magnetic field detecting means detects the magnetic field in the vicinity of said pulse motor by directly or indirectly detecting a state of a power storage current caused by storing electric charges in said power storing means.

15. The pulse motor driving device according to claim 1, wherein said magnetic field detecting means comprises a magnetic sensor that detects said magnetic field in the vicinity of said pulse motor.

16. A pulse motor driving device comprising:

a magnetic field detecting circuit that detects a magnetic field in a vicinity of a pulse motor;

a control circuit that controls an effective value of a driving power of said pulse motor; and a rotation detecting circuit that detects whether or not said pulse motor rotates, wherein said control circuit is adapted to perform an operation of increasing the effective value of the driving power of said pulse motor when said rotation detecting circuit detects that the pulse motor does not rotate, and repeatedly performs an operation of lowering the effective value of the driving power of said pulse motor, and wherein said control circuit is adapted to interrupt the operation of lowering the effective value of the driving power of said pulse motor when a magnetic field is detected by said magnetic field detecting circuit.

17. The pulse motor driving device according to claim 16, wherein said rotation detecting circuit detects whether or not the pulse motor rotates according to electric current induced by rotation of said pulse motor.

18. The pulse motor driving device according to claim 16, wherein said control circuit increases and decreases an effective value of a driving current when the effective value of the driving power is increased and decreased.

19. A pulse motor driving method comprising the steps of:

detecting a magnetic field in a vicinity of a pulse motor;

controlling an effective value of a driving power of said pulse motor; and detecting whether or not the pulse motor rotates, wherein an operation of increasing the effective value of the driving power of the pulse motor is performed when it is detected that the pulse motor does not rotate, wherein an operation of lowering the effective value of the driving power of said pulse motor is repeatedly performed, and wherein the operation of lowering the effective value of the driving power of the pulse motor is interrupted when a magnetic field is detected by said magnetic detecting circuit.

20. The pulse motor driving method according to claim 19, wherein an effective value of a driving current is increased and decreased when the effective value of the driving power is increased and decreased.

21. The pulse motor driving method according to claim 19, wherein an effective value of a driving voltage is increased and decreased when the effective value of the driving power is increased and decreased.

22. The pulse motor driving method according to claim 19, wherein a duty ratio of a driving pulse for driving of said pulse motor is increased and decreased when the effective value of the driving power is increased and decreased.

23. The pulse motor driving method according to claim 19, wherein the number of driving pulses, which are used for driving the pulse motor, per unit time is increased and decreased when the effective value of the driving power is increased and decreased.

24. The pulse motor driving method according to claim 19, wherein said pulse motor is forced to rotate when a magnetic field is detected.

25. The pulse motor driving method according to claim 19, wherein the supply of a drive current, whose effective value is controlled, to said pulse motor is stopped when a magnetic field is detected.

26. The pulse motor driving method according to claim 19, wherein said pulse motor is forced to rotate when it is detected that said pulse motor does not rotate.

27. The pulse motor driving method according to claim 19, wherein a counting operation is performed in a constant cycle, wherein a count is reset to an initial value or a counting operation is interrupted when a magnetic field is detected, and wherein an operation of lowering an effective value of the driving power is performed when the count reaches a predetermined value.

28. The pulse motor driving method according to claim 19, wherein it is detected according to electric current induced in a coil of said pulse motor whether or not said pulse motor rotates.

29. The pulse motor driving method according to claim 19, wherein a magnetic field is detected according to electric current induced in a coil of said pulse motor.

30. The pulse motor driving method according to claim 19, wherein a magnetic field, which is present in the vicinity of said pulse motor, is detected before a driving current is supplied to said pulse motor, and wherein it is detected upon completion of supplying the driving current to said pulse motor whether or not said pulse motor rotates.

31. The pulse motor driving method according to claim 19, which further comprises the step of generating power so as to supply driving power to said pulse motor, wherein a magnetic field is detected in the vicinity of said pulse motor by detecting an amount of electric current caused by generating electric power.

32. The pulse motor driving method according to claim 19, further comprising the steps of:
generating electric power to supply driving power to said pulse motor;
storing the generated electric power; and
detecting the magnetic field in the vicinity of said pulse motor by detecting an amount of power storage current that is caused by generating electric power.

33. A timepiece device comprising:
a pulse motor for performing an operation of moving hands;
magnetic field detecting means for detecting a magnetic field in a vicinity of said pulse motor;
control means for controlling an effective value of a driving power of said pulse motor; and
rotation detecting means for detecting whether or not the pulse motor rotates,
wherein said control means is adapted to perform an operation of increasing the effective value of the driving power of said pulse motor when said rotation detecting means detects that said pulse motor does not rotate, and repeatedly performs an operation of lowering the effective value of the driving power of said pulse motor, and
wherein said control means is adapted to interrupt the operation of lowering the effective value of the driving power of said pulse motor when a magnetic field is detected by said magnetic field detecting means, and adapted to force said pulse motor to rotate.

34. The timepiece device according to claim 33, wherein said control means increases and decreases an effective value of a driving current when the effective value of the driving power is increased and decreased.

35. The timepiece device according to claim 33, wherein said rotation detecting means detects whether or not the pulse motor rotates according to electric current induced by rotation of said pulse motor.

36. The timepiece device according to claim 33, further comprising power generating means for generating electric power, wherein an electromotive force caused by said power generating means is used as a driving force for said pulse motor.

37. The timepiece device according to claim 33, wherein said power generating means comprises a rotary weight for performing a turning movement, and a power generating element for generating an AC electromotive force by utilizing the turning movement of said rotary weight.

38. A timepiece device having a motor, which is driven according to electric power supplied from an electromagnetic generator, comprising:
AC magnetic field detecting means for detecting an AC magnetic field generated around said electromagnetic generator; and
duty ratio control means for controlling a duty ratio to be used to drive said motor according to a result of a detection by said AC magnetic field detecting means,
wherein said duty ratio control means has duty ratio setting means adapted to maintain the duty ratio of a normal driving pulse signal at a currently set value or set the duty ratio at a value, which is higher than the currently set value, when an AC magnetic field is detected by said AC magnetic field detecting means.

39. The timepiece device according to claim 38, which further comprises:
power storing means for storing electric power supplied from said electromagnetic generator; and
charge detecting means for detecting charging of said power storing means,
wherein said AC magnetic field detecting means detects an AC magnetic filed generated around said electromagnetic generator when the charge detecting means detects a charge in a predetermined time period for detection.

40. The timepiece device according to claim 38, which further comprises:
rotation detecting means for detecting whether or not the motor rotates; and
correction driving pulse output means for outputting a correction driving pulse signal, whose effective power level is higher than that of the normal driving pulse signal, when it is detected that said motor does not rotate.

41. The timepiece device according to claim 40, which further comprises demagnetizing pulse output means for outputting a demagnetizing pulse signal to be used to demagnetize a residual magnetic field caused by the correction driving pulse signal that is outputted by said correction driving pulse signal output means.

42. The timepiece device according to claim 41, wherein a start time of the predetermined time period for detection is a demagnetizing-pulse outputting moment, at which a demagnetizing pulse signal is outputted in the last hand movement operation time period, or included in a time period from a moment, which is just after the demagnetizing-pulse outputting moment, to a moment just before a normal driving pulse signal is outputted in a current hand movement operation time period, and wherein, a termination time of the predetermined time period for detection is included in a time period from the moment, which is just before a normal driving pulse signal is outputted in the current hand movement operation time period, to a moment just after the normal driving pulse signal is outputted.

43. The timepiece device according to claim 42, wherein said duty ratio setting means maintains the duty ratio of a pulse, which is not outputted yet, at a currently set value or sets the duty ratio of the pulse, which is not outputted yet, to a value that is higher than the currently set value.

44. The timepiece device according to claim 38, which further comprises:
   voltage detecting means for detecting the voltage of said power storing means; and
   teeth number selection means for selecting and changing the number of pulses of a normal driving pulse signal to be outputted in a time period therefor by comparing the voltage detected by said voltage detecting means with a predetermined reference voltage.

45. The timepiece device according to claim 44, wherein said teeth number selection unit selects a larger one of the two number of pulses when the detected voltage is lower than the reference voltage, and wherein said teeth number selection unit selects a smaller one of the two number of pulses when the detected voltage is higher than the reference voltage.

46. The timepiece device according to claim 45, wherein a normal driving pulse signal corresponding to a larger one of the two numbers of pulses, which are to be switched from each other according to whether or not the detected voltage is higher than the reference voltage, is set in such a manner as to have a higher effective power level than that of a normal driving pulse signal corresponding to a smaller one of the two numbers of pulses.

47. A timepiece device control method for controlling a timepiece device having a motor driven according to electric power, which is supplied from an electromagnetic generator, said method comprising:
   an AC magnetic field detecting step of detecting an AC magnetic filed generated around said electromagnetic generator; and
   a duty ratio control step of controlling a duty ratio of a normal driving pulse signal, which is used for driving said motor, according to a result of detecting a magnetic field at said AC magnetic field detecting step,
   wherein said duty ratio control step has a duty ratio setting step of maintaining the duty ratio of the normal driving pulse signal at a current set value or setting the duty ratio thereof at a value higher than the currently set value when an AC magnetic field is detected by said AC magnetic field detecting step.

48. The timepiece device control method for controlling said timepiece device according to claim 47, in which said timepiece device has a power storing unit for storing electric power supplied from said electromagnetic generator, further comprising a charge detecting step of detecting charging of the storing device, wherein said AC magnetic field detecting step comprises a step of detecting an AC magnetic field generated around said electromagnetic generator when charging is detected in a predetermined time period for detection in said charge detecting step.

49. The timepiece device control method according to claim 48, which further comprises:
   a rotation detecting step of detecting whether or not the motor rotates; and
   a correction driving pulse output step of outputting a correction driving pulse signal, whose effective power level is higher than that of the normal driving pulse signal, when it is detected that said motor does not rotate.

50. The timepiece device control method according to claim 49, which further comprises a demagnetizing pulse output step of outputting a demagnetizing pulse signal to be used to demagnetize a residual magnetic field caused by the correction driving pulse signal that is outputted by said correction driving pulse signal output step.

51. The timepiece device control method according to claim 50, wherein a start time of the predetermined time period for detection is a demagnetizing-pulse outputting moment, at which a demagnetizing pulse signal is outputted in the last hand movement operation time period, or included in a time period from a moment, which is just after the demagnetizing-pulse outputting moment, to a moment just before a normal driving pulse signal is outputted in a current hand movement operation time period, and wherein a termination time of the predetermined time period for detection is included in a time period from the moment, which is just before a normal driving pulse signal is outputted in the current hand movement operation time period, to a moment just after the normal driving pulse signal is outputted.

52. The timepiece device control method according to claim 51, wherein said duty ratio setting step has a step of maintaining the duty ratio of a pulse, which is not outputted yet, at a currently set value or setting the duty ratio of the pulse, which is not outputted yet, to a value that is higher than the currently set value.

53. The timepiece device control method according to claim 47, which further comprises:
   a voltage detecting step of detecting the voltage of said power storing unit; and
   a teeth number selection step of selecting and changing the number of pulses of a normal driving pulse signal to be outputted in a time period therefor by comparing the voltage detected by said voltage detecting step with a predetermined reference voltage.

54. The timepiece device control method according to claim 53, wherein said teeth number selection step selects a larger one of the two number of pulses when the detected voltage is lower than the reference voltage, and selects a smaller one of the two number of pulses when the detected voltage is higher than the reference voltage.

55. The timepiece device control method according to claim 53, wherein a normal driving pulse signal corresponding to a larger one of the two numbers of pulses, which are to be switched from each other according to whether or not the detected voltage is higher than the reference voltage, is set in such a manner as to have a higher effective power level than that of a normal driving pulse signal corresponding to a smaller one of the two numbers of pulses.

56. A timepiece device having a motor, which is driven according to electric power supplied from an electromagnetic generator, said timepiece device comprising:
   a power storing unit that stores electric power supplied from said electromagnetic generator;
   a charge detector that detects charging of said power storing unit; and
   a duty ratio setting unit that sets a duty ratio of a normal driving pulse to be outputted to said motor at a value that is not less than a value of a predetermined set lower limit duty ratio, which is higher than a lowest duty ratio, which has a lowest value for driving said motor, when charging is detected by said charge detector.

57. The timepiece device according to claim 56, which further comprises:

a motor rotation detector that detects whether or not said motor rotates, wherein an operation of lowering the effective power of a normal driving pulse signal is performed when a rotation of the motor is detected by said motor rotation detector, while an operation of increasing the effective power of a normal driving signal is performed when it is detected by said motor rotation detector that the motor does not rotate.

58. The timepiece device according to claim 57, wherein said motor rotation detector detects according to electric current induced by the rotation of said motor whether or not said motor rotates.

59. A timepiece device having a motor, which is driven according to electric power supplied from an electromagnetic generator, said timepiece device comprising:
    power storing means for storing electric power supplied from said electromagnetic generator;
    a charging detecting means for detecting charging; and
    a duty ratio setting means for setting a duty ratio of a normal driving pulse to be outputted to said motor at a value that is not less than a value of a predetermined set lower limit duty ratio, which is higher than a lowest duty ratio, which has a lowest value for driving said motor, when charging is detected by said charge detecting means.

60. The timepiece device according to claim 59, which further comprises a non-charging time counter means for counting a non-charging time according to a result of a detection by the charge detecting means and for stopping counting the non-charging time when the counted non-charging time is not less than a predetermined time.

61. The timepiece device according to claim 60, wherein said non-charging time counter means outputs a carrying mode setting signal, which indicates that the timepiece device is in a carrying mode, when the counted non-charging time is less than the predetermined time, wherein said duty ratio setting means sets the duty ratio at a value, which is not less than the set lower limit duty ratio, when the carrying mode setting signal is inputted thereto.

62. The timepiece device according to claim 60, wherein said non-charging time counter means outputs a carrying mode setting signal, which indicates that the timepiece device is in a non-carrying mode, when the counted non-charging time is not less than the predetermined time, wherein said duty ratio setting unit sets the duty ratio at a value, which is not less than the set lower limit duty ratio, when the non-carrying mode setting signal is inputted thereto.

63. The timepiece device according to claim 60, wherein said duty ratio setting unit changes the set lower limit duty ratio to a second set lower limit duty ratio, which is lower than the former set lower limit duty ratio and is not less than the lowest duty ratio, when the non-charging time counted by the non-charging time counter unit is not less than the predetermined time.

64. The timepiece device according to claim 62, which further comprises:
    a rotation detecting means for detecting whether or not said motor rotates; and
    a correction driving pulse output unit for outputting a correction driving pulse signal, whose effective power level is higher than that of the normal driving pulse signal, when it is detected that said motor does not rotate.

65. A timepiece device control method for controlling a timepiece device, which is adapted to drive a motor according to electric power supplied from an electromagnetic generator and has a power storing unit that stores electric power supplied therefrom, comprising:
    a charge detecting step of detecting charging of said power storing unit; and
    a duty ratio setting step of setting a duty ratio of a normal driving pulse signal to be outputted to said motor and setting the duty ratio at a predetermined value being higher than the lowest duty ratio, which has a lowest value for driving said motor, when charging is detected at said charge detecting step.

66. The timepiece device control method according to claim 65, which further comprises a non-charging time counter step of counting a non-charging time according to a result of a detection by said charge detecting step and stopping counting the non-charging time when the counted non-charging time is not less than a predetermined time.

67. The timepiece device control method according to claim 66, wherein said non-charging time counter step has a step of outputting a carrying mode setting signal, which indicates that the timepiece device is in a carrying mode, when the counted non-charging time is less than the predetermined time, and wherein the duty ratio setting step has a step of setting the duty ratio at a value, which is not less than the set lower limit duty ratio, when the carrying mode setting signal is inputted thereto.

68. The timepiece device control method according to claim 66, wherein said non-charging time counter step has a step of outputting a carrying mode setting signal, which indicates that the timepiece device is in a non-carrying mode, when the counted non-charging time is less than the predetermined time, and wherein said duty ratio setting step has a step of setting the duty ratio at a value, which is not less than the set lower limit duty ratio, when the non-carrying mode setting signal is inputted thereto.

69. The timepiece device control method according to claim 65, wherein said duty ratio setting step has a step of changing the set lower limit duty ratio to a second set lower limit duty ratio, which is lower than the former set lower limit duty ratio and is not less than the lowest duty ratio, when the non-charging time counted by the non-charging time counter step is not less than the predetermined time.

70. The timepiece device control method according to claim 65, which further comprises:
    a rotation detecting step of detecting whether or not the motor rotates; and
    a correction driving pulse output step of outputting a correction driving pulse signal, whose effective power level is higher than that of the normal driving pulse signal, when it is detected that said motor does not rotate.

71. A timepiece device having a motor, which is driven according to electric power supplied from an electromagnetic generator, comprising:
    an AC magnetic field detecting circuit that detects an AC magnetic field generated around said electromagnetic generator; and
    a duty ratio control unit that controls a duty ratio to be used to drive said motor according to a result of a detection by said AC magnetic field detecting circuit, wherein said duty ratio control unit has a duty ratio setting unit that maintains the duty ratio of a normal driving pulse signal at a currently set value or sets the duty ratio at a value, which is higher than the currently set value, when an AC magnetic field is detected by said AC magnetic field detecting circuit.

* * * * *

UNITED STATES PATENT AND TRADEMARK OFFICE
CERTIFICATE OF CORRECTION

PATENT NO.     : 6,476,579 B1
DATED          : November 5, 2002
INVENTOR(S)    : Hidehiro Akahane et al.

It is certified that error appears in the above-identified patent and that said Letters Patent is hereby corrected as shown below:

<u>Title page,</u>
Item [30], Foreign Application Priority Data, please add:
-- 11-131835     (JP)     May 12, 1999 --.

Signed and Sealed this

Twenty-ninth Day of April, 2003

JAMES E. ROGAN
*Director of the United States Patent and Trademark Office*